(12) United States Patent
Miyazawa et al.

(10) Patent No.: US 7,406,270 B2
(45) Date of Patent: Jul. 29, 2008

(54) IMAGE PROCESSING SYSTEM, IMAGE PROCESSING DEVICE, SERVER AND PROGRAM

(75) Inventors: Masafumi Miyazawa, Nagoya (JP); Makoto Matsuda, Aisai (JP); Kiyotaka Ohara, Nagoya (JP); Kazuma Aoki, Kasugai (JP); Satoru Yanagi, Nagoya (JP); Masatoshi Kokubo, Ama-gun (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 268 days.

(21) Appl. No.: 11/265,554

(22) Filed: Nov. 3, 2005

(65) Prior Publication Data

US 2006/0110171 A1 May 25, 2006

(30) Foreign Application Priority Data

Nov. 5, 2004 (JP) ............................. 2004-322945

(51) Int. Cl.
*G03G 15/00* (2006.01)
*H04N 1/00* (2006.01)

(52) U.S. Cl. ..................................... 399/8; 358/1.15
(58) Field of Classification Search ................ 399/8; 358/1.15, 401
See application file for complete search history.

(56) References Cited

U.S. PATENT DOCUMENTS

| 5,909,602 | A | 6/1999 | Nakai et al. |
| 5,946,457 | A | 8/1999 | Nakai et al. |
| 6,122,005 | A * | 9/2000 | Sasaki et al. ............. 348/211.3 |
| 6,484,164 | B1 | 11/2002 | Nikolovska et al. |
| 6,499,029 | B1 | 12/2002 | Kurapati et al. |
| 2002/0167684 | A1 | 11/2002 | Kikuchi et al. |
| 2003/0117642 | A1 | 6/2003 | Haraguchi |
| 2003/0137682 | A1 | 7/2003 | Sakai et al. |
| 2003/0212786 | A1 | 11/2003 | Jystad et al. |
| 2004/0080770 | A1 * | 4/2004 | Hirose et al. ............... 358/1.15 |
| 2004/0136027 | A1 * | 7/2004 | Zehler ....................... 358/1.15 |
| 2004/0190046 | A1 | 9/2004 | Ilda |

FOREIGN PATENT DOCUMENTS

| EP | 0 738 076 | 10/1996 |
| EP | 0 782 326 | 7/1997 |
| EP | 1 229 719 | 8/2002 |
| JP | 9-238215 | 9/1997 |
| WO | WO 02/08860 | 1/2002 |
| WO | WO 2004/091188 | 10/2004 |

OTHER PUBLICATIONS

European Search Report based on corresponding European Application No. 05256873.0.

* cited by examiner

*Primary Examiner*—Sophia S Chen
(74) *Attorney, Agent, or Firm*—Banner & Witcoff, Ltd.

(57) ABSTRACT

An image processing system including an image processing device, a service supply unit and an information supply unit is provided. The image processing device includes a service search data transmission unit, a service determination unit, and a service requesting unit. The information supply unit including a service search data reception unit; a presumption unit that presumes a probability of each service based on the service search data received by the service search data reception unit and according to prescribed presumption rules; and a list supply unit that supplies a list generated by extracting services likely to be requested from the service supply unit from all the services executable by the service supply unit and a list generated by sorting the services executable by the service supply unit.

20 Claims, 72 Drawing Sheets

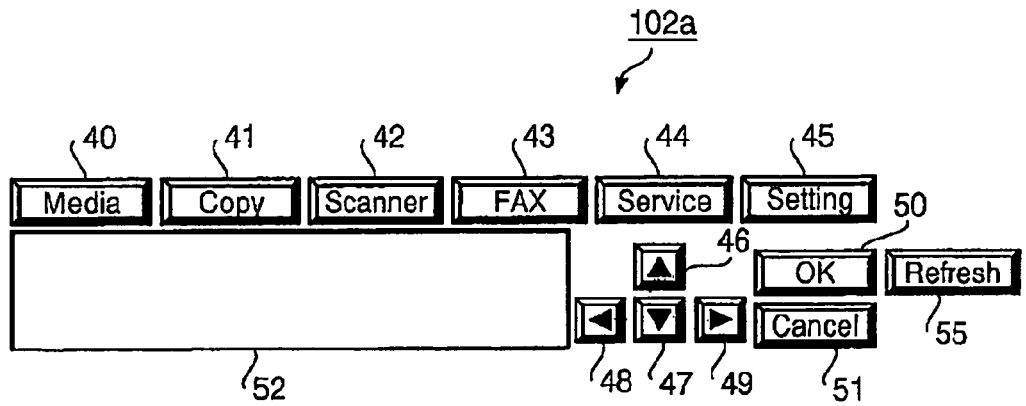

FIG. 2

```
<?xml version="1.0" encoding="Shift-Jis"?>
<ID>11111110</ID>
<Title>Directory Service</Title>
<Type>MENU</Type>
<Num_Link>3</Num_Link>
<Link>
  <Link_Title>Data Storage Service</Link_Title>
  <Link_Location>11111111</Link_Location>
</Link>
<Link>
  <Link_Title>Printing Service </Link_Title>
  <Link_Location>11111112</Link_Location>
</Link>
<Link>
  <Link_Title>Copy Application Service</Link_Title>
  <Link_Location>11111113</Link_Location>
</Link>
```

FIG. 3

```
<?xml version="1.0" encoding="Shift-Jis"?>
<ID>11111113</ID>
<Title>Copy Application Service</Title>
<Type>MENU</Type>
<Num_Link>4</Num_Link>
<Link>
  <Link_Title>Watermarked Copy</Link_Title>
    <Link_Location>http://suk.brother.co.jp/cgi_bin/suktop</Link_Location>
</Link>
<Link>
  <Link_Title>Translation Copy </Link_Title>
    <Link_Location>http://hon.brother.co.jp/cgi_bin/top</Link_Location>
</Link>
<Link>
  <Link_Title>Document Read-aloud</Link_Title>
    <Link_Location>http://brother.yomiage.com/cgi_bin/yomi</Link_Location>
</Link>
<Link>
  <Link_Title>Voice-text Conversion</Link_Title>
    <Link_Location>http://ototeki.com/cgi_bin/oo</Link_Location>
</Link>
```

FIG. 4

|  | Data Name | Data Type | Remarks |
|---|---|---|---|
| Basic Data | ID | Integer | ID of service definition information |
|  | Title | Character String | Display title |
|  | Type | "MENU" or "FORM" | The type of Body data<br>MENU:link list to other information<br>FORM:data input form<br>The "Type" is "MENU" in service definition information. |
| Body Data (When Type is "MENU") | Num_Link | Integer | Link data |
|  | Link[ ] | — | Link data |
| Link Data | Link_Title | Character String | Character string displayed for explaining service or information at the link |
|  | Link_Location | Character String | URL for calling up service or ID of other service definition information |

FIG. 5

```xml
<?xml version="1.0" encoding="Shift-Jis"?>
<ID>11111110</ID>
<Title>Translation Copy</Title>
<Type>FORM</Type>
<Action>
http://hon.brother.co.jp/cgi_bin/service</Action>
<Num_Form_Elem>4</Num_Form_Elem>
<Form_Elem>
  <Form_Type>Select</Form_Type>
  <Form_Data>
    <Disp_Name>Language Selection</Disp_Name>
    <Value_Name>lang</Value_Name>
    <Multi_Select>0</Multi_Select>
    <Num_Option>2</Num_Option>
    <Option>
      <Disp_Select>English → Japanese</Disp_Select>
      <Disp_Value>en_ja</Disp_Value>
      <Default_Select>1</Disp_Select>
    </Option>
    <Option>
      <Disp_Select>Japanese → English</Disp_Select>
      <Disp_Value>ja_en</Disp_Value>
      <Default_Select>0</Disp_Select>
    </Option>
    </Disp_Name>
  </Form_Data>
</Form_Elem>
(Continued on Fig.8)
```

FIG. 7

```
(Continued from Fig.7)
<Form_Elem>
  <Form_Type>Select</Form_Type>
  <Form_Data>
    <Disp_Name>Scanner Selection</Disp_Name>
    <Value_Name>scan_res</Value_Name>
    <Multi_Select>0</Multi_Select>
    <Num_Option>2</Num_Option>
    <Option>
      <Disp_Select>Normal Character</Disp_Select>
      <Disp_Value>300</Disp_Value>
      <Default_Select>1</Disp_Select>
    </Option>
    <Option>
      <Disp_Select>Fine Character</Disp_Select>
      <Disp_Value>600</Disp_Value>
      <Default_Select>0</Disp_Select>
    </Option>
  </Form_Data>
</Form_Elem>
(Continued on Fig.9)
```

FIG. 8

```
(Continued from Fig.8)
<Form_Elem>
  <Form_Type>Select</Form_Type>
  <Form_Data>
    <Disp_Name>Print Setting</Disp_Name>
    <Value_Name>print_res</Value_Name>
    <Multi_Select>0</Multi_Select>
    <Num_Option>3</Num_Option>
    <Option>
      <Disp_Select>Print Speed Priority</Disp_Select>
      <Disp_Value>200</Disp_Value>
      <Default_Select>0</Disp_Select>
    </Option>
    <Option>
      <Disp_Select>Normal</Disp_Select>
      <Disp_Value>300</Disp_Value>
      <Default_Select>1</Disp_Select>
    </Option>
    <Option>
      <Disp_Select>High-resolution</Disp_Select>
      <Disp_Value>600</Disp_Value>
      <Default_Select>0</Disp_Select>
    </Option>
  </Form_Data>
</Form_Elem>
<Form_Elem>
  <Form_Type>Text</Form_Type>
  <Form_Data>
    <Disp_Name>Comment</Disp_Name>
    <Value_Name>comment<Value_Name>
    <Max_Byte>100</Max_Byte>
    <Default_String></Default_String>
  </Form_Data>
</Form_Elem>
```

FIG. 9

|  | Data Name | Data Type | Remarks |
|---|---|---|---|
| Basic Data | ID | Integer | ID of service I/F information |
|  | Title | Character String | Display title |
|  | Type | "MENU" or "FORM" | The type of Body data<br>MENU:link list to other information<br>FORM:data input form<br>The "Type" is "FORM" in service I/F information. |
| Body Data (When Type is "FORM") | Action | URL | URL of program receiving and processing input data |
|  | Num_Form_Elem | Integer | The number of Form_Elem's |
|  | Form_Elem[ ] | — | Type-dependent Form element data |
| Form_Elem Data (Form element data) | Form_Type | "Text", "Password" or "Select" | The type of Form element |
|  | Form_Data | — | Type-dependent data |
| Form_Data Data ("Text" or "Password") | Disp_Name | Character String | Character string for explaining entry item |
|  | Value_Name | Character String | Name of variable when transmitted as data |
|  | Max_Byte | Integer | The maximum number of bytes of character string entered |
|  | Default_String | Character String | Character string displayed in input area in initial state |
| Form_Data Data (Select) | Disp_Name | Character String | Character string for explaining entry item |
|  | Value_Name | Character String | Name of variable when transmitted as data |
|  | Multi_Select | 0 or 1 | 0:multiple selection impossible<br>1:multiple selection possible |
|  | Num_Option | Integer | The number of options |
|  | Option[ ] | — | Information on options |
| Option Data | Disp_Name | Character String | Character string displayed for indicating option |
|  | Value_Name | Character String | Value when transmitted as data when selected |
|  | Default_Select | 0 or 1 | 0:not selected in initial state<br>1:selected possible |

FIG.10

| Tag Name | Data | Value | Remarks |
|---|---|---|---|
| FeatureData | Config, Condition, TargetData | | Defining service search data |
| Config | Language, Area | | Defining setting information of device |
| Language | | jpn, eng, frn | Language: Japanese, English, French |
| Area | | jp, us, fr | Area of installation: Japan, US, French |
| Condition | ADF, MPTray, MPTraySize, DefaultTraySize | | Defining condition information on device (e.g. sensor information) |
| ADF | | ON, OFF | ON: Document is set on ADF<br>OFF: No document is set on ADF |
| MPTraySize | | A4, A5, letter, postcard | Size of paper set on MP Tray:A4,A5,letter,postcard |
| DefaultTraySize | | A4, A5, letter, postcard | Size of Default Tray:A4,A5,letter,postcard |
| PhoneHook | | ON, OFF | ON: Handset is on<br>OFF: Handset is off |
| TargetData | TargetDataType, Binary | | (Part of)data as target of process |
| TargetDataType | | Voice, Image, photo | Data type:voice, scanned image,digital photo |
| TargetNum | | Interer | The number of selected digital photos in the case of "photo" |
| Data | | | (Part of)main data as target of process |

FIG.15

```
<?xml version="1.0" encoding="Shift-Jis"?>
<FeatureData>
<Config>
<Language>jpn</Language>
<Area>jp</Area>
</Config>
<Condition>
<ADF>ON</ADF>
<DefaultTraySize>A4</DefaultTraySize>
</Condition>
<TargetData>
<TargetDataType>image</TargetDataType>
<Data>4fJ:LKHF:hw8;:haa.....</Data>
</TargetData>
</FeatureData>
```

FIG.16A

```
<?xml version="1.0" encoding="Shift-Jis"?>
<FeatureData>
<Config>
<Language>eng</Language>
<Area>jp</Area>
</Config>
<Condition>
<ADF>ON</ADF>
<DefaultTraySize>A4</DefaultTraySize>
<Phone>OFF</Phone>
</Condition>
<TargetData>
<TargetDataType>phone</TargetDataType>
</TargetData>
</FeatureData>
```

| Attribute | English-Japanese Document Translation Service | Japanese-English Document Translation Service | English-French Document Translation Service | French-English Document Translation Service | Japanese-French Document Translation Service | French-Japanese Document Translation Service | English Document Spellcheck Service | Japanese Document Summarization Service | Thumbnailing Service | English Voice-Japanese Translation Service | English Voice Dictation Service | Panoramic Photo Service | Digital Photo Camera Shake Correction Service | Digital Photo Backlight Correction Service |
|---|---|---|---|---|---|---|---|---|---|---|---|---|---|---|
| for French-speaking Countries | - | - | O | O | - | O | - | - | - | - | - | - | - | - |
| for Japanese-speaking Countries | O | O | - | - | O | O | - | O | - | O | - | - | - | - |
| for English-speaking Countries | O | O | O | O | - | - | O | - | - | O | O | - | - | - |
| for Postcard Printing | - | - | - | - | - | - | - | - | - | - | - | - | O | O |
| for Digital Photo | | | | | | | | | | O | | O | O | O |
| for Voice | | | | | | | | | | O | O | | | |
| for French Document | | | O | | O | | - | | | | | | | |
| for Japanese Document | | O | | O | | O | - | | | | | | | |
| for English Document | O | | O | | | O | - | | | | | | | |
| for Multiple-sheet Document | - | - | - | - | - | - | - | O | O | | | | | |
| for Single-sheet Document | - | - | - | - | - | - | - | | | | | | | |
| Service for Scanned Image | - | - | - | - | - | - | - | - | | | | | | |
| URL | service.trans-en2jp.xxx.com | service.trans-jp2en.xxx.com | service.trans-en2fr.xxx.com | service.trans-fr2en.xxx.com | service.trans-en2fr.xxx.com | service.trans-fr2en.xxx.com | www.spellcheck.co.jp | www.yyy.co.jp | service.thumbnail.zzz.com | voicetrans.aaa.com | voice2text.aaa.com | foobar.bbb.com | hogehoge.bbb.com | aaaaaaaa.bbb.com |

| Meanings of Symbols | |
|---|---|
| O | Relevant Service |
| - | Irrelevant |
| (blank) | Unclear |

| Title | URL | Status |
|---|---|---|
| English-Japanese Document Translation Service | service.trans-en2jp.xxx.com | ○ |
| Japanese-English Document Translation Service | service.trans-jp2en.xxx.com | ○ |
| English-French Document Translation Service | service.trans-en2fr.xxx.com | — |
| French-English Document Translation Service | service.trans-fr2en.xxx.com | — |
| Japanese-French Document Translation Service | service.trans-en2fr.xxx.com | — |
| French-Japanese Document Translation Service | service.trans-fr2en.xxx.com | — |
| English Document Spellcheck Service | www.spellcheck.co.jp | ○ |
| Japanese Document Summarization Service | www.yyy.co.jp | ○ |
| Thumbnailing Service | service.thumbnail.zzz.com | — |
| English Voice-Japanese Translation Service | voicetrans.aaa.com | |
| English Voice Dictation Service | voice2text.aaa.com | |
| Panoramic Photo Service | foobar.bbb.com | |
| Digital Photo Camera Shake Correction Service | hogehoge.bbb.com | |
| Digital Photo Backlight Correction Service | aaaaaaaa.bbb.com | |

| Tag Name | Data | Remarks |
|---|---|---|
| ServiceList | Service | Defining list of service |
| Service | Location, Title | Defining each service |
| Location | Character String | URL providing service |
| Title | Character String | Title of service |

FIG.19B

```
<?xml version="1.0" encoding="Shift-Jis"?>
<ServiceList>
  <Service>
    <Location>http://service.trans-en2jp.xxx.com</Location>
    <Title>English-Japanese Document Translation Service</Title>
  </Service>
  <Service>
    <Location>http://www.yyy.com</Location>
    <Title>Japanese Document Summarization Service</Title>
  </Service>
  ...
  </Service>
</ServiceList>
```

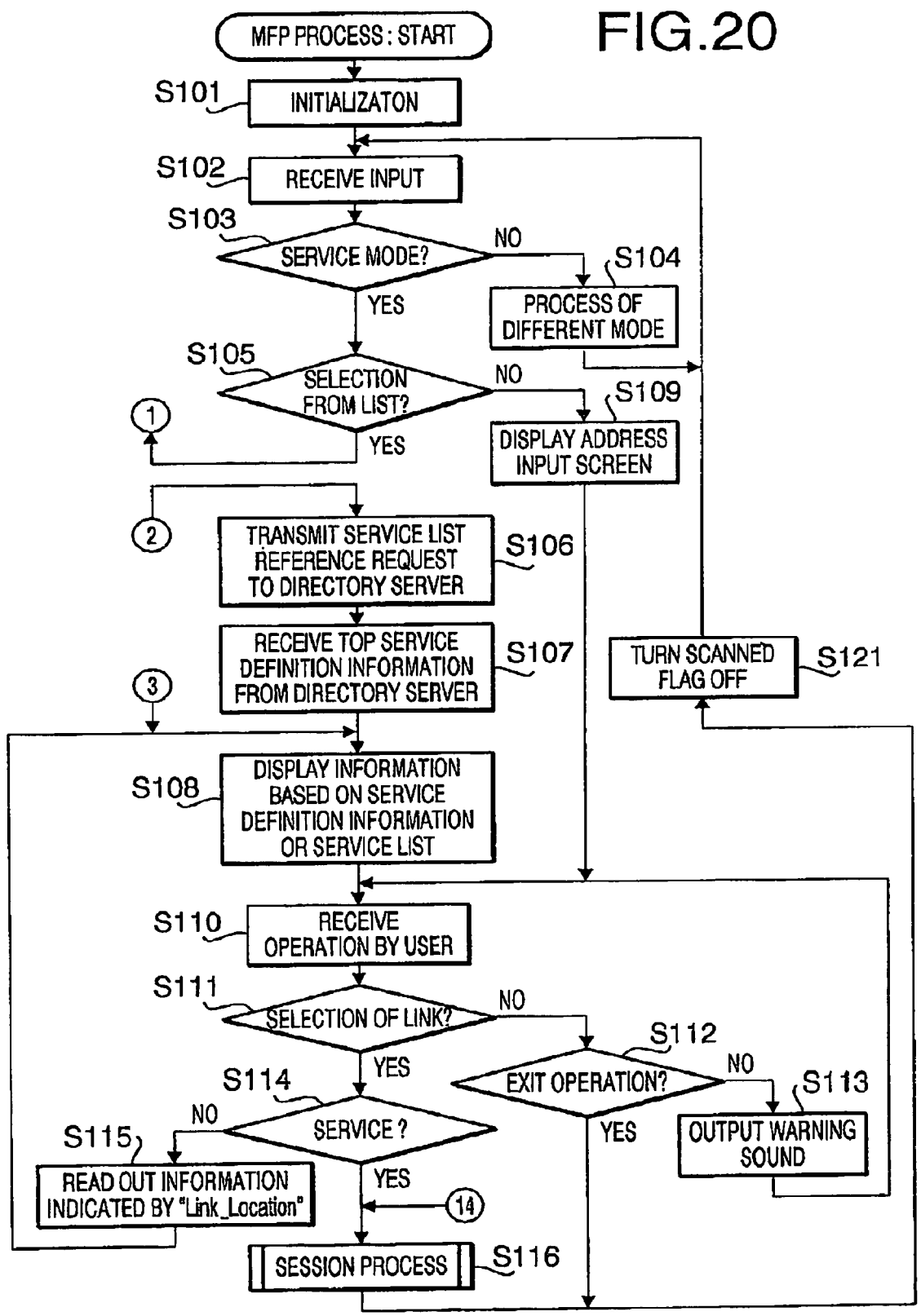

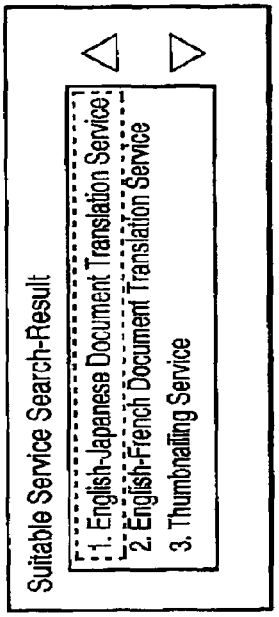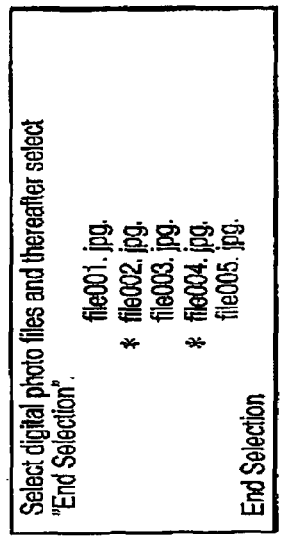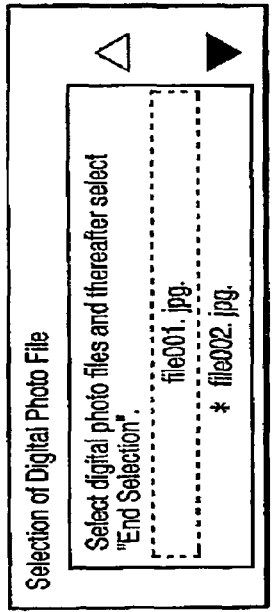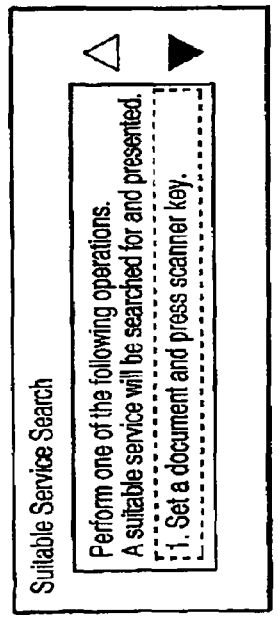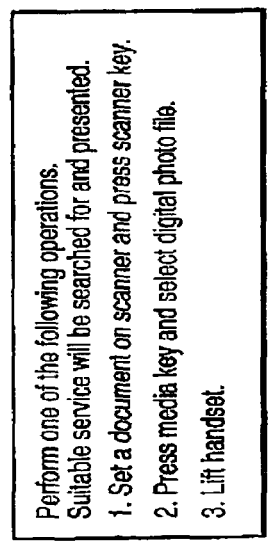

```
<?xml version="1.0" encoding="Shift-Jis"?>
<FeatureData>
  <Config>
    <Location>jpn</Location>
    <Area>jp</Area>
  </Config>
  <Condition>
    <ADF>ON</ADF>
    <MPTray>OFF</MPTray>
    <DefaultTraySize>A4</DefaultTraySize>
    <Phone>ON</Phone>
  </Condition>
  <TargetData>
    <TargetData>image</TargetData>
    <Data>4fJ:LKHF:hw8;:haa......</Data>
  </TargetData>
</FeatureData>
```

FIG.46A

```
<?xml version="1.0" encoding="Shift-Jis"?>
<ServiceList>
  <Service>
    <Location>service.trans-en2jp.xxx.com</Location>
    <Title>English-Japanese Document Translation Service</Title>
  </Service>
  <Service>
    <Location>service.trans-en2fr.xxx.com</Location>
    <Title>English-French Document Translation Service</Title>
  </Service>
  <Service>
    <Location>www.spellcheck.co.JP</Location>
    <Title>English Document Spellcheck Service</Title>
  </Service>
  <Service>
    <Location>service.thumbnail.zzz.co</Location>
    <Title>Thumbnailing Service</Title>
  </Service>
</ServiceList>
```

FIG.46B

| Title | URL | Status |
|---|---|---|
| English-Japanese Document Translation Service | service.trans-en2jp.xxx.com | ○ |
| Japanese-English Document Translation Service | service.trans-jp2en.xxx.com | |
| English-French Document Translation Service | service.trans-en2fr.xxx.com | ○ |
| French-English Document Translation Service | service.trans-fr2en.xxx.com | |
| Japanese-French Document Translation Service | service.trans-en2fr.xxx.com | |
| French-Japanese Document Translation Service | service.trans-fr2en.xxx.com | |
| English Document Spellcheck Service | www.spellcheck.co.jp | ○ |
| Japanese Document Summarization Service | www.yyy.co.jp | |
| Thumbnailing Service | service.thumbnail.zzz.com | ○ |
| English Voice-Japanese Translation Service | voicetrans.aaa.com | |
| English Voice Dictation Service | voice2text.aaa.com | |
| Panoramic Photo Service | foobar.bbb.com | |
| Digital Photo Camera Shake Correction Service | hogehoge.bbb.com | |
| Digital Photo Backlight Correction Service | aaaaaaaa.bbb.com | |

(Blank Cells = "−1")

| | English-Japanese Document Translation Service | Japanese-English Document Translation Service | English-French Document Translation Service | French-English Document Translation Service | Japanese-French Document Translation Service | French-Japanese Document Translation Service | English Document Spellcheck Service | Japanese Document Summarization Service | Thumbnailing Service | English Voice-Japanese Translation Service | English Voice Dictation Service | Panoramic Photo Service | Digital Photo Camera Shake Correction Service | Digital Photo Backlight Correction Service |
|---|---|---|---|---|---|---|---|---|---|---|---|---|---|---|
| URL | service.trans-en2jp.xxx.com | service.trans-jp2en.xxx.com | service.trans-en2fr.xxx.com | service.trans-fr2en.xxx.com | service.trans-jp2fr.xxx.com | service.trans-fr2jp.xxx.com | www.spellcheck.co.jp | www.yyy.co.jp | service.thumbnail.zzz.com | voicetrans.aaa.com | voice2text.aaa.com | foobar.bbb.com | hogehoge.bbb.com | aaaaaaaa.bbb.com |
| for French-speaking Countries | 1 | 1 | 5 | 3 | 1 | 3 | 1 | 1 | | 3 | 1 | 1 | 1 | 1 |
| for Japanese-speaking Countries | 5 | 3 | 1 | 1 | 3 | 1 | 5 | 1 | 5 | 3 | 5 | 1 | 1 | 1 |
| for English-speaking Countries | 1 | 3 | 5 | 3 | 1 | 1 | 5 | 1 | 3 | 5 | 5 | 1 | 1 | 1 |
| for Postcard Printing | | | | | | | | | | | | | 5 | 5 |
| for Digital Photo | | | | | | | | | 3 | | | 5 | 5 | 5 |
| for Voice | | | | | | | | | | 5 | 5 | | | |
| for French Document | | | 5 | | 5 | | 1 | | | | | | | |
| for Japanese Document | | 5 | | | 5 | | 5 | 1 | | | | | | |
| for English Document | 5 | | 5 | | | 5 | 1 | | | | | | | |
| for Multiple-sheet Document | 1 | 1 | 1 | 1 | 1 | 1 | 5 | 5 | | | | | | |
| for Single-sheet Document | 1 | 1 | 1 | 1 | 1 | 1 | 1 | | | | | | | |
| Service for Scanned Image | 1 | 1 | 1 | 1 | 1 | 1 | 1 | 1 | | | | | | |

| Title | URL | Priority (The Number of "0"s) |
|---|---|---|
| English-Japanese Document Translation Service | service.trans-en2jp.xxx.com | 4 |
| Japanese-English Document Translation Service | service.trans-jp2en.xxx.com | 2 |
| English-French Document Translation Service | service.trans-en2fr.xxx.com | 1 |
| French-English Document Translation Service | service.trans-fr2en.xxx.com | |
| Japanese-French Document Translation Service | service.trans-en2fr.xxx.com | |
| French-Japanese Document Translation Service | service.trans-fr2en.xxx.com | 1 |
| English Document Spellcheck Service | www.spellcheck.co.jp | |
| Japanese Document Summarization Service | www.yyy.co.jp | |
| Thumbnailing Service | service.thumbnail.zzz.com | 1 |
| English Voice-Japanese Translation Service | voicetrans.aaa.com | 1 |
| English Voice Dictation Service | voice2text.aaa.com | |
| Panoramic Photo Service | foobar.bbb.com | |
| Digital Photo Camera Shake Correction Service | hogehoge.bbb.com | |
| Digital Photo Backlight Correction Service | aaaaaaaa.bbb.com | |

(Blank Cells=" − 1")

| Title | URL | Priority |
|---|---|---|
| English-Japanese Document Translation Service | service.trans-en2jp.xxx.com | 12 |
| Japanese-English Document Translation Service | service.trans-jp2en.xxx.com | 8 |
| English-French Document Translation Service | service.trans-en2fr.xxx.com | |
| French-English Document Translation Service | service.trans-fr2en.xxx.com | |
| Japanese-French Document Translation Service | service.trans-en2fr.xxx.com | |
| French-Japanese Document Translation Service | service.trans-fr2en.xxx.com | |
| English Document Spellcheck Service | www.spellcheck.co.jp | 8 |
| Japanese Document Summarization Service | www.yyy.co.jp | |
| Thumbnailing Service | service.thumbnail.zzz.com | 10 |
| English Voice-Japanese Translation Service | voicetrans.aaa.com | |
| English Voice Dictation Service | voice2text.aaa.com | |
| Panoramic Photo Service | foobar.bbb.com | |
| Digital Photo Camera Shake Correction Service | hogehoge.bbb.com | |
| Digital Photo Backlight Correction Service | aaaaaaaa.bbb.com | |

(Blank Cells="−1")

FIG.52B

```
<?xml version="1.0" encoding="Shift-Jis"?>
<ServiceList>
 <Service>
  <Location>service.trans-en2jp.xxx.com</Location>
  <Title>English-Japanese Document Translation Service</Title>
 </Service>
 <Service>
  <Location>service.thumbnail.zzz.com</Location>
  <Title>Thumbnailing Service</Title>
 </Service>
 <Service>
  <Location>service.trans-en2fr.xxx.co.JP</Location>
  <Title>English-French Document Translation Service</Title>
 </Service>
 <Service>
  <Location>www.spellcheck.co.jp</Location>
  <Title>English Document Spellcheck Service</Title>
 </Service>
</ServiceList>
```

| Tag Name | Data | Value | Remarks |
|---|---|---|---|
| FeatureData | Config, Condition, TargetData | | Defining service search data |
| Config | Language, Area | | Defining setting information of device |
| Language | | jpn, eng, frn | Language: Japanese, English, French |
| Area | | jp, us, fr | Area of installation: Japane, US, French |
| Condition | ADF, MPTray, MPTraySize, DefaultTraySize | | Defining condition information on device (e.g. sensor information) |
| ADF | | ON, OFF | ON: Document is set on ADF OFF: No document is set on ADF |
| MPTraySize | | A4, A5, letter, postcard | Size of paper set on MP Tray:A4,A5,letter,postcard |
| DefaultTraySize | | A4, A5, letter, postcard | Size of Default Tray:A4,A5,letter,postcard |
| PhoneHook | | ON, OFF | ON: Handset is on OFF: Handset is off |
| TargetData | TargetDataType, Binary | | (Part of)data as target of process |
| TargetDataType | | Voice, Image, photo, unknown | Data type:voice, scanned image,digital photo,unknown |
| TargetNum | | Interer | The number of selected digital photos in the case of "photo" |
| Data | | | (Part of)main data as target of process |

FIG.58

| | English-Japanese Document Translation Service | Japanese-English Document Translation Service | English-French Document Translation Service | French-English Document Translation Service | Japanese-French Document Translation Service | French-Japanese Document Translation Service | English Document Spellcheck Service | Japanese Document Summarization Service | Thumbnailing Service | English Voice-Japanese Translation Service | English Voice Dictation Service | Panoramic Photo Service | Digital Photo Camera Shake Correction Service | Digital Photo Backlight Correction Service |
|---|---|---|---|---|---|---|---|---|---|---|---|---|---|---|
| All | ○ | ○ | ○ | ○ | ○ | ○ | ○ | ○ | ○ | ○ | ○ | ○ | ○ | ○ |
| for French-speaking Countries | - | - | ○ | ○ | - | ○ | - | - | - | - | - | - | - | - |
| for Japanese-speaking Countries | ○ | ○ | - | - | ○ | ○ | - | ○ | - | ○ | - | - | - | - |
| for English-speaking Countries | ○ | ○ | ○ | ○ | - | - | ○ | - | - | ○ | ○ | - | - | - |
| for Postcard Printing | - | - | - | - | - | - | - | - | - | - | - | - | ○ | ○ |
| for Digital Photo | | | | | | | | | ○ | | | ○ | ○ | ○ |
| for Voice | | | | | | | | | | ○ | ○ | | | |
| for French Document | | | | ○ | | ○ | | | - | | | | | |
| for Japanese Document | | ○ | | | ○ | | | ○ | - | | | | | |
| for English Document | ○ | | ○ | | | | ○ | | - | | | | | |
| for Multiple-sheet Document | - | - | - | - | - | - | - | ○ | ○ | | | | | |
| for Single-sheet Document | - | - | - | - | - | - | - | | | | | | | |
| Service for Scanned Image | - | - | - | - | - | - | - | - | | | | | | |
| URL | service.trans-en2jp.xxx.com | service.trans-jp2en.xxx.com | service.trans-en2fr.xxx.com | service.trans-fr2en.xxx.com | service.trans-jp2fr.xxx.com | service.trans-fr2jp.xxx.com | www.spellcheck.co.jp | www.yyy.co.jp | service.thumbnail.zzz.com | voicetrans.aaa.com | voice2text.aaa.com | foobar.bbb.com | hogehoge.bbb.com | aaaaaaaa.bbb.com |

| Meanings of Symbols | |
|---|---|
| ○ | Relevant Service |
| - | Irrelevant |
| (blank) | Unclear |

FIG.59

| Title | URL | Status |
|---|---|---|
| English-Japanese Document Translation Service | service.trans-en2jp.xxx.com | ○ |
| Japanese-English Document Translation Service | service.trans-jp2en.xxx.com | ○ |
| English-French Document Translation Service | service.trans-en2fr.xxx.com | ○ |
| French-English Document Translation Service | service.trans-fr2en.xxx.com | ○ |
| Japanese-French Document Translation Service | service.trans-en2fr.xxx.com | ○ |
| French-Japanese Document Translation Service | service.trans-fr2en.xxx.com | ○ |
| English Document Spellcheck Service | www.spellcheck.co.jp | ○ |
| Japanese Document Summarization Service | www.yyy.co.jp | ○ |
| Thumbnailing Service | service.thumbnail.zzz.com | ○ |
| English Voice-Japanese Translation Service | voicetrans.aaa.com | ○ |
| English Voice Dictation Service | voice2text.aaa.com | ○ |
| Panoramic Photo Service | foobar.bbb.com | ○ |
| Digital Photo Camera Shake Correction Service | hogehoge.bbb.com | ○ |
| Digital Photo Backlight Correction Service | aaaaaaaa.bbb.com | ○ |

FIG.64C

```
<?xml version="1.0" encoding="Shift-Jis"?>
<FeatureData>
  <Config>
    <Language>jpn</Language>
    <Area>jp</Area>
  </Config>
  <Condition>
    <ADF>ON</ADF>
    <DefaultTraySize>A4</DefaultTraySize>
  </Condition>
  <TargetData>
    <TargetDataType>unknown</TargetDataType>
  </TargetData>
</FeatureData>
```

FIG.64A

Suitable Service Search-14 Service found
1. English-Japanese Document Translation Service
2. Japanese-English Document Translation Service
3. English-French Document Translation Service
4. French-English Document Translation Service

```
<?xml version="1.0" encoding="Shift-Jis"?>
<FeatureData>
  <Config>
    <Language>jpn</Language>
    <Area>jp</Area>
  </Config>
  <Condition>
    <ADF>ON</ADF>
    <DefaultTraySize>A4</DefaultTraySize>
  </Condition>
  <TargetData>
    <TargetDataType>image</TargetDataType>
    <Data>0154da8264...</Data>
  </TargetData>
</FeatureData>
```

FIG. 65C

| Title | URL | Status |
|---|---|---|
| English-Japanese Document Translation Service | service.trans-en2jp.xxx.com | ○ |
| Japanese-English Document Translation Service | service.trans-jp2en.xxx.com | ○ |
| English-French Document Translation Service | service.trans-en2fr.xxx.com | — |
| French-English Document Translation Service | service.trans-fr2en.xxx.com | — |
| Japanese-French Document Translation Service | service.trans-en2fr.xxx.com | ○ |
| French-Japanese Document Translation Service | service.trans-fr2en.xxx.com | ○ |
| English Document Spellcheck Service | www.spellcheck.co.jp | — |
| Japanese Document Summarization Service | www.yyy.co.jp | ○ |
| Thumbnailing Service | service.thumbnail.zzz.com | ○ |
| English Voice-Japanese Translation Service | voicetrans.aaa.com | |
| English Voice Dictation Service | voice2text.aaa.com | |
| Panoramic Photo Service | foobar.bbb.com | |
| Digital Photo Camera Shake Correction Service | hogehoge.bbb.com | |
| Digital Photo Backlight Correction Service | aaaaaaaa.bbb.com | |

FIG. 65B

Suitable Service Search-6 Service found
1. English-Japanese Document Translation Service
2. Japanese-English Document Translation Service
3. Japanese-French Document Translation Service
4. French-Japanese Document Translation Service

FIG. 66A

```
<?xml version="1.0" encoding="Shift-Jis"?>
<FeatureData>
  <Config>
    <Language>jpn</Language>
    <Area>jp</Area>
  </Config>
  <Condition>
    <ADF>ON</ADF>
    <DefaultTraySize>A4</DefaultTraySize>
  </Condition>
  <TargetData>
    <TargetDataType>image</TargetDataType>
    <Data>jsdfakt;fjeo;....</Data>
  </TargetData>
</FeatureData>
```

FIG. 66C

| Title | URL | Status |
|---|---|---|
| English-Japanese Document Translation Service | service.trans-en2jp.xxx.com | ○ |
| Japanese-English Document Translation Service | service.trans-jp2en.xxx.com | ○ |
| English-French Document Translation Service | service.trans-en2fr.xxx.com | |
| French-English Document Translation Service | service.trans-fr2en.xxx.com | |
| Japanese-French Document Translation Service | service.trans-en2fr.xxx.com | ○ |
| French-Japanese Document Translation Service | service.trans-fr2en.xxx.com | |
| English Document Spellcheck Service | www.spellcheck.co.jp | ○ |
| Japanese Document Summarization Service | www.yyy.co.jp | |
| Thumbnailing Service | service.thumbnail.zzz.com | |
| English Voice-Japanese Translation Service | voicetrans.aaa.com | |
| English Voice Dictation Service | voice2text.aaa.com | |
| Panoramic Photo Service | foobar.bbb.com | |
| Digital Photo Camera Shake Correction Service | hogehoge.bbb.com | |
| Digital Photo Backlight Correction Service | aaaaaaaa.bbb.com | |

FIG. 66B

Suitable Service Search-4 Service found ◁ ▶

1. English-Japanese Document Translation Service
2. English-French Document Translation Service
3. English Document Spellcheck Service

IMAGE PROCESSING SYSTEM, IMAGE PROCESSING DEVICE, SERVER AND PROGRAM

INCORPORATION BY REFERENCE

This application claims priority to Japanese Patent Application No. 2004-322945, filed on Nov. 5, 2004. The entire subject matter of the application is incorporated herein by reference thereto.

BACKGROUND

1. Technical Field

Aspects of the present invention relates to an image processing system for executing processes regarding images, an image processing device and a server forming the image processing system, and a program for implementing processes executed by the server.

2. Related Art

A system including a digital copier and a host computer connected to the digital copier via a network and provided with functions that the digital copier does not have has been proposed in Japanese Patent Provisional Publication No. HEI 09-238215.

In JP HEI 09-238215, the digital copier transmits bit data (containing command codes for control, image data (density data), etc.) to the host computer. The host computer receiving the bit data analyzes the received command codes and thereby executes image processing on the image data according to image editing functions that have been specified for the image data. The image data processed by the host computer as above is returned to the digital copier and printed by the digital copier.

In the above system, when one or more new functions are added to the host computer, information on the new functions is sent from the host computer to the digital copier. The digital copier receiving the information lets a user select some of the new functions that should be registered in the digital copier, that is, some or the new functions that the user hopes to use. In short, the user of the system is allowed to use some of the new functions by registering the desired functions in the digital copier.

However, the above system is unsuitable for environments in which the number of services randomly increases and decreases from day to day (like general servers on the Internet).

Specifically, since each function added to the host computer becomes available to the user when the user registers the function in the digital copier in the system explained above, in environments (like general servers on the Internet) in which various types of services are added and removed frequently, the user has to conduct the registration of functions in the digital copier very often, with a swelling amount of information to be registered.

Especially in such environments with various types of services added and removed frequently, the task of selecting a necessary service becomes more and more troublesome to the user as the number or variety of services increases. Therefore, a system capable of letting the user find a necessary service easily and efficiently has been desired.

SUMMARY

Aspects of the present invention are advantageous in that an image processing system, allowing a user to find a necessary service easily and efficiently, can be provided.

BRIEF DESCRIPTION OF THE ACCOMPANYING DRAWINGS

FIG. 2 is a schematic diagram showing an operation panel of an MFP (Multi Function Peripheral) in the image processing system in accordance with aspects of the invention.

FIG. 3 is an explanatory drawing showing an example of data structure of top service definition information in accordance with aspects of the invention.

FIG. 4 is an explanatory drawing showing an example of data structure of service definition information regarding a copy application service in accordance with aspects of the invention.

FIG. 5 is a table indicating definitions of tags which are used in the service definition information in accordance with aspects of the invention.

FIGS. 7 to 9 are explanatory drawings showing an example of data structure of service I/F information corresponding to a translation copy service in accordance with aspects of the invention.

FIG. 10 is a table indicating definitions of tags which are used in the service I/F information in accordance with aspects of the invention.

FIG. 15 is a table showing a data format used in service search data in accordance with aspects of the invention.

FIGS. 16A and 16B are explanatory drawings showing concrete examples of the service search data in accordance with aspects of the invention.

FIG. 17 is a table showing a service definition information table stored in a storage unit of the directory server in accordance with aspects of the invention.

FIG. 18 is a table showing an example of a service presentation list in accordance with aspects of the invention.

FIG. 19A is a table showing a data format used in the service list in accordance with aspects of the invention.

FIG. 19B is an explanatory drawing showing a concrete example of the service list in accordance with aspects of the invention.

FIGS. 20 and 21 are flowcharts showing an MFP process which is executed by a control unit of the MFP in accordance with aspects of the invention.

FIGS. 45A to 45F are schematic diagrams showing screens displayed on the operation panel of the MFP in a first embodiment according to the present invention.

FIG. 46A is an explanatory drawing showing an example of the service search data generated by the MFP in the first embodiment.

FIG. 46B is an explanatory drawing showing an example of the service list generated by the directory server in the first embodiment.

FIG. 47 is a table showing an example of the service presentation list used by the directory server in the first embodiment.

FIG. 48 is a table showing a service definition information table employed in a second embodiment according to the present invention;

FIG. 49 is a table showing an example of the service presentation list used by the directory server in the second embodiment.

FIG. 52A is a table showing an example of the service presentation list used by the directory server in the second embodiment.

FIG. 52B is an explanatory drawing showing an example of the service list generated by the directory server in the second embodiment.

FIG. 58 is a table showing a data format used in the service search data in the fourth embodiment.

FIG. 59 is a table showing a service definition information table stored in the storage unit of the directory server in the fourth embodiment.

FIG. 64A is an explanatory drawing showing an example (No. 1) of the service search data generated by the MFP in the fourth embodiment.

FIG. 64B is a schematic diagram showing an example (No. 1) of a screen displayed on the operation panel in the fourth embodiment.

FIG. 64C is a table showing an example (No. 1) of the service presentation list in the fourth embodiment.

FIG. 65A is an explanatory drawing showing an example (No. 2) of the service search data generated by the MFP in the fourth embodiment.

FIG. 65B is a schematic diagram showing an example (No. 2) of a screen displayed on the operation panel in the fourth embodiment.

FIG. 65C is a table showing an example (No. 2) of the service presentation list in the fourth embodiment.

FIG. 66A is an explanatory drawing showing an example (No. 3) of the service search data generated by the MFP in the fourth embodiment.

FIG. 66B is a schematic diagram showing an example (No. 3) of a screen displayed on the operation panel in the fourth embodiment.

FIG. 66C is a table showing an example (No. 3) of the service presentation list in the fourth embodiment.

DETAILED DESCRIPTION

General Overview

Figure 1:
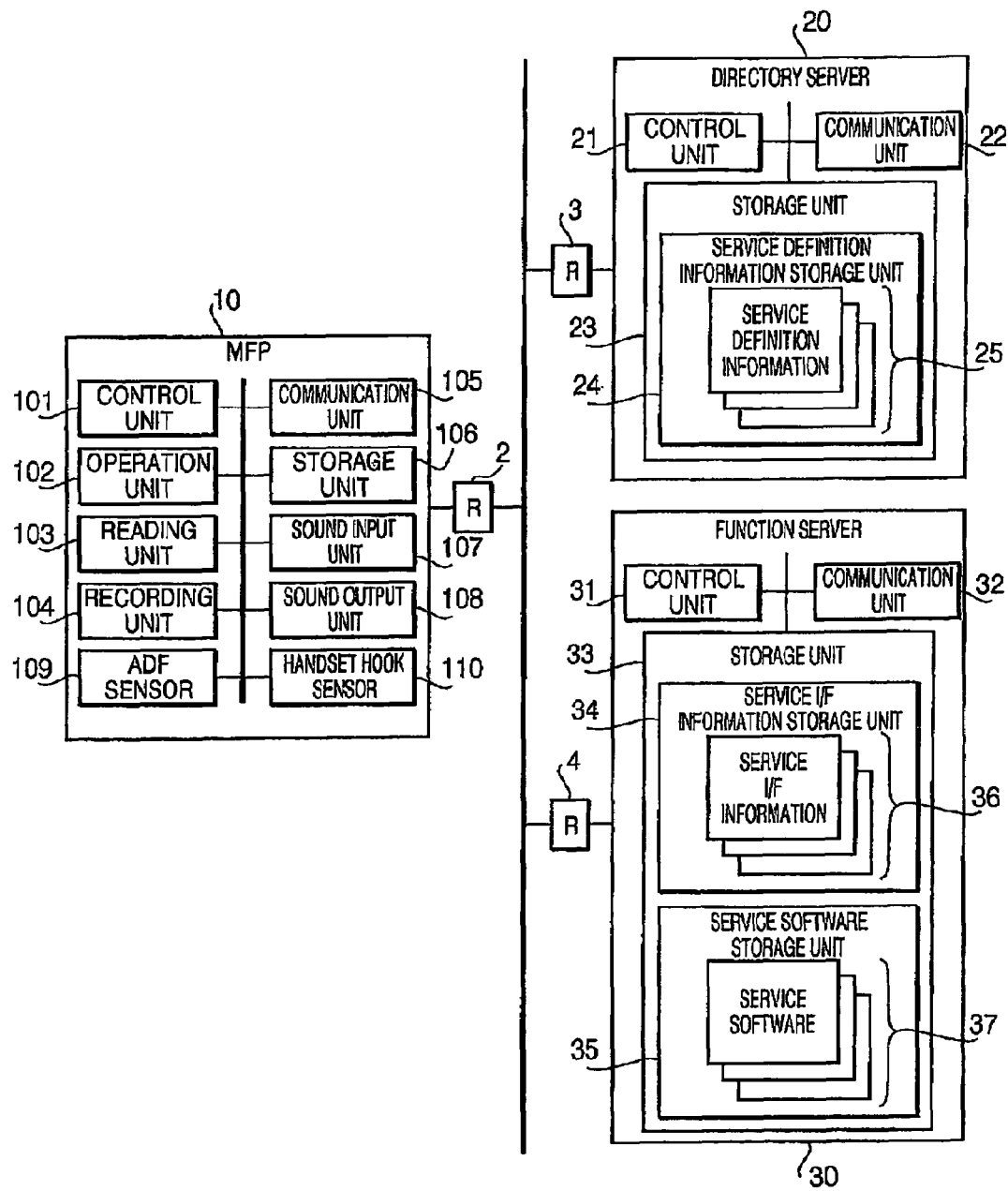
FIG. 1 is a block diagram showing the overall composition of an image processing system in accordance with aspects of the invention.

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

In accordance with an aspect of the present invention, there is provided an image processing system comprising: an image processing device including at least one of an image reading unit which reads an image and thereby generates image data representing the image and an image printing unit which prints out an image represented by image data; a service supply unit capable of executing a service regarding at least one of image data generated by the image reading unit and image data representing an image to be printed out by the image printing unit, in response to a request from the image processing device; and an information supply unit which supplies the image processing device with information on services executable by the service supply unit. In the image processing system, the image processing device includes: a service search data transmission unit which transmits service search data (containing one or more pieces of information selected from one or more pieces of information regarding settings of the image processing device which are stored in the image processing device, one or more pieces of information indicating status of the image processing device detected in each part of the image processing device, one or more pieces of information indicating operations that the image processing device has received from a user, and one or more pieces of information to be transmitted from the image processing device and handed over to the service supply unit when a service is executed) to the information supply unit; a service determination unit which presents the information on services transmitted from the information supply unit to the user, lets the user select a service from the presented information, and determines the selected service as a service to be requested from the service supply unit; and a slice requesting unit which requests the service supply unit to execute the service determined by the service determination unit. The information supply unit includes: a service search data reception unit which receives the service search data transmitted from the image processing device; a presumption unit which presumes a probability that the image processing device requests the service supply unit to execute each of the services executable by the service supply unit based on the service search data received by the service search data reception unit and according to prescribed presumption rules; and a list supply unit which supplies the image processing device with one of a list generated by extracting services likely to be requested by the image processing device from the service supply unit from all the services executable by the service supply unit and a list generated by sorting the services executable by the service supply unit according to the probability that the image processing device requests the service supply unit to execute each of the services based on presumption result by the presumption unit, as the information on services executable by the service supply unit.

In the above image processing system, the "image processing device" can be an image printing device (e.g. printer), an image reading device (e.g. scanner), a facsimile machine or an MFP (Multi Function Peripheral) having such functions, for example. The "service regarding image data generated by the image reading unit" may include a process of modifying or processing an image represented by the image data generated by the image reading unit (scaling up/down, reversal, translation, etc.), a process of converting text contained in the image represented by the image data to voice, a process of storing the image data in a storage unit (e.g. server) which is provided separately from the image processing device, etc. The "service regarding image data representing an image to be printed out by the image printing unit" may include a process of modifying or processing the image data to be printed out by the image printing unit (scaling up/down, reversal, translation, etc.), a process of converting voice into an image of a text represented by the voice, a process of converting information existing on the Internet satisfying a designated condition to a print image, etc. Meanwhile, the "service supply unit" can be implemented by a server on a network, for example. In this case, the service supply unit may either be implemented by a single server or a plurality of servers. The "information supply unit" can also be implemented by one or more servers on the network, for example. The "information on services executable by the service supply unit" which is supplied by the information supply unit to the image processing device may include, for example, the names of the services, information on the contents of the services, and destination addresses (e.g. URLs (Uniform Resource Locators)) to be used for transmitting the requests for the services.

In the image processing device of the image processing system configured as above, the service search data transmission unit transmits the service search data to the information supply unit The service search data is generated by combining one or more pieces of information selected from:

(1) one or more pieces of information regarding the settings of the image processing device (the language used in the image processing device, the area of installation of the image processing device, etc.) which are stored in the image processing device (2) one or more pieces of information indicating the status of the image processing device (the size of a sheet that has been set, whether an ADF (Automatic Document Feeder) is used or not, etc.) detected in each part of the image processing device (3) one or more pieces of information indicating operations (key operations, the lifting of a handset, etc.) that the image processing device has received from a user (4) one or more pieces of information (image data generated by scanning, sound data, photo data, etc.) to be transmitted from the image processing device and handed over to the service supply unit when a service is executed Meanwhile, in the information supply unit, the service search data reception unit receives the service search data transmitted from the image processing device. The presumption unit presumes the probability that the image processing device requests the service supply unit to execute each of the services executable by the service supply unit, based on the service search data received by the service search data reception unit and according to prescribed presumption rules. The list supply unit supplies the image processing device with one of a list generated by extracting services likely to be requested by the image processing device from the service supply unit from all the services executable by the service supply unit based on presumption result by the presumption unit and a list generated by sorting the services executable by the service supply unit according to the probability that the image processing device requests the service supply unit to execute each of the services, as the "information on services executable by the service supply unit".

In the image processing device, the service determination unit presents the information on services transmitted from the information supply unit to the user, lets the user select a service from the presented information, and determines the selected service as a service to be requested from the service supply unit. The service requesting unit requests the service supply unit to execute the service determined by the service determination unit.

The service supply unit executes the service requested by the image processing device (regarding at least one of image data generated by the image reading unit and image data representing an image to be printed out by the image printing unit) in response to the request from the image processing device.

With the image processing system configured as above, the user, selecting a service based on a list presented by the image processing device, is presented with the "list generated by extracting services likely to be requested by the image processing device" or the "list generated by sorting the services executable by the service supply unit according to the probability that the image processing device requests the service supply unit to execute each of the services", by which the number of services presented to the user can be reduced considerably compared to cases where a "list including all the services executable by the service supply unit" is presented to the user. In cases where the list is one having tree structure, the hierarchy of the list can be made less extensive due to the reduction of the number of services.

Therefore, the user is allowed to find a desired service easily and efficiently. While a simple reduction of the number of services presented to the user might cause suitable services (likely to be selected by the user) to be excluded from the list or cause unsuitable services (unlikely to be selected by the user) to be included in the list, the credibility of the list (supposed to include services likely to be selected by the user) is kept high in the present invention by letting the information supply unit presume services having high probability of being selected by the user based on the service search data supplied from the image processing device.

Preferably, the image processing system further comprises a relevance information storage unit which stores relevance information indicating the degree of relevance between each of n types of services executable by the service supply unit (n: positive integer) and each of m types of attributes (m: positive integer) which is relevant to at least a type of service, regarding all (n×m) combinations. The presumption unit extracts one or more services having high relevance to the service search data received by the service search data reception unit by referring to the relevance information stored in the relevance information storage unit based on at least one of the attributes of the service search data and presumes the extracted services to be the services likely to be requested by the image processing device from the service supply unit.

The above image processing system is provided with the relevance information storage unit which stores (n×m) pieces of relevance information. The relevance information storage unit to be referred to by the presumption unit may be implemented as, for example, a storage area capable or storing (n×m) array data reserved in a memory of a server functioning as the presumption unit, or as a storage area capable of storing (n×m) array data reserved in a memory of a server other than the server functioning as the presumption unit so that the contents of the relevance information storage unit (relevance information) can be referred to or obtained by the server functioning as the presumption unit by transmitting an inquiry designating each array element.

As the relevance information, the relevance information storage unit stores (n×m) pieces of relevance information corresponding to exhaustive combinations of the n types of services executable by the service supply unit and the m types of attributes each of which is relevant to at least a type of service. While concrete examples of the attributes will be described in detail later in the description of embodiments, to take a few examples for the understanding of the attributes, a "service A supposed to be used only in Japanese-speaking countries in most cases" is presumed to be highly relevant to an attribute "for Japanese-speaking Countries" and a "service B necessarily using voice data" is presumed to be highly relevant to an attribute "for Voice". There are m types of attributes like "for Japanese-speaking Countries" and "for Voice" and n types of services like "service A" and "service B", and (n×m) pieces of relevance information such as relevance information between the service A and the attribute "for Japanese-speaking Countries", relevance information between the service B and the attribute "for Japanese-speaking Countries", . . . , relevance information between the service A and the attribute "for Voice", relevance information between the service B and the attribute "for Voice", . . . are stored in the relevance information storage unit.

Meanwhile, the service search data does not necessarily have all the m types of attributes but has at least one of the m types of attributes. The number of types of attributes the service search data has varies depending on the settings, status and user operation status of the image processing device, data handed over to the service supply unit, etc.

With the above configuration, the presumption unit can extract one or more services having high relevance to the service search data received by the service search data reception unit by referring to the relevance information stored in the relevance information storage unit based on at least one of the attributes of the service search data and presume the extracted services to be the services likely to be requested by the image processing device from the service supply unit.

Therefore, a list generated based on the presumption result can be supplied to the image processing device and the user of the image processing device presented with the list is allowed to find and select a desired service easily and efficiently.

In a preferred embodiment, each of the (n×m) pieces of relevance information stored in the relevance information storage unit is information indicating one of "relevant", "irrelevant" and "unclear". The presumption unit refers to (n×k) pieces of relevance information corresponding to k types of attributes (k: positive integer, k≦m) of the service search data received by the service search data reception unit out of the (n×m) pieces of relevance information stored in the relevance information storage unit, extracts services having at least one attribute giving the relevance information "relevant" and having no attribute giving the relevance information "irrelevant" from the n types of services, and presumes the extracted services to be the services likely to be requested by the image processing device from the service supply unit.

In the above image processing system, since the relevance information stored in the relevance information storage unit indicates one of "relevant", "irrelevant" and "unclear", the presumption unit can extract services having at least one attribute giving the relevance information "relevant" and having no attribute giving the relevance information "irrelevant" from the n types of services and presume the extracted services to be the services likely to be requested by the image processing device from the service supply unit. With such a presumption technique, services having an attribute giving the relevance information "irrelevant" can be excluded securely from the list, by which services unlikely to be requested by the image processing device from the service supply unit can be removed from the list.

In the image processing system in accordance with the present invention, the relevance information stored in the relevance information storage unit may also be information of a different type as below.

In a preferred embodiment, each of the (n×m) pieces of relevance information stored in the relevance information storage unit is information selected from numerical information indicating a level of relevance and information indicating "irrelevant". The presumption unit refers to (n×k) pieces of relevance information corresponding to k types of attributes (k: positive integer, k≦m) of the service search data received by the service search data reception unit out of the (n×m) pieces of relevance information stored in the relevance information storage unit, extracts services having no attribute giving the relevance information "irrelevant" from the n types of services, calculates the sum or product of values of the numerical information regarding each of the extracted services, and presumes the services likely to be requested by the image processing device from the service supply unit based on the sum or product.

Also in the above image processing system, the presumption unit can extract services having no attribute giving the relevance information "irrelevant" from the n types of services and thereby securely exclude services having an attribute giving the relevance information "irrelevant" from the list since the relevance information stored in the relevance information storage unit is numerical information indicating the level of relevance or information indicating "irrelevant". Further, regarding the services remaining in the list, the presumption unit calculates the sum or product of the values of the numerical information and presumes the services likely to be requested by the image processing device from the service supply unit based on the sum or product. Therefore, the probability that the image processing device requests the service supply unit to execute each of the services can be rated numerically and the services likely to be requested can be sorted according to the rating.

For the numerical rating, either the sum or product of the values of the numerical information can be used. As for the relationship between the numerical information and the rating (priority in the list), the values of the numerical information may either be defined so that the priority of a service will get higher as the value gets larger or smaller. In the former case, a service is regarded to have higher (total) priority as the sum or product gets larger. In the latter case, a service is regarded to have higher (total) priority as the sum or product gets smaller.

In a preferred embodiment, the information supply unit includes a transfer data transmission unit which transmits part of data necessary for the service supply unit to execute the service, contained in the service search data received by the service search data reception unit, to the service supply unit as transfer data. The image processing device includes a difference data transmission unit which transmits data obtained by excluding part of the service search data corresponding to the transfer data from the data necessary for the service supply unit to execute the service to the service supply unit as difference data. The service supply unit includes: a transfer data reception unit which receives the transfer data transmitted from the transfer data transmission unit of the information supply unit; and a difference data reception unit which receives the difference data transmitted from the difference data transmission unit of the image processing device.

In the above image processing system, the transfer data transmission unit of the information supply unit transmits "part of data necessary for the service supply unit to execute a service" (contained in the service search data received by the service search data reception unit) to the service supply unit as "transfer data", and the difference data transmission unit of the image processing device transmits "difference data" (obtained by excluding part of the service search data corresponding to the transfer data from the data necessary for the service supply unit to execute the service) to the service supply unit. Therefore, the image processing device is relieved of the need of transmitting the "part of the service search data corresponding to the transfer data" (i.e. the "part of data necessary for the service supply unit to execute a service") to the service supply unit, by which the load on the image processing device can be reduced. In cases where the functions of the information supply unit and the service supply unit are implemented by a single server, the transfer data can be transferred from the information supply unit to the service supply unit by an intra-server data transfer process (e.g. data transfer via a shared memory), by which the load on the network outside the server can also be lightened.

While the transfer data has to be transferred from the information supply unit to the service supply unit via the network in cases where the functions of the information supply unit and the service supply unit are implemented by separate servers, a data transfer request (requesting the starting of the data transfer) may be issued either by the information supply unit or the service supply unit since both the information supply unit and the service supply unit are capable of recognizing that such data transfer has become necessary based on access made by the image processing device.

In a preferred embodiment, the service search data transmission unit of the image processing device transmits the service search data to the information supply unit a plurality of times. In the information supply unit, the service search data reception unit receives the service search data each time it is transmitted from the image processing device. The presumption unit presumes the probability (that the image processing device requests the service supply unit to execute each of the services executable by the service supply unit) on each reception of service search data by the service search data reception unit, based on the service search data including newly received data or updated with the newly received data and according to the presumption rules. The list supply unit supplies the image processing device with one of the lists (the list generated by extracting services likely to be requested by the image processing device from the service supply unit from all the services executable by the service supply unit or the list generated by sorting the services executable by the service supply unit according to the probability that the image processing device requests the service supply unit to execute each of the services) as the information on services executable by the service supply unit, based on new presumption result each time new presumption result is obtained by the presumption unit.

In the above image processing system, the service search data is transmitted from the image processing device to the information supply unit a plurality of times. The presumption unit of the information supply unit presumes the probability that the image processing device requests the service supply unit to execute each of the services executable by the service supply unit, on each reception of service search data by the service search data reception unit based on the service search data including newly received data or updated with the newly received data and according to the presumption rules.

Therefore, the presumption unit can successively make the presumption with increased accuracy based on the service search data including newly received data or updated with the newly received data, by which suitable services (services having high probabilities of being requested by the image processing device from the service supply unit) can be narrowed down gradually while leaving services of higher probabilities in the list.

While the suitable services narrowed down as above are successively presented to the user, the process for actually narrowing down the services and the process for presenting the reduced number of services to the user may either be executed synchronously or asynchronously. In cases where the process for narrowing down the services takes little time, it is preferable that the process for presenting the services be delayed properly or executed in response to a prescribed operation by the user (asynchronously) in order to avoid excessive search refinement against the user's intention.

Specifically, the service determination unit of the image processing device may be configured to present the information on services to the user based on the list newly supplied from the list supply unit when a prescribed time period has passed since the reception of the previous list. In this case, the latest (updated) version of the information on services is presented to the user periodically (when a prescribed time period has passed since the reception of the previous list) with no need of an operation by the user.

The service determination unit may also be configured to present the information on services to the user based on the list newly supplied from the list supply unit when a prescribed operation is received from the user. In this case, the latest (updated) version of the information on services is presented to the user when a prescribed operation (e.g. an operation for requesting the update of the information) is performed by the user.

The service determination unit may also be configured to present the information on services to the user based on the list newly supplied from the list supply unit when a prescribed time period has passed since the last operation by the user. In this case, the latest (updated) version of the information on services is presented to the user when a no-operation state (with no operation by the user) continues for a prescribed time period.

Further, the service search data transmission unit of the image processing device may be configured to stop the transmission of the service search data to the information supply unit when the number of services contained in the list newly supplied from the list supply unit has reduced to a prescribed number or less. With such a configuration, when the number of services contained in the list has reduced to prescribed number or less, the transmission of the service search data is stopped and accordingly the supply of the list is also stopped, by which the load on the network and the information supply unit can be reduced.

In accordance with another aspect of the present invention, there is provided an image processing device comprising at least one of an image reading unit which reads an image and thereby generates image data representing the image and an image printing unit which prints out an image represented by image data, capable of forming an image processing system in cooperation with a service supply unit capable of executing a service regarding at least one of image data generated by the image reading unit and image data representing an image to be printed out by the image printing unit in response to a request from the image processing device; and an information supply unit which supplies the image processing device with information on services executable by the service supply unit. The image processing device comprises: a service search data transmission unit which transmits service search data to the information supply unit, the service search data containing one or more pieces of information selected from one or more pieces of information regarding settings of the image processing device which are stored in the image processing device, one or more pieces of information indicating status of the image processing device detected in each part of the image processing device, one or more pieces of information indicating operations that the image processing device has received from a user, and one or more pieces of information to be transmitted from the image processing device and handed over to the service supply unit when a service is executed; a service determination unit which presents the information on services transmitted from the information supply unit in response to the service search data to the user, lets the user select a service from the presented information, and determines the selected service as a service to be requested from the service supply unit, and a service requesting unit which requests the service supply unit to execute the service determined by the service determination unit.

With the above image processing device, the image processing system in accordance with the present invention can be formed in cooperation with the service supply unit and the information supply unit, by which effects described above can be achieved.

In accordance with another aspect of the present invention, there is provided a server capable of forming an image processing system in cooperation with an image processing device including at least one of an image reading unit which reads an image and thereby generates image data representing the image and an image printing unit which prints out an image represented by image data; and a service supply unit capable of executing a service regarding at least one of image data generated by the image reading unit and image data representing an image to be printed out by the image printing unit in response to a request from the image processing device. The server comprises an information supply unit which supplies the image processing device with information on services executable by the service supply unit. The information supply unit includes: a service search data reception unit which receives service search data transmitted from the image processing device, the service search data containing one or more pieces of information selected from one or more pieces of information regarding settings of the image processing device which are stored in the image processing device, one or more pieces of information indicating status of the image processing device detected in each part of the image processing device, one or more pieces of information indicating operations that the image processing device has received from a user, and one or more pieces of information to be transmitted from the image processing device and handed over to the service supply unit when a service is executed; a presumption unit which presumes a probability that the image processing device requests the service supply unit to execute each of the services executable by the service supply unit based on the service search data received by the service search data reception unit and according to prescribed presumption rules; and a list supply unit which supplies the image processing device with one of a list generated by extracting services likely to be requested by the image processing device from the service supply unit from all the services executable by the service supply unit and a list generated by sorting the services executable by the service supply unit according to the probability that the image processing device requests the service supply unit to execute each of the services based on presumption result by the presumption unit, as the information on services executable by the service supply unit.

With the above server, the image processing system in accordance with the present invention can be formed in cooperation with the image processing device and the service supply unit, by which effects described above can be achieved.

Preferably, the information supply unit further includes a relevance information storage unit which stores relevance information indicating the degree of relevance between each of n types of services executable by the service supply unit (n: positive integer) and each of m types of attributes (m: positive integer) which is relevant to at least a type of service, regarding all (n×m) combinations. The presumption unit extracts one or more services having high relevance to the service search data received by the service search data reception unit by referring to the relevance information stored in the relevance information storage unit based on at least one of the attributes of the service search data and presumes the extracted services to be the services likely to be requested by the image processing device from the service supply unit.

Preferably, each of the (n×m) pieces of relevance information stored in the relevance information storage unit is information indicating one of "relevant", "irrelevant" and "unclear". The presumption unit refers to (n×k) pieces of relevance information corresponding to k types of attributes (k: positive integer, k≦m) of the service search data received by the service search data reception unit out of the (n×m) pieces of relevance information stored in the relevance information storage unit, extracts services having at least one attribute giving the relevance information "relevant" and having no attribute giving the relevance information "irrelevant" from the n types of services, and presumes the extracted services to be the services likely to be requested by the image processing device from the service supply unit.

Preferably, each of the (n×m) pieces of relevance information stored in the relevance information storage unit is information selected from numerical information indicating a level of relevance and information indicating "irrelevant". The presumption unit refers to (n×k) pieces of relevance information corresponding to k types of attributes (k: positive integer, k≦m) of the service search data received by the service search data reception unit out of the (n×m) pieces of relevance information stored in the relevance information storage unit, extracts services having no attribute giving the relevance information "irrelevant" from the n types of services, calculates the sum or product of values of the numerical information regarding each of the extracted services, and presumes the services likely to be requested by the image processing device from the service supply unit based on the sum or product.

In accordance with another aspect of the present invention, there is provided a computer readable medium having a program comprising computer-readable instructions that cause a computer to function as a server capable of forming an image processing system in cooperation with an image processing device including at least one of an image reading unit which reads an image and thereby generates image data representing the image and an image printing unit which prints out an image represented by image data; and a service supply unit capable of executing a service regarding at least one of image data generated by the image reading unit and image data representing an image to be printed out by the image printing unit in response to a request from the image processing device. The server comprises an information supply unit which supplies the image processing device with information on services executable by the service supply unit. The information supply unit includes: a service search data reception unit which receives service search data transmitted from the image processing device, the service search data containing one or more pieces of information selected from one or more pieces of information regarding settings of the image processing device which are stored in the image processing device, one or more pieces of information indicating status of the image processing device detected in each part of the image processing device, one or more pieces of information indicating operations that the image processing device has received from a user, and one or more pieces of information to be transmitted from the image processing device and handed over to the service supply unit when a service is executed; a presumption unit which presumes a probability that the image processing device requests the service supply unit to execute each of the services executable by the service supply unit based on the service search data received by the service search data reception unit and according to prescribed presumption rules; and a list supply unit which supplies the image processing device with one of a list generated by extracting services likely to be requested by the image processing device from the service supply unit from all the services executable by the service supply unit and a list generated by sorting the services executable by the service supply unit according to the probability that the image processing device requests the service supply unit to execute each of the services based on presumption result by the presumption unit, as the information on services executable by the service supply unit.

With the above computer program instructions, the image processing system in accordance with the present invention can be formed by the server (implemented by the computer program instructions), the image processing device and the service supply unit, by which elects described above can be achieved.

Preferably, the information supply unit further includes a relevance information storage unit which stores relevance information indicating the degree of relevance between each of n types of services executable by the service supply unit (n: positive integer) and each of m types of attributes (m: positive integer) which is relevant to at least a type of service, regarding all (n×m) combinations. The presumption unit extracts one or more services having high relevance to the service search data received by the service search data reception unit by referring to the relevance information stored in the relevance information storage unit based on at least one of the attributes of the service search data and presumes the extracted services to be the services likely to be requested by the image processing device from the service supply unit.

Preferably, each of the (n×m) pieces of relevance information stored in the relevance information storage unit is information indicating one of "relevant", "irrelevant" and "unclear". The presumption unit refers to (n×k) pieces of relevance information corresponding to k types of attributes (k: positive integer, k≦m) of the service search data received by the service search data reception unit out of the (n×m) pieces of relevance information stored in the relevance information storage unit, extracts services having at least one attribute giving the relevance information "relevant" and having no attribute giving the relevance information "irrelevant" from the n types of services, and presumes the extracted services to be the services likely to be requested by the image processing device from the service supply unit.

Preferably, each of the (n×m) pieces of relevance information stored in the relevance information storage unit is information selected from numerical information indicating a level of relevance and information indicating "irrelevant". The presumption unit refers to (n×k) pieces of relevance information corresponding to k types of attributes (k: positive integer, k≦m) of the service search data received by the service search data reception unit out of the (n×m) pieces of relevance information stored in the relevance information storage unit, extracts services having no attribute giving the relevance information "irrelevant" from the n types of services, calculates the sum or product of values of the numerical information regarding each of the extracted services, and presumes the services likely to be requested by the image processing device from the service supply unit based on the sum or product.

ILLUSTRATIVE EMBODIMENTS

Referring now to the drawings, a description will be given in detail of illustrative embodiments in accordance with aspects of the present invention.

Embodiment 1

In the following description, the outline of an image processing system in accordance with an embodiment of the present invention will be explained first and thereafter functions relevant to the principal part of the present invention will be explained.

FIG. 1 is a block diagram showing the overall composition of an image processing system in accordance with an embodiment of the present invention. As shown in FIG. 1, the image processing system includes an MFP (Multi Function Peripheral) 10, a directory server 20 and a function server 30 which are connected together by a network (a WAN (Wide Area Network) such as the Internet in this embodiment) to be capable of bidirectional data communication. Specifically, the MFP 10, the directory server 20 and the function server 30 are connected to the network 1 via routers 2, 3 and 4, respectively. The router 2 connecting the MFP 10 with the network 1 is implemented by a broadband router of a well-known type. In the default setting, ports of the router 2 are all closed. After a connection request is transmitted from inside to outside (i.e. from the MFP 10 to the network 1), the router 2 only lets through packets having consistency as responses to the request. Therefore, out of data transmitted from outside to inside (i.e. from the network 1 to the MFP 10), the router 2 in the default setting lets through responses to requests that have been transmitted from inside to outside, while blocking other packets. As above, the router 2 functions as a firewall for preventing unauthorized access to the MFP 10 via the network 1.

The MFP 10 is provided with various functions such as a telephone (voice communication) function, a scanner function, a printer function, a copy function and a facsimile function. In the image processing system, the MFP 10 is capable of using various types of services related to the above functions via the network 1. Specifically, the function server 30 provided on the network 1 is configured to be able to execute (provide) various types of services related to the functions of the MFP 10 in response to requests from the MFP 10. Further, the directory server 20 provided on the network 1 is configured to be able to provide the MFP 10 with information about services that the MFP 10 can use via the network 1 (information about services that can be executed by the function server 30).

In the following, the composition of the MFP 10, the directory server 20 and the function server 30 will be described in detail.

First, the composition of the MFP 10 will be explained. The MFP 10 includes a control unit 101, an operation unit 102, a reading unit 103, a recording unit 104, a communication unit 105, a storage unit 106, a sound input unit 107, a sound output unit 108, an ADF (Automatic Document Feeder) sensor 109, and a handset hook sensor 110.

The control unit 101, including a CPU (Central Processing Unit), ROM (Read Only Memory), RAM (Random Access Memory), etc. of well-known types (not shown in FIG. 1), manages and controls the components of the MFP 10. The ROM stores a program for letting the CPU execute various processes (FIGS. 20, 22-26) which will be explained later.

The operation unit 102, having an operation panel 102a shown in FIG. 2, receives input operations performed by the user of the MFP 10 while displaying necessary information to the user. Specifically, the operation panel 102a has various keys for receiving the input operations by the user, such as a media key 40, a copy key 41, a scanner key 42, a FAX key 43, a service key 44, a setting key 45, an "Up" key 46, a "Down" key 47, a "Left" key 48, a "Right" key 49, an OK key 50, a cancel key 51 and a "Refresh" key 55. The operation panel 102a is provided with a display 52 as a display unit for displaying a variety of information to the user.

The reading unit 103 (scanner) reads an image from a document which has been set on an ADF (Automatic Document Feeder) or put on contact glass of a flat bed and thereby generates image data representing the image.

The recording unit 104 (printer) records (prints) an image represented by image data on a sheet-like record medium (print medium) such as paper. The communication unit 105 executes processes for transmitting and receiving data via the network 1. The storage unit 106, having a not shown nonvolatile RAM, stores various data in the nonvolatile RAM.

The sound input unit 107 receives sound with a microphone which is installed in a not shown handset of the MFP 10 and thereby generates sound data (e.g. PCM data) representing the sound. The sound output unit 108 outputs sound represented by sound data (e.g. PCM data) from a speaker installed in the not shown handset or a not shown speaker installed in the body of the MFP 10. The ADF sensor 109 is a sensor capable of detecting a document set on the ADF of the reading unit 103. The handset hook sensor 110 is a sensor capable of detecting the lifting of the handset by the user for using the telephone (voice communication) function.

Next, the composition of the directory server 20 will be explained. The directory server 20 includes a control unit 21, a communication unit 22 and a storage unit 23.

The control unit 21 includes a CPU, ROM, RAM, etc. of well-known types (not shown in FIG. 1). An OS (Operating System) and other software stored in the storage unit 23 are read out and loaded on the RAM of the control unit 21. The CPU of the control unit 21 executes various processes according to the software, by which the components of the directory server 20 are controlled.

The communication unit 22 executes processes for transmitting and receiving data via the network 1.

The storage unit 23, having a not shown hard disk, stores various data in the hard disk. Specifically, the storage unit 23 includes a service definition information storage unit 24 for storing service definition information 25.

Figure 6A:
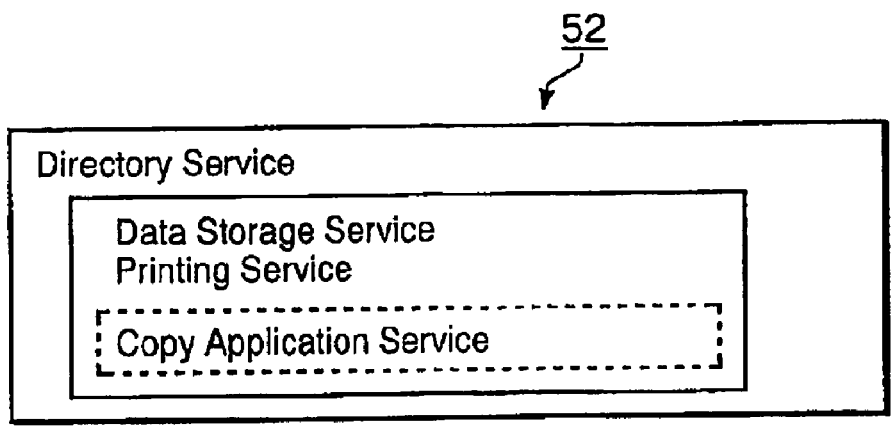
FIGS. 6A to 6C are schematic diagrams showing examples of service selection screens displayed on the operation panel of the MFP in accordance with aspects of the invention.
Figure 6B:
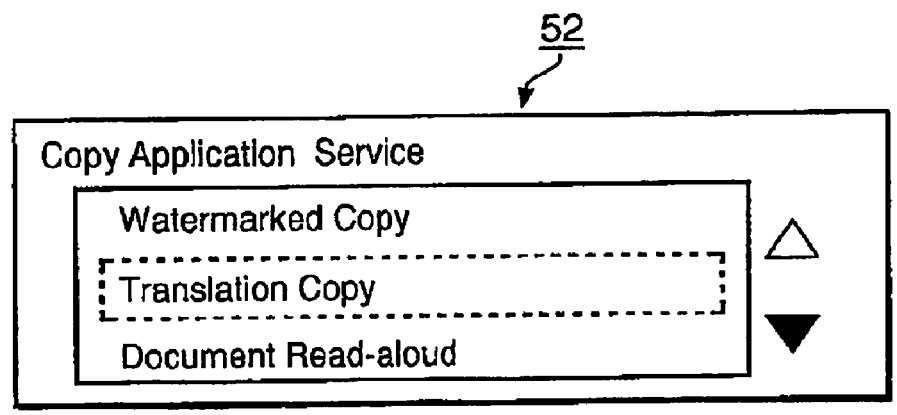
Figure 6C:
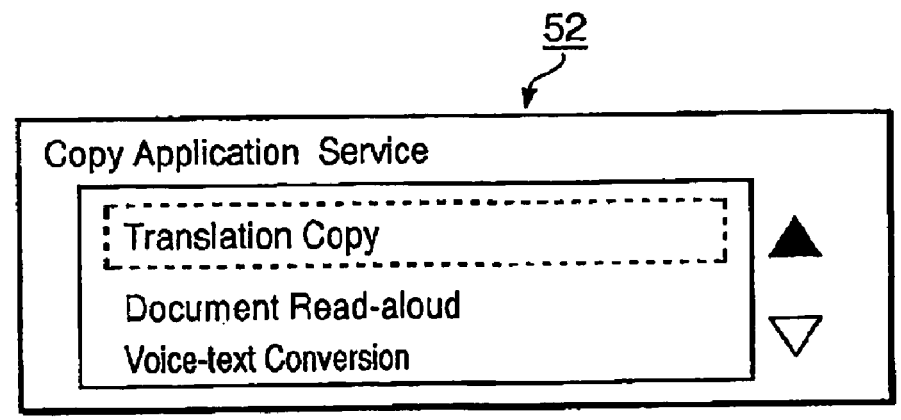

The service definition information 25 is information for informing the MFP 10 about services that the function server 30 can execute (the types of services and destinations of requests for the services). Specifically, the service definition information 25 transmitted from the directory server 20 is received by the MFP 10 and used for displaying a service selection screen (indicating the types of available services) on the display 52 (examples are shown in FIGS. 6A-6C), by which the user of the MFP 10 is prompted to select a service. The directory server 20 manages the services executable by the function server 30 while classifying them into three categories: "data storage service", "printing service" and "copy application service". On the service selection screen, the MFP 10 first displays the three categories to prompt the user to select one category, lets the user select one category, and thereafter displays services contained in the selected category to prompt the user to select one service. The service definition information storage unit 24 stores a piece of service definition information 25 corresponding to a service selection screen for prompting the user to select a category (hereinafter referred to as "top service definition information 25") and a plurality of pieces of service definition information 25 each of which corresponds to a service selection screen for prompting the user to select a service from each category.

Here, concrete examples of the service definition information 25 will be explained referring to FIGS. 3 and 4.

FIGS. 3 and 4 are explanatory drawings showing examples of data structure of the service definition information 25, in which FIG. 3 shows data structure of the top service definition information 25 and FIG. 4 shows data structure of service definition information 25 regarding the "copy application service" as one of the three categories. As shown in FIGS. 3 and 4, the service definition information 25 is described in XML (eXtended Markup Language). Definitions of tags used in FIGS. 3 and 4 are shown in FIG. 5.

When the top service definition information 25 (FIG. 3) is received by the MFP 10, a service selection screen shown in FIG. 6A is displayed on the display 52 of the operation panel 102a of the MFP 10. Specifically, a character string "Directory Service" as a display title (Title) is displayed at the top of the screen, and character strings "Data Storage Service", "Printing Service" and "Copy Application Service" as items indicating selectable categories (Link_Title) are displayed under the display title. In this state, the user can move a cursor (a rectangle made of broken lines in FIGS. 6A-6C) up and down by pressing the "Up" key 46 and "Down" key 47 of the operation panel 102a to select an item and thereafter confirm the selection of the item (selected with the cursor) by pressing the OK key 50 of the operation panel 102a. Each item on the service selection screen has been associated with an ID of service definition information 25 corresponding to each category (Link_Location). When a selection of an item is confined by the user, service definition information 25 having the ID associated with the selected item is received by the MFP 10.

For example, when the item "Copy Application Service" is selected from the service selection screen of FIG. 6A, the service definition information 25 of FIG. 4 is received by the MFP 10, by which a service selection screen shown in FIG. 6B is displayed on the display 52. Specifically, a character string "Copy Application Service" as a display title (Title) is displayed at the top of the screen, and character strings "Watermarked Copy", "Translation Copy", "Document Read-aloud" and "Voice-text Conversion" as items indicating selectable services (Link_Title) are displayed under the display title.

Since the size of the display 52 for displaying the items is limited, when it is impossible to display all the items on the display 52, the MFP 10 displays upward/downward arrows (triangles) on the right of the displayed items (a black arrow when there is a hidden item in the direction of the arrow or a white arrow when there is no hidden item in the direction of the arrow), by which the user can grasp the presence/absence of hidden items. For example, on the service selection screen of FIG. 6B, the downward arrow colored black indicates that there is a hidden item under the item "Document Read-aloud". In this case, the user can scroll down (i.e. shift the displayed items upward) by moving the cursor downward by pressing the "Down" key 47 of the operation panel 102a, by which the hidden item "Voice-text Conversion" appears under the item "Document Read-aloud" as shown in FIG. 6C.

Also on the service selection screens of FIGS. 6B and 6C, the selection of an item is confirmed by the user by the operation explained above. On each service selection screen (FIG. 6B, FIG. 6C), each item has been associated with a URL for calling up each service (Link_Location). When a selection of an item is confirmed by the user, a service at the URL associated with the selected item is called up.

As above, the service definition information 25 provided by the directory server 20 has data structure like a tree (tree structure), in which the top service definition information 25 at the top level is linked with a plurality of pieces of service definition information 25 at lower levels. As a UI (User Interface) for letting the user search for services, the MFP 10 is provided with the functions of displaying information on the display 52 according to the service definition information 25 supplied from the directory server 20 (in response to requests by the MFP 10), receiving an operation by the user for selecting a link, and requesting the selected link to provide the next information or to execute the selected service, by which one of service search functions of the image processing system is realized. Such a service search function will hereinafter be referred to as a "tree-type service search function". By use of such a "tree-type service search function", the user can easily find a desired service (that should be executed by the function server 30) by performing a few operations for selecting links starting from the top of the tree (e.g. "Directory Service" (top)→"Copy Application Service"→"Watermarked Copy") while viewing information displayed on the display 52 of the MFP 10.

Next, the composition of the function server 30 will be explained. The function server 30 includes a control unit 31, a communication unit 32 and a storage unit 33.

The control unit 31 includes a CPU, ROM, RAM, etc. of well-known types (not shown in FIG. 1). An OS and other software stored in the storage unit 33 are read out and loaded on the RAM of the control unit 31. The CPU of the control unit 31 executes various processes according to the software, by which the components of the function server 30 are controlled. The control unit 31 of the function server 30, having far higher performance than the control unit 101 of the MFP 10, is capable of executing processes that are difficult for the control unit 101.

The communication unit 32 executes processes for transmitting and receiving data via the network 1.

The storage unit 33, having a not shown hard disk, stores various data in the hard disk. Specifically, the storage unit 33 includes a service I/F information storage unit 34 for storing service I/F information 36 (information for parameter setting) and a service software storage unit 35 for storing service software 37.

The service software 37 is software for executing a plurality of types of services. Specifically, the service software storage unit 35 stores a plurality of types of service software 37, by which different types of services are executed. The services realized by the service software 37 include a service regarding the image data generated by the reading unit 103 of the MFP 10, a service regarding the sound data generated by the sound input unit 107 of the MFP 10, a service regarding image data representing an image to be recorded (printed out) by the recording unit 104 of the MFP 10, a service regarding sound data representing sound to be outputted by the sound output unit 108 of the MFP 10, etc. Processes explained later referring to FIGS. 36-40 are executed according to the service software 37.

The service I/F information 36 is information for requesting the MFP 10 to send back parameters that have to be set for the execution of each service. Specifically, the service I/F information 36 transmitted from the function server 30 is received by the MFP 10 and causes the MFP 10 to display a parameter input screen (indicating parameters that should be set) on the display 52 of the operation panel 102a (examples are shown in FIGS. 11A-11E), by which the user of the MFP 10 is prompted to sat the parameters. The service I/F information storage unit 34 stores a plurality of types of service I/F information 36 corresponding to a plurality of types of services executable by the function server 30.

Here, concrete examples of the service I/F information 36 will be explained referring to FIGS. 7-9.

FIGS. 7-9 are explanatory drawings showing an example of data structure of the service I/F information 36. Specifically, FIGS. 7-9 show data structure of service I/F information 36 corresponding to a "translation copy service". The translation copy service is a service of executing an OCR (Optical Character Recognition) process to an image read by the reading unit 103 of the MFP 10 to recognize a text (as the contents of the image), translating the text, generating image data of an image representing the translated text, and letting the recording unit 104 of the MFP 10 print out the image data. As shown in FIGS. 7-9, the service I/F information 36 is described in the same markup language as the aforementioned service definition information 25. Definitions of tags used in FIGS. 7-9 are shown in FIG. 10. Incidentally, the "Basic Data" in FIG. 10 is identical with that of the service definition information 25 shown in FIG. 5.

Figure 11A:
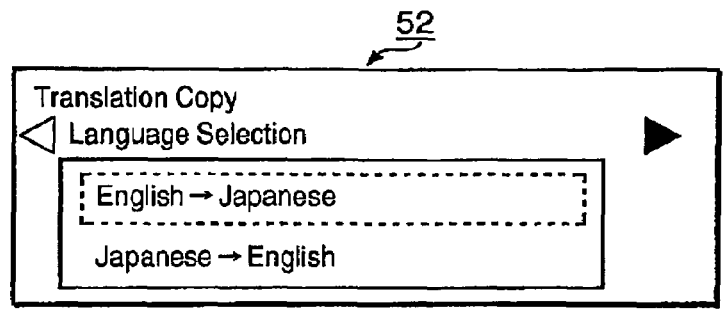
FIGS. 11A to 11E are schematic diagrams showing examples of parameter input screens in accordance with aspects of the invention.

When the service I/F information 36 (FIGS. 7-9) is received by the MFP 10, a parameter input screen shown in FIG. 11A is displayed on the display 52 of the operation panel 102a of the MFP 10. Specifically, a character string "Translation Copy" as a display title (Title) is displayed at the top of the screen, a character string "Language Selection" as an entry item (Disp_Name) is displayed under the display title, and character strings "English→Japanese" and "Japanese→English" as items indicating parameters selectable for the entry item "Language Selection" (Disp_Select) are displayed under the entry item. In this state, the user can move a cursor up and down by pressing the "Up" key 46 and "Down" key 47 of the operation panel 102a to select an item, similarly to the case of the aforementioned service selection screen.

In addition to the above entry item "Language Selection", the entry items (Disp_Name) for the display title "Translation Copy" include "Scanner Setting", "Print Setting" and "Comment" (see FIGS. 8 and 9).

Since the size of the display 52 is limited, it is impossible to display all the entry items on the display 52. Therefore, the MFP 10 displays rightward/leftward arrows (triangles) on both sides of the displayed entry item (a black arrow when there is a hidden entry item in the direction of the arrow or a white arrow when there is no hidden entry item in the direction of the arrow), by which the user can grasp the presence/absence of hidden entry items. For example, on the parameter input screen of FIG. 11A, the rightward arrow colored black indicates that there is a hidden entry item to the right of the entry item "Language Selection". In this case, the user can scroll right by pressing the "Right" key 49 of the operation panel 102a, by which the parameter input screen of FIG. 11A is switched to a parameter input screen shown in FIG. 11B having the entry item "Scanner Setting".

Figure 11B:
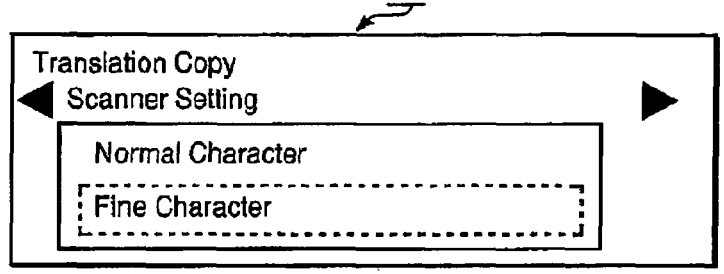

On the parameter input screen of FIG. 11B, a character string "Translation Copy" as a display title (Title) is displayed at the top of the screen, a character string "Scanner Setting" as an entry item (Disp_Name) is displayed under the display title, and character strings "Normal Character" and "Fine Character" as items indicating parameters selectable for the entry item "Scanner Setting" (Disp_Select) are displayed under the entry item.

Figure 12A:
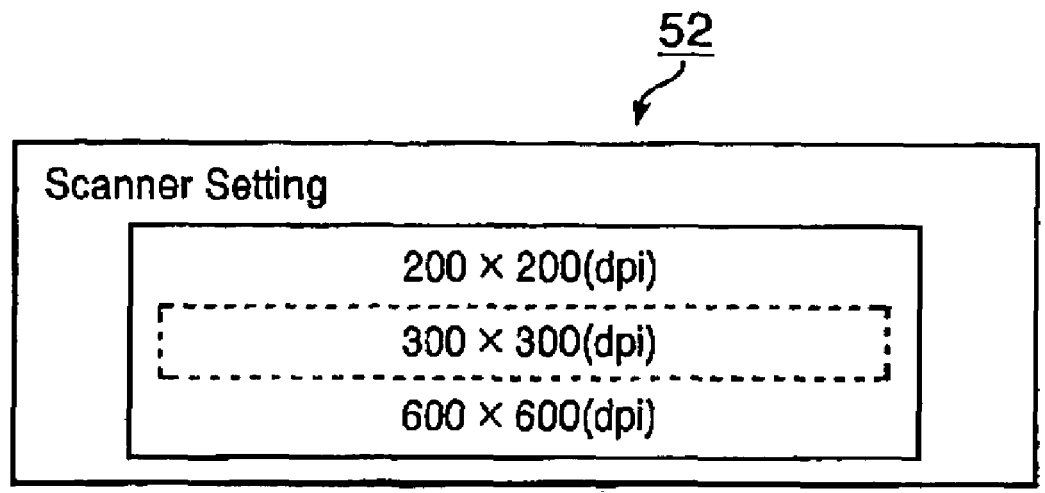
FIGS. 12A and 12B are schematic diagrams for explaining resolutions that can generally be set to the MFP and are displayed on the operation panel of the MFP in accordance with aspects of the invention.

The item "Normal Character" means to set a resolution (reading resolution, as a parameter of the reading unit 103 (scanner)) at 300×300 dpi, while "Fine Character" means to set the resolution at 600×600 dpi. In this example, the resolution that can be set in the "Scanner Setting" is restricted to part of the resolutions that can be generally set to the MFP 10. Specifically, when the MFP 10 is used generally for reading (scanning) an image printed on paper, the resolution of the reading unit 103 (scanner) can be selected from three candidates (200×200 dpi, 300×300 dpi and 600×600 dpi) on a setting screen (see FIG. 12A) which is displayed on the display 52 of the operation panel 102a. Meanwhile, in the translation copy service, the setting of 200×200 dpi (low resolution parameter) is prohibited since the accuracy of the OCR process drops for low resolution images. In this example, the reading mode of the reading unit 103 (scanner) is also restricted to monochrome reading in order to increase the OCR accuracy.

Figure 11C:
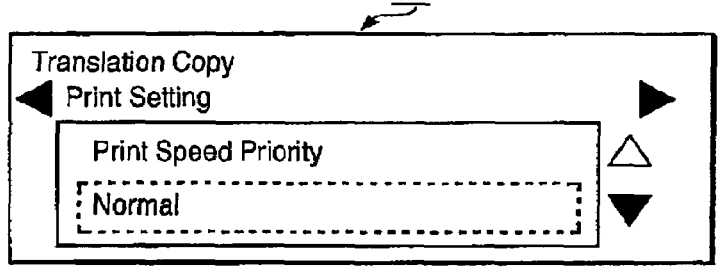

In the state shown in FIG. 11B, when the user presses the "Right" key 49 of the operation panel 102a, the parameter input screen of FIG. 11B is switched to a parameter input screen shown in FIG. 11C having the entry item "Print Setting".

On the parameter input screen of FIG. 11C, a character string "Translation Copy" as a display title (Title) is displayed at the top of the screen, a character string "Print Setting" as an entry item (Disp_Name) is displayed under the display title, and character strings "Print Speed Priority", "Normal" and "High-resolution" as items indicating parameters selectable for the entry item "Print Setting" (Disp_Select) are displayed under the entry item.

Since the size of the display 52 is limited, when it is impossible to display all the items on the display 52, the MFP 10 displays arrows (triangles) on the right of the displayed items (a black arrow when there is a hidden item in the direction of the arrow or a white arrow when there is no hidden item in the direction of the arrow) similarly to the service selection screens of FIGS. 6B and 6C, by which the user can grasp the presence/absence of hidden items. The user seeing the parameter input screen of FIG. 11C can scroll down (i.e. shift the displayed items upward) by moving the cursor downward by pressing the "Down" key 47 of the operation panel 102a, by which the hidden item "High-resolution" appears under the item "Normal" as shown in FIG. 11D.

Figure 12B:
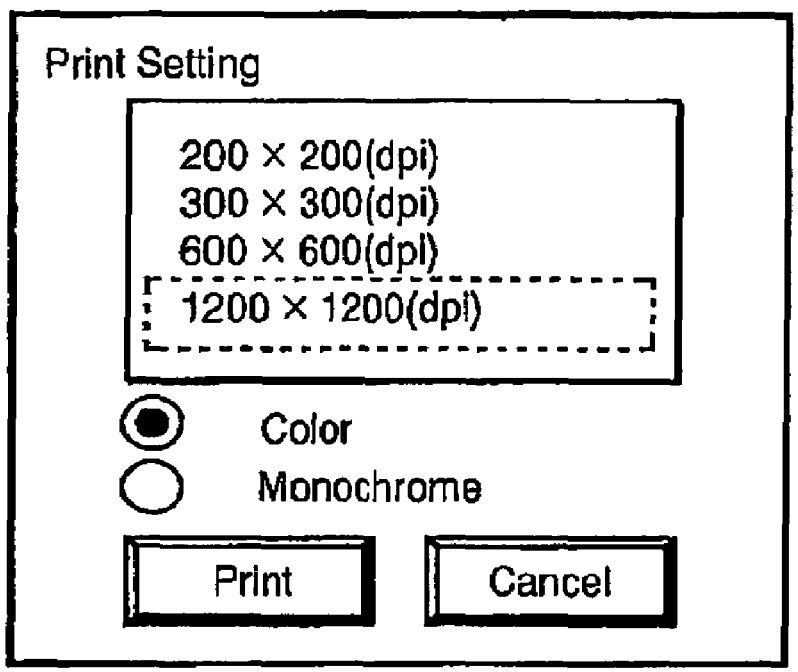

The item "Print Speed Priority" means to set a resolution (print resolution, as a parameter of the recording unit 104 (printer)) at 200×200 dpi, "Normal" means to set the resolution at 300×300 dpi, and "High-resolution" means to set the resolution at 600×600 dpi. In this example, the resolution that can be set in the "Print Setting" is restricted to part of the resolutions that can be generally set to the MFP 10. Specifically, when a user of an not shown personal computer generally performs an operation for instructing the MFP 10 to print an image, the resolution of the recording unit 104 (printer) can be selected from four candidates (200×200 dpi, 300×300 dpi, 600×600 dpi and 1200×1200 dpi) on a setting screen (see FIG. 12B) which is displayed on a display unit of the personal computer. Meanwhile, in the translation copy service, the setting of 1200×1200 dpi (high resolution parameter) is prohibited since it is useless to set a print resolution higher than the highest resolution of the reading unit 103 (scanner). On the other hand, the setting of the low resolution parameter (200×200 dpi) is allowed in order to meet the needs of users hoping for high speed printing in spite of a drop in the print resolution. In this example, the print mode of the recording unit 104 (printer) is restricted to monochrome printing since the reading mode of the reading unit 103 (scanner) is restricted to monochrome reading.

Figure 11D:
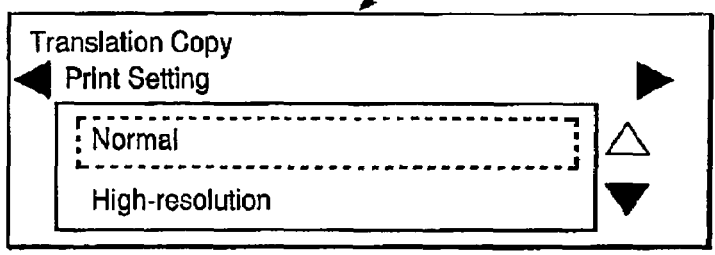
Figure 11E:
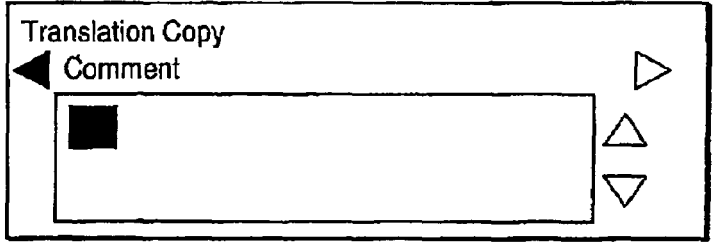

In the state shown in FIG. 11C or 11D, when the user presses the "Right" key 49 of the operation panel 102a, the parameter input screen of FIG. 11C or 11D is switched to a parameter input screen shown in FIG. 11E having the entry item "Comment".

On the parameter input screen of FIG. 11E, a character string "Translation Copy" as a display title (Title) is displayed at the top of the screen, a character string "Comment" as an entry item (Disp_Name) is displayed under the display title, and an input window used for entering a comment is displayed under the entry item. A black square in the input window is a cursor for character input. The comment entered in the input window will be used, for example, as a header/footer of the image printed out by the recording unit 104.

As above, on the parameter input screens for the translation copy service (FIGS. 11A-11F), the user selects a parameter for each entry item ("Language Selection", "Scanner Setting", "Print Setting") and enters a comment. By pressing the OK key 50 of the operation panel 102a, the selection of the items designated with the cursors at this point (for each entry item not shown on the display 52, an item designated last) and the entry of the comment are confirmed (finalized). These parameters are transmitted to a URL (Action) of a program that receives and processes the input data.

Incidentally, the parameter input screens may also be configured to change parameters selectable for an entry item based on a parameter selected by the user for another entry item. For example, it is possible to prohibit the selection of the parameter "High-resolution" for the entry item "Print Setting" when the user has selected the parameter "Normal Character" for the entry item "Scanner Setting", by which a useless setting of the print resolution at 600×600 dpi when the reading resolution is 300×300 dpi can be prevented.

Next, communication executed in the image processing system will be explained in detail.

In the image processing system, the MFP 10, the directory server 20 and the function server 30 employ HTTP (HyperText Transfer Protocol) 1.1 as a communication protocol for communicating data with one another. Each element (10, 20, 30) of the system sends an instruction to another element and receives a response to the instruction, via messages contained in an HTTP request and an HTTP response.

While the instructions communicated in the image processing system include two types of instructions: instructions from the MFP 10 to the directory server 20 or the function server 30 (server control instructions) and instructions from the directory server 20 or the function server 30 to the MFP 10 (MFP control instructions), the MFP 10 invariably (for both types of instructions) operates as a client of HTTP communication (i.e. the sender of HTTP requests), by which the MFP control instructions (instructions from the directory server 20 or the function server 30 to the MFP 10) are prevented from being blocked by the router 2 even when the router 2 is used in its default setting.

Specifically, the MFP 10 sends an instruction to the directory server 20 or function server 30 by attaching a message to the POST command in an HTTP request. Meanwhile, when the directory server 20 or function server 30 has an MFP control instruction in response to an MFP control instruction inquiry (an inquiry about an MFP control instruction) indicated by the message attached to the POST command in the HTTP request from the MFP 10, the directory server 20 or function server 30 transmits the MFP control instruction to the MFP 10 by including it in a message in an HTTP response as the response to the inquiry.

Figure 13:
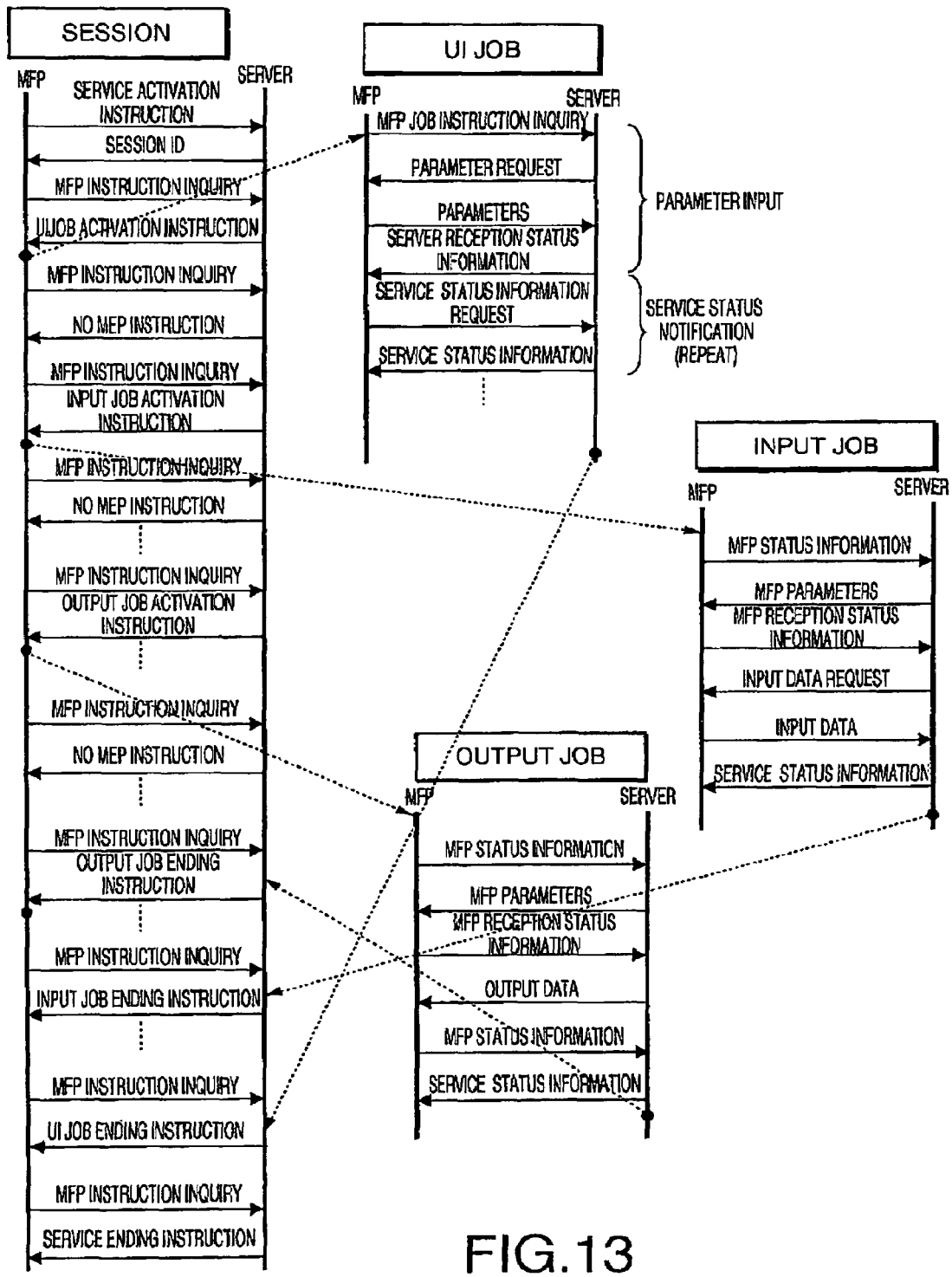
FIG. 13 is a ladder chart showing an example of communication executed between the MFP and a function server in the image processing system in accordance with aspects of the invention.

An example of communication executed between the MFP 10 and the function server 30 will be described referring to a ladder chart of FIG. 13.

The MFP 10 and the function server 30 execute a sequence of communication steps (hereinafter referred to as a "session") from the start of a service to the end of the service. At the start of a session, the MFP 10 transmits a service activation instruction (requesting activation of a service) to the function server 30. The function server 30 receiving the service activation instruction returns a session ID to the MFP 10. The session ID is an identifier used by the function server 30 for identifying each session. In subsequent communication, the MFP 10 attaches the session ID to each request and the function server 30 identifies the session based on the session ID, by which the function server 30 can deal with a plurality of sessions concurrently.

After receiving the session ID, the MFP 10 periodically transmits MFP instruction inquiries (inquiring about instructions to the MFP 10) to the function server 30 and receives instructions from the function server 30 as responses to the MFP instruction inquiries. When there is no instruction as a response to the MFP instruction inquiry, the function server 30 returns a response indicating that there is no instruction (no MFP instruction).

In this example, the function server 30 first transmits a UI (User Interface) job activation instruction to the MFP 10. The UI job activation instruction informs the MFP 10 that the function server 30 starts using a UI device (operation panel 102a) of the MFP 10, by which a UI job communication process is started between the MFP 10 and the function server 30. The UI job communication process is executed concurrently with the session. Along with the UI job activation instruction, a job ID for identifying the job (an identifier that is unique in the session) is transmitted from the function server 30 to the MFP 10. In the UI job communication process, the MFP 10 attaches the session ID and the job ID to each request and the function server 30 identifies the job based on the session ID and job ID, by which the function server 30 can deal with a plurality of jobs concurrently. The details of the UI job communication process will be described later.

Subsequently, the function server 30 transmits an input job activation instruction to the MFP 10 at proper timing. The input job activation instruction informs the MFP 10 that the function server 30 starts using an input device (the reading unit 103 or the sound input unit 107) of the MFP 10, by which an input job communication process is started between the MFP 10 and the function server 30. Similarly to the UI job communication process, the input job communication process is executed concurrently with the session. Along with the input job activation instruction, a job ID for identifying the job is transmitted from the function server 30 to the MFP 10. In the input job communication process, the MFP 10 attaches the session ID and the job ID to each request and the function server 30 identifies the job based on the session ID and job ID. The details of the input job communication process will be described later.

Subsequently, the function server 30 transmits an output job activation instruction to the MFP 10 at proper timing. The output job activation instruction informs the MFP 10 that the function server 30 starts using an output device (the recording unit 104 or the sound output unit 108) of the MFP 10, by which an output job communication process is started between the MFP 10 and the function server 30. Similarly to the UI job communication process and the input job communication process, the output job communication process is executed concurrently with the session. Along with the output job activation instruction, a job ID for identifying the job is transmitted from the function server 30 to the MFP 10. In the output job communication process, the MFP 10 attaches the session ID and the job ID to each request and the function server 30 identifies the job based on the session ID and job ID. The details of the output job communication process will be described later.

Subsequently, the function server 30 transmits an output job ending instruction (indicating the ending of the output job) to the MFP 10 at proper timing. Subsequently, the function server 30 transmits an input job ending instruction (indicating the ending of the input job) to the MFP 10 at proper timing. Subsequently, the function server 30 transmits a UI job ending instruction (indicating the ending of the UI job) to the MFP 10 at proper timing.

Subsequently, the function server 30 transmits a service ending instruction (indicating the ending of the service) to the MFP 10 at proper timing, by which the session is ended. The session is executed by the MFP 10 and the function server 30 described above.

At the start of the UI job communication process, the MFP 10 transmits an MFP job instruction inquiry (inquiring about instructions to the MFP 10) to the function server 30. The function server 30 receiving the MFP job instruction inquiry returns a parameter request to the MFP 10. The parameter request is a request for letting the user of the MFP 10 set parameters necessary for the execution of the service. Along with the parameter request, the aforementioned service I/F information 36 is transmitted from the function server 30 to the MFP 10.

The MFP 10 receiving the parameter request from the function server 30 displays the parameter input screen according to the service I/F information 36 on the display 52 of the operation panel 102a (see FIGS. 11A-11E, for example). After the parameters are set by the user, the MFP 10 transmits the parameters to the function server 30.

The function server 30 receiving the parameters from the MFP 10 returns server reception status information (indicating whether the function server 30 received the information from the MFP 10 normally or not) to the MFP 10.

After confirming that the parameters have been received by the function server 30 normally based on the server reception status information, the MFP 10 transmits a service status information request (requesting service status information indicating the status of the service) to the function server 30.

The function server 30 receiving the service status information request from the MFP 10 transmits service status information (indicating the status of the service and the function server 30) to the MFP 10.

Thereafter, the transmission of the service status information request by the MFP 10 and the transmission of the service status information by the function server 30 in response to the request are repeated.

Next, the details of the input job communication process will be described referring again to FIG. 13.

At the start of the input job communication process, the MFP 10 transmits MFP status information (indicating the status of the MFP 10) to the function server 30. The function server 30 receiving the MFP status information transmits MFP parameters to the MFP 10. The MFP parameters are the parameters of the input device that have been set by the user of the MFP 10 in the UI job communication process.

The MFP 10 receiving the MFP parameters from the function server 30 transmits MFP reception status information (indicating whether the MFP 10 received the information from the function server 30 normally or not) to the function server 30.

After confirming that the MFP parameters have been received by the MFP 10 normally based on the MFP reception status information, the function server 30 transmits an input data request (requesting input data corresponding to the job) to the MFP 10. The "input data corresponding to the job" means the image data generated by the reading unit 103 when the job is a "scan job" (a job executed in a service regarding the image data generated by the reading unit 103) or the sound data (e.g. PCM data) generated by the sound input unit 107 when the job is a "sound input job" (a job executed in a service regarding the sound data generated by the sound input unit 107).

The MFP 10 receiving the input data request from the function server 30 displays a screen for prompting the user to perform an input operation (image reading operation, sound input operation), generates input data, and transmits the input data generated by the input operation to the function server 30.

The function server 30 receiving the input data from the MFP 10 transmits service status information (indicating the status of the service and the function server 30) to the MFP 10.

Next, the details of the output job communication process will be described referring again to FIG. 13.

At the start of the output job communication process, the MFP 10 transmits MFP status information (indicating the status of the MFP 10) to the function server 30. The function server 30 receiving the MFP status information transmits MFP parameters to the MFP 10. The MFP parameters are the parameters of the output device that have been set by the user of the MFP 10 in the UI job communication process.

The MFP 10 receiving the MFP parameters from the function server 30 transmits MFP reception status information (indicating whether the MFP 10 received the information from the function server 30 normally or not) to the function server 30.

After confirming that the MFP parameters have been received by the MFP 10 normally based on the MFP reception status information, the function server 30 transmits output data to the MFP 10. The "output data" means image data when the job is a "print job" (a job executed in a service regarding image data representing an image to be printed out by the recording unit 104) or sound data (e.g. PCM data) when the job is a "sound output job" (a job executed in a service regarding sound data representing sound to be outputted by the sound output unit 108).

The MFP 10 receiving the output data from the function server 30 executes an output process (the printing of the image, the outputting of the sound) according to the output data. Thereafter, the MFP 10 transmits MFP status information (indicating the status of the MFP 10) to the function server 30.

The function server 30 receiving the MFP status information from the MFP 10 transmits service status information (indicating the status of the service and the function server 30) to the MFP 10.

In the following, functions relevant to the principal part of the embodiment will be explained.

While the image processing system of this embodiment has the "tree-type service search function" as one of its service search functions as mentioned above, the image processing system is also provided with service search functions of other types.

Specifically, the MFP 10 has a function of supplying the directory server 20 with "service search data" which includes at least a piece of information selected from information on the settings of the MFP 10, information indicating the status of the MFP 10, information indicating operations received from the user, and information that will be supplied to the function server 30 when a service is executed. Meanwhile, the directory server 20 has functions of selecting services suitable for the service search data supplied from the MFP 10, generating a list of the selected services, and supplying the list (hereinafter referred to as a "service list") to the MFP 10. As a UI (User Interface) for the service search, the MFP 10 is provided with functions of displaying a screen according to the service list, receiving an operation by the user for selecting a link, and requesting the selected link to provide the next information or to execute the selected service, by which the user is allowed to select a necessary service from services that are (presumed to be) likely to be used by the MFP 10. This service search function will hereinafter be referred to as a "suitable service search function".

Figure 14:
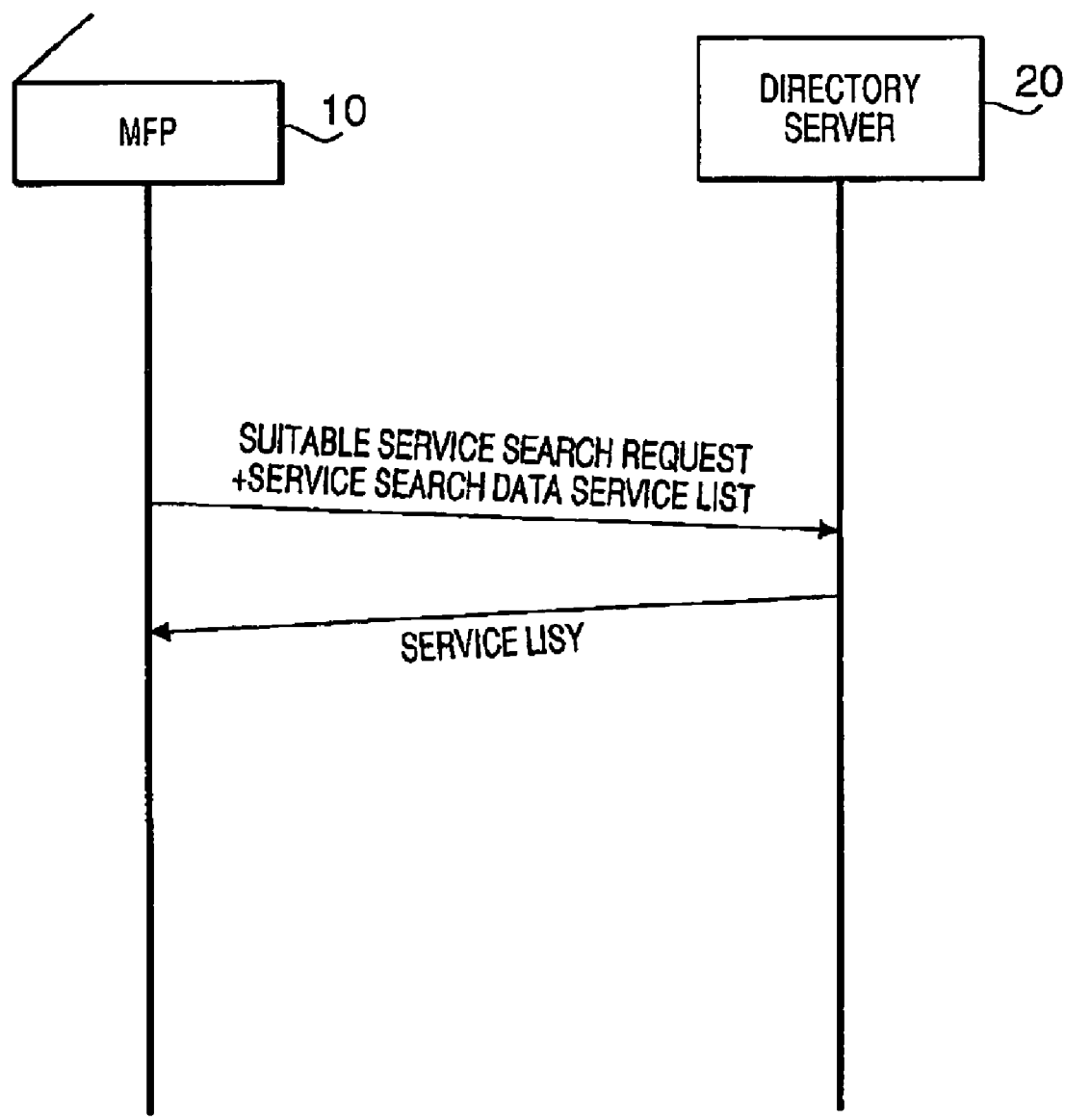
FIG. 14 is a sequence chart showing a communication procedure when the MFP obtains a service list from a directory server in the image processing system in accordance with aspects of the invention.

FIG. 14 is a sequence chart showing a communication procedure when the MFP 10 obtains the service list from the directory server 20. When the "suitable service search function" is used, the MFP 10 first transmits a suitable service search request to the directory server 20 together with the service search data. The directory server 20 receiving the suitable service search request (with the service search data) selects services suitable for the service search data, generates the service list, and transmits the service list to the MFP 10.

Also in the "suitable service search function", the user of the MFP 10 performs an operation for selecting a link while viewing information displayed on the display 52, similarly to the case of the "tree-type service search function".

However, in the "tree-type service search function" capable of displaying information on all the categories and services managed by the directory server 20, the number of categories can become too large and the hierarchy of categories can become too extensive (deep) when the number of services is extremely large. Consequently, the user may find it very difficult to check whether there exists a service executing a desired process or not and it is impossible for the user to find a desired service efficiently.

On the other hand, in the "suitable service search function" which is not designed to display information on all the categories and services managed by the directory server 20, services suitable for the service search data are selected from all the services to generate the service list, and only the selected services contained in the service list are presented to the user. Therefore, even when the total number of services managed by the directory server 20 is extremely large, only a reduced number of services are contained in the service list, by which the user is allowed to easily check whether there exists a service executing a desired process or not and find a desired service efficiently.

In the following, a specific configuration for realizing the "suitable service search function" will be described in detail.

FIG. 15 is a table showing a data format used in the service search data FIGS. 16A and 16B are explanatory drawings showing concrete examples of the service search data. As shown in the figures, the service search data is described in XML.

Specifically, descriptions "Tag Name", "Data" and "Value" in the service search data in FIG. 15 are those prepared for expressing information on the settings of the MFP 10 (Config, Language, Area), information indicating the status of the MFP 10 or operations received from the user (Condition, ADF, MPTray, MPTraySize, DefaultTraySize, PhoneHook), information that will be handed over to the function server 30 when a service is executed (TargetData, TargetDataType, Binary, TargetNum, Data), etc. When an operation for using the "suitable service search function" is performed by the user of the MFP 10, the MFP 10 generates service search data like the one shown in FIG. 16A or 16B by combining the descriptions and transmits the generated service search data to the directory server 20.

FIG. 17 is a table showing a service definition information table which is stored in the storage unit 23 of the directory server 20. The service definition information table (a "relevance information storage unit" in the present invention) is a table storing "relevance information" indicating the degree of relevance between each of n types of services executable by the function server 30 (n: positive integer, 14 types of services from "English-Japanese Document Translation Service" to "Digital Photo Backlight Correction Service" are shown in FIG. 17 for example) and each of m types of service function attributes that the service search data can have (m: positive integer, 12 types of service function attributes from "Service for Scanned Image" to "(Service) for French-speaking Countries" are shown in FIG. 17 for example) regarding all the (n×m) combinations. Each of the (n×m) pieces of relevance information contained in the service definition information table can be "◯: Relevant Service", "□: Irrelevant" ("◯" denotes a space), or "-: Unclear". Such relevance information that can take on one of the three values will hereinafter be referred to as a "relevance index".

Among the (n×m) relevance indices contained in the service definition information table, the directory server 20 refers to (n×k) relevance indices corresponding to k types of service function attributes that the service search data has (k: positive integer, k≦m), extracts services having at least one service function attribute giving the relevance index "◯: Relevant Service" and having no service function attribute giving the relevance index "□: Irrelevant" from the n types of services, and presumes the extracted services to be services that the MFP 10 is likely to request the function server 30 to execute.

For example, in the service search data shown in FIG. 16A, information like "<Language>jpn</Language>" and "<Area>jp</Area>" is handled as information having the attribute "for Japanese-speaking Countries" (as one of the m types of service function attributes). The "<ADF>ON</ADF>" is handled as information having the attribute "for Multiple-sheet Document". The "<TargetDataType>image</TargetDataType>" is handled as information having the attribute "Service for Scanned Image". The "<Data>4fj:LKHF:hw8;;haa . . . </Data>" will be handled as information having the attribute "for English Document", "for Japanese Document" or "for French Document" after being processed.

Specifically, the information "<Data>4fj:LKHF:hw8;;haa . . . Data>" represents binary data corresponding to part of a scanned image (part of scan data). The directory server 20 successively converts the scanned image into English text, Japanese text and French text by successively executing OCR processes to the part of the scanned image, judges whether the word recognition rate in each language (English text, Japanese text, French text obtained in each OCR process) is higher than a prescribed threshold or not, and thereby handles "<Data>4fj:LKBF:hw8;;haa . . . </Data>" as information having the attribute "for English Document" (when the English word recognition rate is higher than the threshold), as information having the attribute "for Japanese Document" (when the Japanese word recognition rate is higher than the threshold) or as information having the attribute "for French Document" (when the French word recognition rate is higher than the threshold).

There are cases where two pieces of information included in the service search data (like "<Language>jpn</Language>" and "<Area>jp</Area>") are handled as information having the same service function attribute while there are cases where a piece of information included in the service search data (like "<Data>4fj-LKHF:hw8;;haa . . . </Data>") is handled as information having one of three service function attributes depending on the result of conversion. However, as a result of such handling, each service search data is recognized as data having the aforementioned "k types of service function attributes" in any case. For example, the service search data of FIG. 16A has at least three service function attributes "for Japanese-speaking Countries", "for Multiple-sheet Document" and "Service for Scanned Image", and one of the three service function attributes "for English Document", "for Japanese Document" and "for French Document" can be added depending on the result of the OCR process, by which the service search data has four service function attributes. If we assume, for example, that the service function attribute "for English Document" is added (that is, the service search data of FIG. 16A has four service function attributes "for Japanese-speaking Countries", "for Multiple-sheet Document", "Service for Scanned image" and "for English Document"), in the service definition information table of FIG. 17, the aforementioned "services having at least one service function attribute giving the relevance index "◯: Relevant Service" and having no service function attribute giving the relevance index "□: Irrelevant"" include: the "English-Japanese Document Translation Service" (having two service function attributes "for Japanese-speaking Countries" and "for English Document" giving the relevance index "◯: Relevant Service"), the "English-French Document Translation Service" (having one service function attribute "for English Document" giving the relevance index "◯: Relevant Service"), the "English Document Spellcheck Service" (having one service function attribute "for English Document" giving the relevance index "◯: Relevant Service"), and the "Thumbnailing Service" (having one service function attribute "for Multiple-sheet Document" giving the relevance index "◯: Relevant Service"). The four services are presumed by the directory server 20 to be services that the MFP 10 is likely to request the function server 30 to execute.

Among the (n×m) relevance indices contained in the service definition information table, the directory server 20 refers to (n×k) relevance indices corresponding to the k types of service function attributes that the service search data has (k: positive integer, k≦m), searches (in regard to each of the n services) for k relevance indices corresponding to the k service function attributes, and thereby generates a service presentation list like the one shown in FIG. 18.

The service presentation list is a list used by the directory server 20 for temporarily storing "status" of each service in order to search for the suitable services. The service presentation list is used for recording the progress of the successive check of the relevance index regarding the k types of service function attributes included in the service search data. Specifically, the service presentation list is capable of storing the "status" regarding each of the n types of services. As the "status", the relevance information read out from the service definition information table is stored. For example, the service presentation list of FIG. 18 indicates that four services "English-Japanese Document Translation Service", "Japanese-English Document Translation Service", "English Document Spellcheck Service" and "Japanese Document Summarization Service" are the "services having at least one service function attribute giving the relevance index "◯: Relevant Service" and having no service function attribute giving the relevance index "□:Irrelevant"".

While the details of the process will be explained later, in the search of k relevance indices corresponding to the k types of service function attributes included in the service search data, a value "□:Irrelevant" is stored as the "status" if at least one of the k relevance indices read out from the service definition information table is "□:Irrelevant". When the k relevance indices read out from the service definition information table include no "□: Irrelevant", a value "◯: Relevant Service" is stored as the "status" if at least one of the k relevance indices is "◯: Relevant Service". If the k relevance indices read out from the service definition information table include no "□:Irrelevant" nor "◯: Relevant Service", a value "-: Unclear" is stored as the "status". The successive search of (n×k) relevance indices may be carried out in various methods. For example, it is possible to regard each service as a target and repeat a process for each service (the search of k relevance indices corresponding to the k types of service function attributes) n times (for the number of services). It is also possible to regard each service function attribute as a target and repeat a process for each service function attribute (the search of n relevance indices corresponding to the n types of services) k times (for the number of service function attributes). While either method may be employed arbitrarily, it is desirable from the viewpoint of implementation to select the more convenient method taking other related processes in consideration.

After the service presentation list is completed by the above method, the directory server 20 generates the service list (to be supplied to the MFP 10) based on the completed service presentation list. FIG. 19A is a table showing a data format used in the service list. FIG. 19B is an explanatory drawing showing a concrete example of the service list. As shown in the figures, the service list is described in XML. In the service list, only services whose "status" is "◯: Relevant Service" are extracted from the service presentation list (see FIG. 18) and listed. The service list may also be configured to list the services in order of priority, such as first listing services whose "status" is "◯: Relevant Service" and thereafter listing services whose "status" is "-: Unclear".

The MFP 10 receiving such a service list from the directory server 20 displays a list of services (that can be selected by the user) on the display 52 according to the order of listing in the service list. Therefore, the MFP 10 is capable of displaying the service list extracting (or giving priority to) services judged as "◯: Relevant Service" by the directory server 20, only by displaying the services in the order of listing in the service list. The user viewing the display to select a service is allowed to find a necessary service from the reduced number of services presumed by the directory server 20 to be likely to be used by the MFP 10, without the need of searching all the services executable by the function server 30 for the necessary service.

In the following, processes executed by the control units 101, 21 and 31 of the MFP 10, the directory server 20 and the function server 30 for realizing the above "suitable service search function" will be explained in detail.

First, an "MFP process" executed by the control unit 101 of the MFP 10 will be explained referring to flowcharts of FIGS. 20 and 21. The MFP process is started when the power of the MFP 10 is turned on.

At the start of the MFP process, the control unit 101 of the MFP 10 (hereinafter also referred to simply as "the MFP 10") executes an initialization process (S101). After the initialization, an input to the MFP 10 is received (S102). The "input to the MFP 10" means an input for causing the MFP 10 to start some type of process, such as a key input to the operation panel 102a, an instruction input from an not shown personal computer, etc.

Subsequently, the MFP 10 judges whether the input received in S102 is an input for switching to a "service mode" (operation mode for requesting a service from the function server 30) or not (S103). Specifically, the MFP 10 judges whether or not the input received in S102 is the pressing of the service key 44 of the operation panel 102a.

If the input in S102 is not an input for switching to the service mode (S103: NO), the MFP 10 executes a process of a different mode (e.g. an image printing process) corresponding to the input in S102 (S104) and thereafter returns to S102.

If the input in S102 is an input for switching to the service mode (S103: YES), the MFP 10 judges whether a service to be requested from the function server 30 should be selected from a list or not (S105). Specifically, the MFP 10 displays three methods "Suitable Service Search", "Service List" and "Location Input" on the display 52 of the operation panel 102a as methods for determining a service to be requested from the function server 30 (see FIG. 45A) and lets the user select one of the methods.

If the user selects a method other than "Location Input" in S105 (S105: YES), the process advances to step S131 of FIG. 21, in which the MFP 10 judges whether to execute the "suitable service search" or not. Specifically, the MFP 10 checks whether the selection by the user in S105 is the "Suitable Service Search" or not.

If the selection by the user in S105 is the "Suitable Service Search" (S131: YES), the MFP 10 reads out its own setting information (S133). The setting information, stored in a nonvolatile memory of the storage unit 106 of the MFP 10, includes information on the language used in the MFP 10 (Japanese, English, French), the area of installation of the MFP 10 (Japan, USA, France), etc.

Subsequently, the MFP 10 displays a UI (User Interface) (S135) like the one shown in FIG. 45B for prompting the user to perform an operation (to be used as a judgment condition in the "suitable service search") on the display 52 of the operation panel 102a. The screen of FIG. 45B is displaying part of the message shown in FIG. 45C. The user viewing the screen of FIG. 45B can read the whole message (FIG. 45C) by scrolling down by moving the cursor downward with the "Down" key 47 of the operation panel 102a.

Subsequently, the MFP 10 reads out information on buttons and sensors (S137). Specifically, the MFP 10 reads out information on key operations on the media key 40, scanner key 42, etc., information on state detection by the handset hook sensor 110, etc. In steps S139, S141 and S143, the MFP 10 successively checks whether the scanner key 42 has been pressed or not, whether the handset is off the hook or not, and whether the media key 40 has been pressed or not. If none of the operations is detected, the process returns to S137 to repeat the loop of S137-S143.

If the scanner key 42 has been pressed (S139: YES), the MFP 10 scans a document (S145), turns a "scanned flag" on (S147) and thereafter advances to step S151. If the handset is judged to be off the hook (S141: YES), the MFP 10 directly advances to the step S151. Incidentally, while the step S141 judges that "the handset is off the hook" when the handset hook sensor 110 has detected the lifting of the handset, even when the handset is not actually off the hook (even when the handset hook sensor 110 has not detected the lifting of the handset), tie step S141 judges that "the handset is off the hook" if an "on-hook key" (not shown) of the operation panel 102a has been pressed to activate an equivalent function. If the media key 40 has been pressed (S143: YES), the MFP 10 displays a file selection screen like the one shown in FIG. 45E on the display 52 of the operation panel 102a and waits for a file selection by the user (S149). The screen of FIG. 45E is displaying part of the message shown in FIG. 45F. The user viewing the screen of FIG. 45E can read the whole message (FIG. 45F) by scrolling down by moving the cursor downward with the "Down" key 47 of the operation panel 102a. When the user has selected desired files and selected "End Selection" at the bottom of the message of FIG. 45F, the process exits from the step S149 and advances to the step S151.

In the step S151, the MFP 10 reads out sensor information. In this step, sensor information that was not read out in S137 (e.g. information on state detection by the ADF sensor 109) is read out. Since all the information necessary for generating the service search data has been prepared by the above steps S133-S151, the MFP 10 generates the service search data based on the above information and transmits the suitable service search request to the directory server 20 together with the service search data (S153). In this example, a destination address (URL) used for transmitting the suitable service search request has previously been stored in the storage unit 106 of the MFP 10.

Since the directory server 20 receiving the suitable service search request returns the service list which has been explained above, the MFP 10 receives the service list (S155) and thereafter advances to step S108 of FIG. 20.

Figure 21:
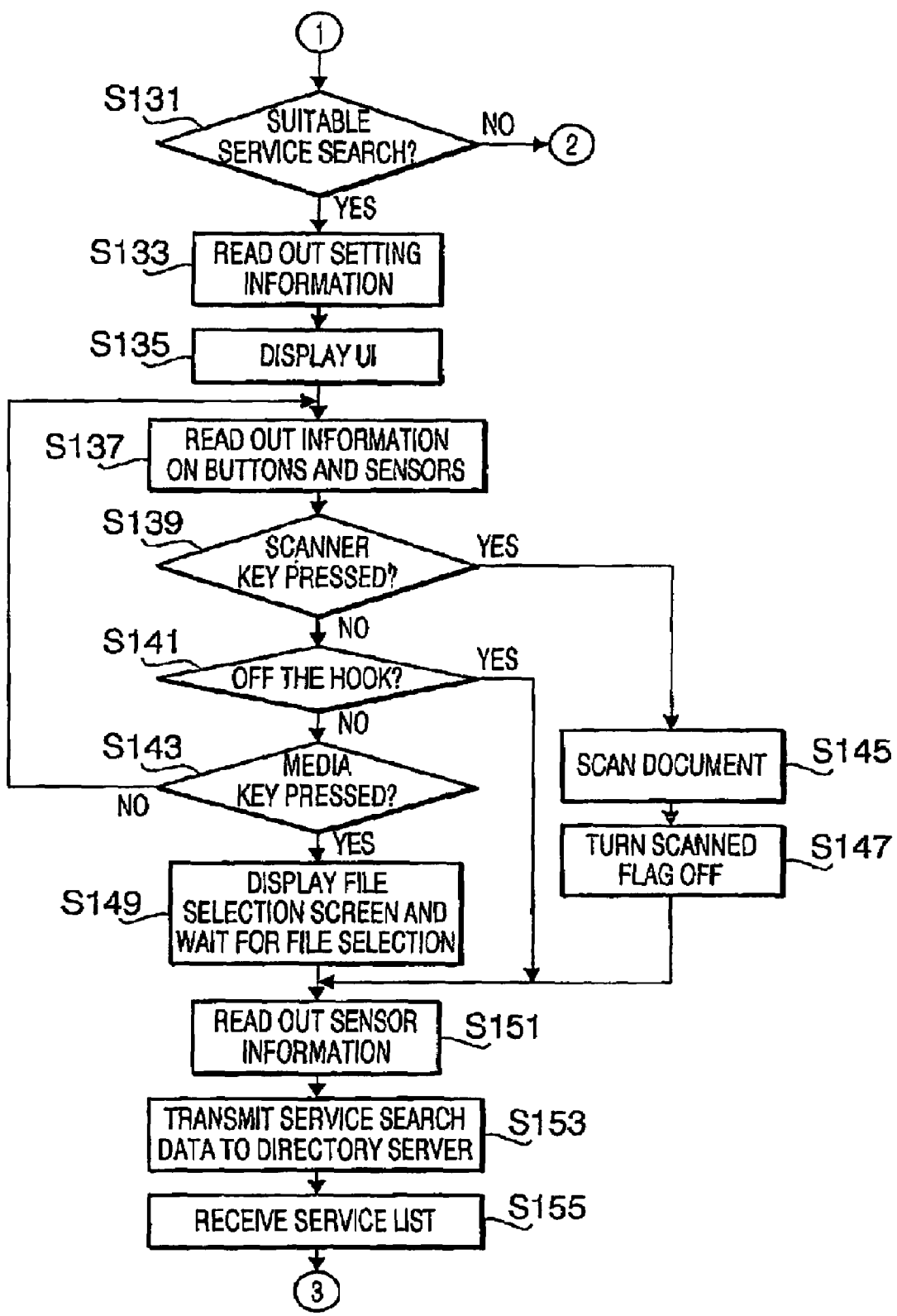

In the step S131 of FIG. 21, if the selection by the user in S105 is not the "Suitable Service Search" (S131: NO), the process advances to step S106 of FIG. 20, in which the MFP 10 transmits a service list reference request to the directory server 20. Specifically, the MFP 10 requests the directory server 20 to send back the top service definition information 25 (see FIG. 3). In this example, a destination address (URL) used for requesting the top service definition information 25 has previously been stored in the storage unit 106 of the MFP 10. The MFP 10 receives the top service definition information 25 returned from the directory server 20 in response to the request of S106 (S107) and thereafter advances to the step S108.

In the step S108, the MFP 10 displays a service selection screen based on the service list received in S155 (see FIG. 45D) or a service selection screen based on the service definition information 25 received in S107 (see FIG. 6A) on the display 52 of the operation panel 102a, and thereafter advances to step S110.

In the aforementioned step S105, if the MFP 10 judges that a service to be requested from the function server 30 should not be selected from a list, that is, if the user selects the method "Location Input" (S105: NO), the process advances to step S109 and the MFP 10 displays an address input screen (not shown) on the display 52 of the operation panel 102a in order to let the user directly input the URL.

Subsequently, the MFP 10 receives an input operation by the user on the operation panel 102a for determining the service to be requested from the function server 30 (S110).

Subsequently, the MFP 10 judges whether the input operation received in S110 is an operation for selecting a link or not (S111). Specifically, the MFP 10 judges that the input operation is for selecting a link when a selection operation is performed normally according to the information displayed in S108 or when a URL is normally entered in the address input screen displayed in S109.

If the input operation received in S110 is not for selecting a link (S111: NO), the MFP 10 judges whether the input is an operation for ending the service mode or not (S112).

If the input operation received in S110 is an exit operation for ending the service mode (S112: YES), the MFP 10 turns the scanned flag off (S121) and returns to the step S102, that is, ends the process for the service mode.

If the input operation received in S110 is not the exit operation for ending the service mode (S112: NO), the MFP 10 outputs a warning sound such as a beep (S113) and thereafter returns to the step S110. In short, when the input operation received in S110 is not an operation for selecting a link nor the exit operation, the MFP 10 informs the user of the error by making the warning sound.

If the input operation received in S110 is an operation for selecting a link (S111: YES), the MFP 10 judges whether the selected URL is a URL of a service or not (S114).

If the selected URL is not a URL of a service, that is, if the selected URL is a URL of service definition information 25 (S114: NO), the MFP 10 transmits a service reference request (requesting the MFP 10 to send back the service definition information 25) to the directory server 20 based on information indicated by the "Link_Location" (when a URL is inputted directly by the user, based on information indicated by the URL), and receives the service definition information 25 from the directory server 20 (S115). Thereafter, the process returns to the step S108, by which a new service selection screen is displayed on the display 52 of the operation panel 102a.

If the selected URL is a URL of a service (S114: YES), the MFP 10 executes a session process (see FIG. 22) which will be explained below, and thereafter returns to the step S102.

Figure 22:
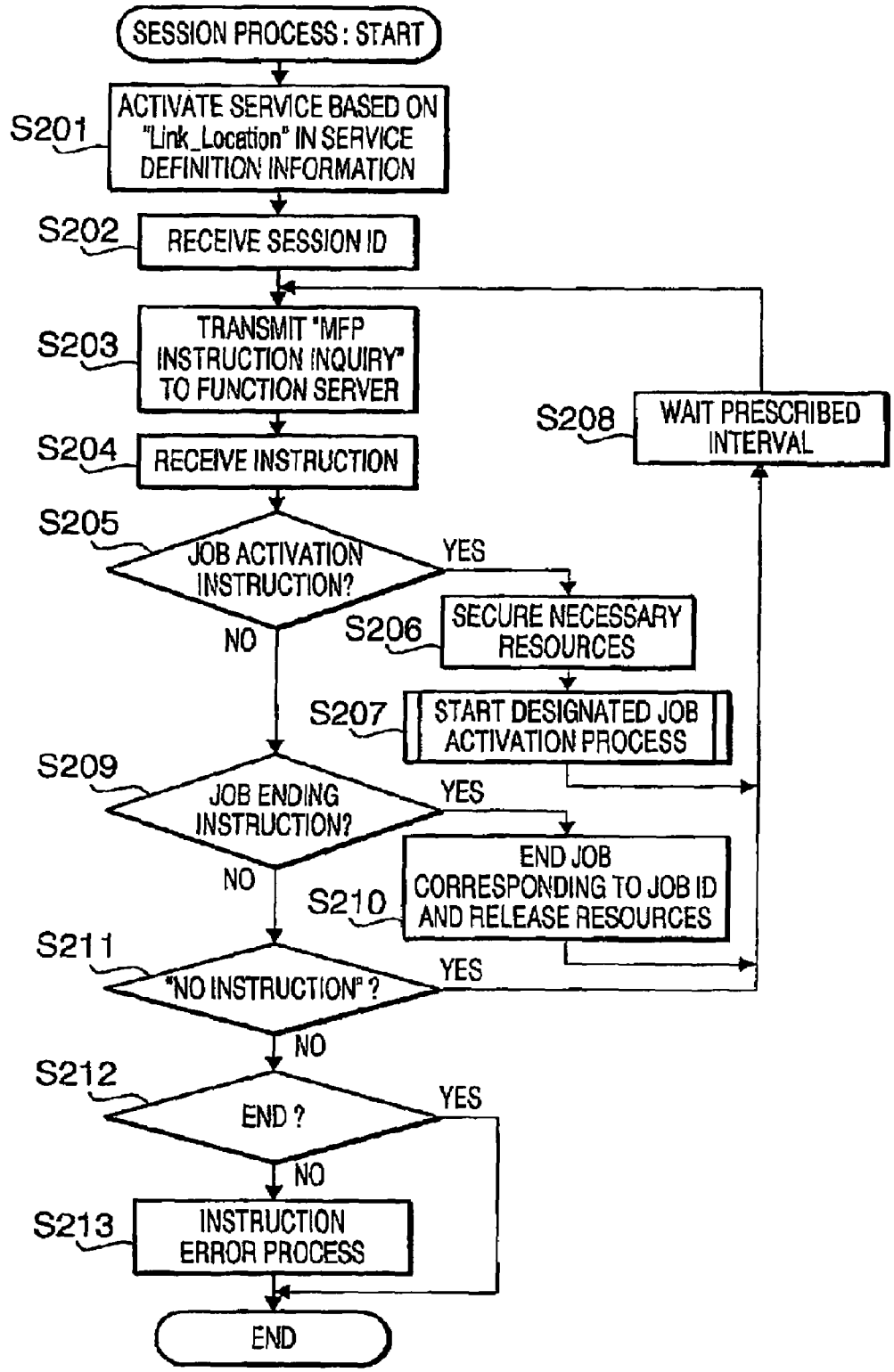
FIG. 22 is a flowchart showing a session process which is executed by the control unit of the MFP in accordance with aspects of the invention.

Next, the session process executed in the step S116 of the MFP process (FIG. 20) will be explained referring to a flowchart of FIG. 22.

At the start of the session process, the MFP 10 activates a service selected by the user based on the "Link_Location" in the service definition information 25 (when a URL is inputted directly by the user, based the URL), by transmitting the service activation instruction to the URL of the service (S201).

In response to the service activation instruction of S201, the MFP 10 receives a session ID from the function server 30 (S202). Incidentally, the session ID is generated in step S1305 of a function server process shown in FIG. 34 (explained later) which is executed by the control unit 31 of the function server 30 and transmitted by the function server 30 in step S1309 of the function server process.

Subsequently, the MFP 10 transmits the "MFP instruction inquiry" (inquiring about instructions to the MFP 10) to the function server 30 (S203). The session ID received in S202 is attached to the MFP instruction inquiry. In response to the MFP instruction inquiry of S203, the MFP 10 receives an instruction from the function server 30 (S204).

Subsequently, the MFP 10 judges whether the instruction received in S204 is a job activation instruction (the aforementioned UI job activation instruction, input job activation instruction or output job activation instruction) or not (S205). Incidentally, the job activation instruction is outputted in step S1503, S1507 or S1511 of a session process shown in FIG. 36 (explained later) which is executed by the control unit 31 of the function server 30. Along with the job activation instruction, a job ID and a destination URL of the job is received from the function server 30.

If the instruction received in S204 is a job activation instruction (S205: YES), the MFP 10 reserves resources necessary for the activation of the job (S206), starts a process for activating the designated job (designated job activation process) (S207), waits a prescribed time interval (S208), and returns to the step S203.

If the instruction received in S204 is not a job activation instruction (S205: NO), the MFP 10 judges whether the instruction is a job ending instruction (the aforementioned UI job ending instruction, input job ending instruction or output job ending instruction) or not (S209). Incidentally, the job ending instruction is outputted in step S1519, S1521 or S1523 of a session process shown in FIG. 37 (explained later) which is executed by the control unit 31 of the function server 30. Along with the job ending instruction, a job ID corresponding to the job to be ended is received from the function server 30.

If the instruction received in S204 is a job ending instruction (S209: YES), the MFP 10 ends the job corresponding to the job ID while releasing the resources (S210), waits the prescribed time interval (S208), and returns to the step S203.

If the instruction received in S204 is not a job ending instruction (S209: NO), the MFP 10 judges whether the instruction indicates "no instruction" or not, that is, whether or not the response to the MFP instruction inquiry of S203 indicates that there is no instruction (S211).

If the instruction received in S204 indicates "no instruction" (S211: YES), the MFP 10 waits the prescribed time interval (S208) and returns to the step S203.

If the instruction received in S204 does not indicate "no instruction" (S211: NO), the MFP 10 judges whether the instruction is the service ending instruction or not (S212). Incidentally, the service ending instruction is outputted in step S1526 of the session process shown in FIG. 37 (explained later) which is executed by the control unit 31 of the function server 30.

If the instruction received in S204 is the service ending instruction (S212: YES), the MFP 10 ends the session process of FIG. 22.

If the instruction received in S204 is not the service ending instruction, that is, if the instruction is none of the job activation instruction, the job ending instruction, the "no instruction" or the service ending instruction (S212: NO), the MFP 10 executes an instruction error process (e.g. displaying an error message on the display 52 of the operation panel 102a) (S213) and thereafter ends the session process of FIG. 22.

Figure 23:
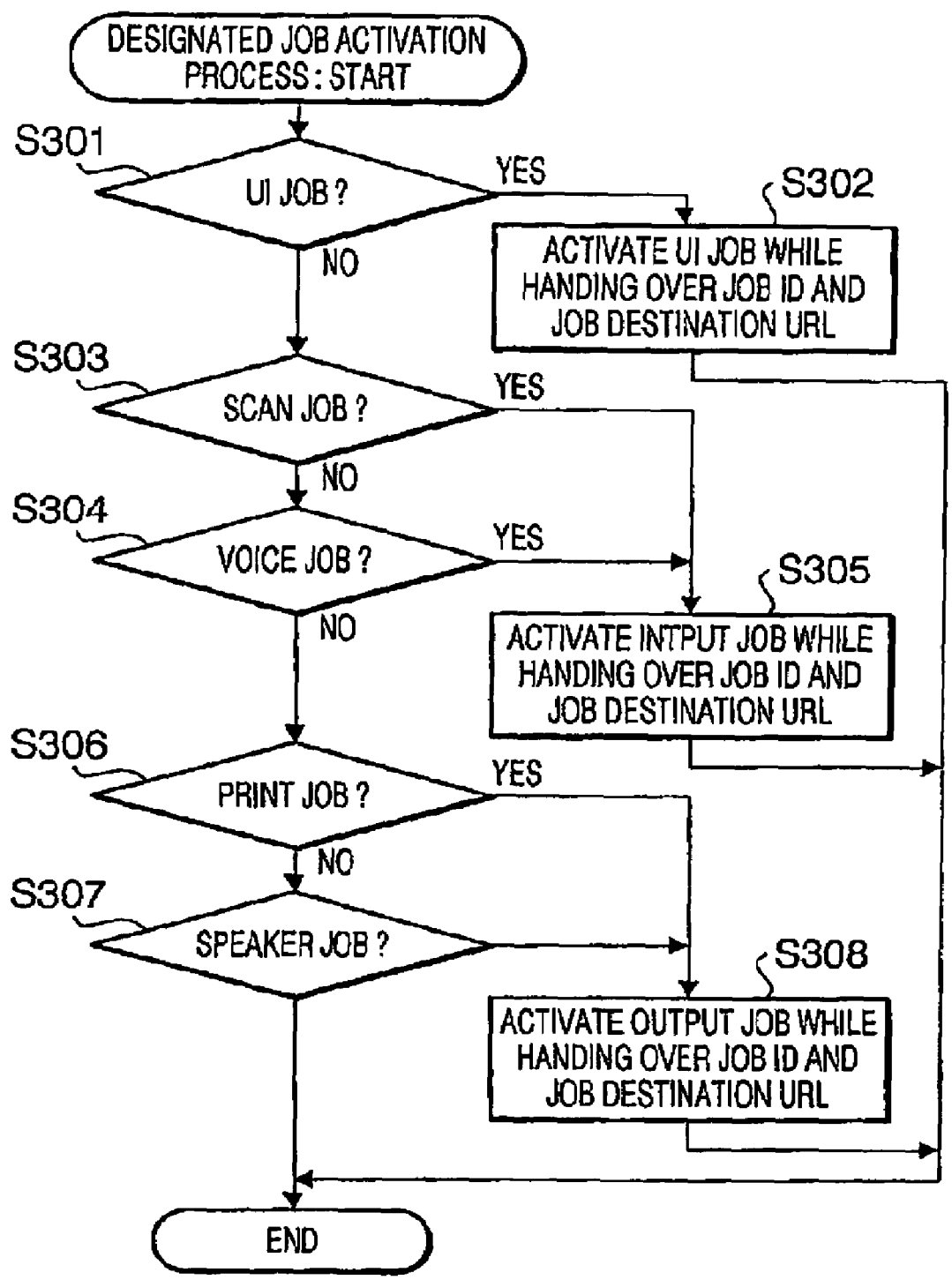
FIG. 23 is a flowchart showing a designated job activation process which is executed by the control unit of the MFP in accordance with aspects of the invention.

Next, the "designated job activation process" which is started in the step S207 of the session process (FIG. 22) will be explained referring to a flowchart of FIG. 23.

At the start of the designated job activation process, the MFP 10 judges whether the job designated by the job activation instruction is the UI job or not (S301). If the job designated by the job activation instruction is the UI job (S301: YES), the MFP 10 activates the UI job while handing over the job ID and the destination URL of the job (S302) and ends the designated job activation process.

If the job designated by the job activation instruction is not the UI job (S301: NO), the MFP 10 judges whether the job designated by the job activation instruction is the scan job or not (S303). If the job designated by the job activation instruction is not the scan job (S303: NO), the MFP 10 judges whether the job designated by the job activation instruction is a voice job or not (S304).

If the job designated by the job activation instruction is the scan job (S303: YES) or the voice job (S304: YES), the MFP 10 activates the input job while handing over the job ID and the destination URL of the job (S305) and ends the designated job activation process.

If the job designated by the job activation instruction is not the voice job (S304: NO), the MFP 10 judges whether the job designated by the job activation instruction is the print job or not (S306).

If the job designated by the job activation instruction is not the print job (S306: NO), the MFP 10 judges whether the job designated by the job activation instruction is a speaker job or not (S307).

If the job designated by the job activation instruction is the print job (S306: YES) or the speaker job (S307: YES), the MFP 10 activates the output job while handing over the job ID and the destination URL of the job (S308) and ends the designated job activation process.

If the job designated by the job activation instruction is not the speaker job, that is, if the designated job is none of the UI job, scan job, voice job, print job or speaker job (S307; NO), the MFP 10 ends the designated job activation process.

Figure 24:
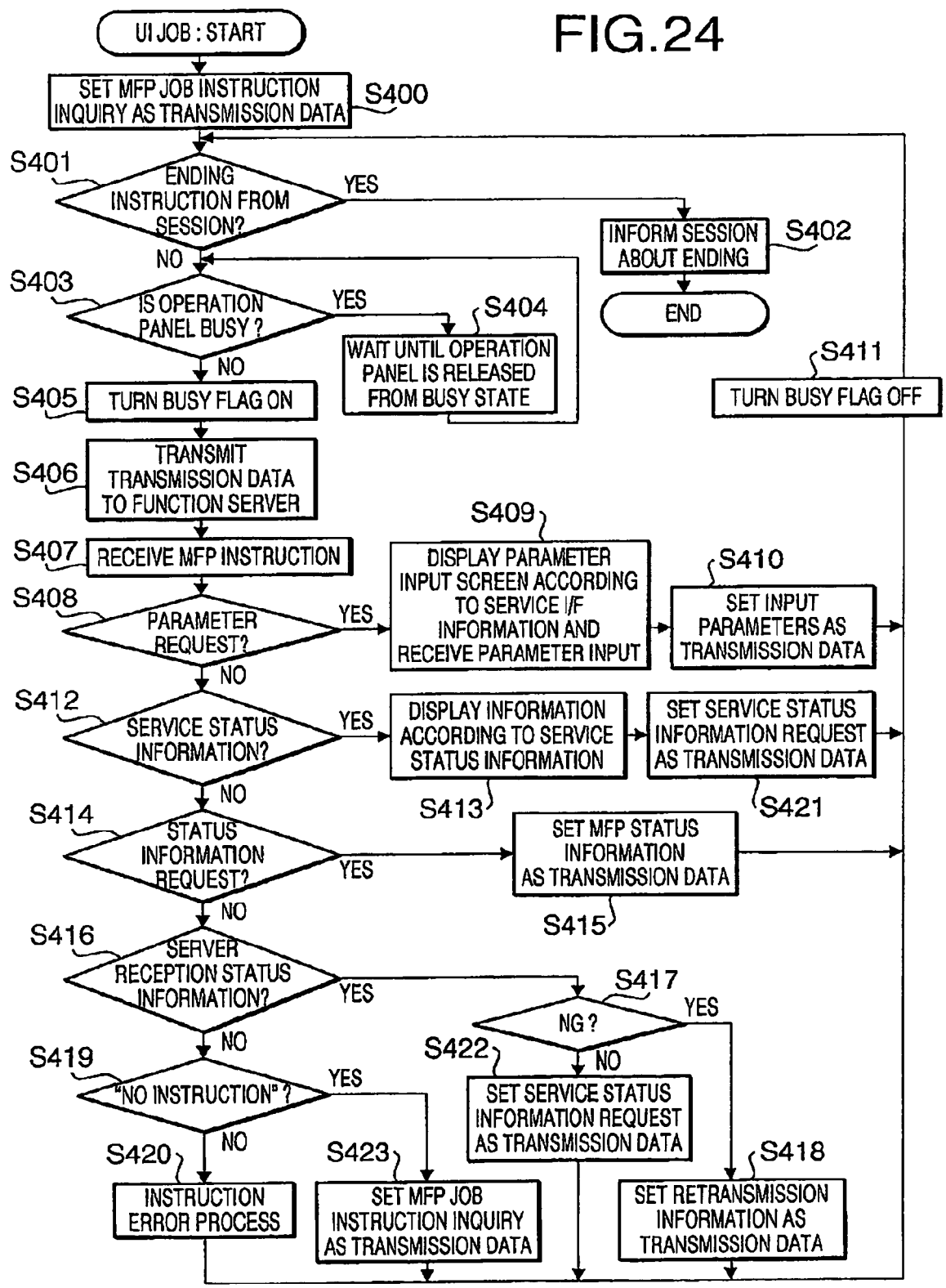
FIG. 24 is a flowchart showing a UI job which is executed by the control unit of the MFP in accordance with aspects of the invention.

Next, the UI job, which is activated in the step S302 of the designated job activation process (FIG. 23) to operate concurrently with the session process, will be explained referring to a flowchart of FIG. 24.

At the start of the UI job, the MFP 10 writes the MFP job instruction inquiry (inquiring about instructions to the MFP 10) in a prescribed storage area, as transmission data (S400). The transmission data is information that will be used in step S406 (explained later), in which the information written as the transmission data is transmitted to the function server 30 together with the session ID and the job ID. The storage area for the transmission data (transmission data storage area) is formed in a prescribed are of the RAM (not shown) of the control unit 101 of the MFP 10.

Subsequently, the MFP 10 judges whether there is an ending instruction from the session or not (S401). Incidentally, the ending instruction from the session is issued in the step S210 of the session process of FIG. 22 which is executed by the control unit 101 of the MFP 10.

If there is an ending instruction from the session (S401: YES), the MFP 10 informs the session about the ending (S402) and ends the UI job. If there is no ending instruction from the session (S401: NO), the MFP 10 judges whether the operation panel 102a is in a busy state or not (S403). Specifically, the MFP 10 judges that the operation panel 102a is in the busy state when a busy flag "Fu" (indicating whether the operation panel 102a is in the busy state or not) has been turned on (not in the busy state when the busy flag "Fu" is off).

If the operation panel 102a is in the busy state (S403: YES), the MFP 10 waits until the operation panel 102a is released from the busy state (S404) and thereafter returns to the step S403. If the operation panel 102a is not in the busy state (S403: NO), the MFP 10 turns the busy flag "Fu" on (S405) and transmits the information written as the transmission data to the function server 30 together with the session ID and the job ID (S406).

In response to the information transmitted in S406, the MFP 10 receives an MFP instruction from the function server 30 (S407).

Subsequently, the MFP 10 judges whether the MFP instruction received in S407 is the parameter request or not (S408). Incidentally, the parameter request is transmitted by the function server 30 in step S1102 of a UI job process shown in FIG. 38 (explained later) which is executed by the control unit 31 of the function server 30. Along with the parameter request, the aforementioned service I/F information 36 is received from the function server 30.

If the MFP instruction received in S407 is the parameter request (S408: YES), the MFP 10 displays the parameter input screen according to the service I/F information 36 on the display 52 of the operation panel 102a and thereby prompts the user to perform an input operation for setting parameters (S409), writes input parameters (parameters inputted by the user) in the transmission data storage area as the transmission data in order to transmit the input parameters to the function server 30 (S410), turns the busy flag "Fu" off (S411) and thereafter returns to the step S401. The parameters written as the transmission data will be transmitted to the function server 30 in the aforementioned step S406 when there is no ending instruction from the session (S401: NO) and the operation panel 102a is not in the busy state (S403: NO).

If the MFP instruction received in S407 is not the parameter request (S408: NO), the MFP 10 judges whether the MFP instruction is the service status information or not (S412). Incidentally, the service status information is transmitted by the function server 30 in step S1103 of the UI job process shown in FIG. 38 (explained later) which is executed by the control unit 31 of the function server 30. Along with the service status information, the service I/F information 36 and an error code are received from the function server 30.

If the MFP instruction received in S407 is the service status information (S412: YES), the MFP 10 displays information according to the service status information on the display 52 of the operation panel 102a (S413), writes the service status information request (an instruction requesting information on the operational status of the service executed by the function server 30) in the transmission data storage area as the transmission data in order to transmit the service status information request to the function server 30 (S421), turns the busy flag "Fu" off (S411) and thereafter returns to the step S401. The service status information request written as the transmission data will be transmitted to the function server 30 in the step S406 when there is no ending instruction from the session (S401: NO) and the operation panel 102a is not in the busy state (S403: NO).

If the MFP instruction received in S407 is not the service status information (S412: NO), the MFP 10 judges whether the MFP instruction is a status information request or not (S414).

If the MFP instruction received in S407 is the status information request (S414: YES), the MFP 10 writes the MFP status information (indicating the status of the MFP 10) in the transmission data storage area as the transmission data in order to transmit the MFP status information to the function server 30 (S415), turns the busy flag "Fu" off (S411) and thereafter returns to the step S401. The MFP status information written as the transmission data will be transmitted to the function server 30 in the step S406 when there is no ending instruction from the session (S401: NO) and the operation panel 102a is not in the busy state (S403: NO).

If the MFP instruction received in S407 is not the status information request (S414: NO), the MFP 10 judges whether the MFP instruction is the server reception status information (indicating whether the function server 30 received information from the MFP 10 normally or not) or not (S416).

If the MFP instruction received in S407 is the server reception status information (S416: YES), the MFP 10 judges whether the server reception status information indicates abnormal reception (NG) or not (S417).

If the server reception status information indicates abnormal reception (NG) (S417: YES), the MFP 10 writes previous information (information that was previously transmitted to the function server 30) in the transmission data storage area as the transmission data in order to retransmit the previous information (retransmission information) to the function server 30 (S418), turns the busy flag "Fu" off (S411) and thereafter returns to the step S401.

If the server reception status information does not indicate abnormal reception (NG) (S417: NO), the MFP 10 writes the service status information request (an instruction requesting information on the operational status of the service) in the transmission data storage area as the transmission data in order to transmit the service status information request to the function server 30 (S422), turns the busy flag "Fu" off (S411) and thereafter returns to the step S401.

Incidentally, the retransmission information or the service status information request written as the transmission data will be transmitted to the function server 30 in the step S406 when there is no ending instruction from the session (S401: NO) and the operation panel 102a is not in the busy state (S403: NO).

If the MFP instruction received in S407 is not the server reception status information (S416: NO), the MFP 10 judges whether the MFP instruction indicates "no instruction" or not, that is, whether or not the response to the MFP job instruction inquiry transmitted in S406 indicates that there is no instruction (S419).

If the MFP instruction received in S407 indicates "no instruction" (S419: YES), the MFP 10 writes the MFP job instruction inquiry (inquiring about instructions to the MFP 10) in the transmission data storage area as the transmission data in order to transmit the MFP job instruction inquiry to the function server 30 (S423), turns the busy flag "Fu" off (S411) and thereafter returns to the step S401. The MFP job instruction inquiry written as the transmission data will be transmitted to the function server 30 in the step S406 when there is no ending instruction from the session (S401: NO) and the operation panel 102a is not in the busy state (S403: NO).

If the MFP instruction received in S407 does not indicate "no instruction" (S419: NO), the MFP 10 executes the instruction error process (S420), turns the busy flag "Fu" off (S411) and thereafter returns to the step S401.

Next, the input job, which is activated in the step S305 of the designated job activation process (FIG. 23) to operate concurrently with the session process and the UI job, will be explained referring to a flowchart of FIG. 25.

At the start of the input job, the MFP 10 judges whether the input device (the reading unit 103 (when the service is a service regarding image data generated by the reading unit 103) or the sound input unit 107 (when the service is a service regarding sound data generated by the sound input unit 107)) is in a busy state or not (S501). Specifically, the MFP 10 judges that the input device is in the busy state when a busy flag "Fi" (indicating whether the input device is in the busy state or not) has been turned on (not in the busy state when the busy flag "Fi" is off).

If the input device is in the busy state (S501: YES), the MFP 10 waits until the input device is released from the busy state (S502) and thereafter returns to the step S501. If the input device is not in the busy state (S501: NO), the MFP 10 turns the busy flag "Fi" on (S503) and transmits the MFP status information to the function server 30 together with the session ID, the job ID and the error code (S504).

In response to, the MFP status information transmitted in S504, the MFP 10 receives the MFP parameters from the function server 30 (S505). Incidentally, the MFP parameters are transmitted by the function server 30 in step S1703 of a scan job process shown in FIG. 39 (explained later) which is executed by the control unit 31 of the function server 30.

Subsequently, the MFP 10 judges whether there is an ending instruction from the session or not (S506). Incidentally, the ending instruction from the session is issued in the step S210 of the session process of FIG. 22 which is executed by the control unit 101 of the MFP 10.

If there is no ending instruction from the session (S506: NO), the MFP 10 judges whether the MFP parameters were received normally in S505 or not (S507). If the MFP parameters were not received normally (S507: NO), the MFP 10 informs the function server 30 about the abnormal reception (NG) as the MFP reception status information indicating whether the MFP 10 received information from the function server 30 normally or not (S508) and thereafter returns to the step S505. Incidentally, the MFP reception status information is transmitted to the function server 30 together with the session ID and the job ID.

If the MFP parameters were received normally (S507: YES), the MFP 10 informs the function server 30 about the normal reception (OK) as the MFP reception status information (S509).

Subsequently, the MFP 10 receives the input data request from the function server 30 (S510). Incidentally, the input data request is transmitted by the function server 30 in step S1709 of the scan job process shown in FIG. 39 (explained later) which is executed by the control unit 31 of the function server 30.

Subsequently, the MFP 10 judges whether there is an ending instruction from the session or not, similarly to S506

(S511). If there is no ending instruction from the session (S511: NO), the MFP 10 judges whether the input data request was received normally in the step S510 or not (S512). If the input data request was not received normally (S512: NO), the MFP 10 informs the function server 30 about the abnormal reception (NG) (S513) and thereafter returns to the step S510.

If the input data request was received normally (S512: YES), the MFP 10 judges whether the scanning of a document (S145 of FIG. 21) has already been executed or not by referring to the "scanned flag" which is turned on in S147 of FIG. 21 (S521).

If the scanning of a document has already been executed, that is, if input data to be transmitted to the function server 30 (scan data) has already been read by the MFP 10 (S521: YES), the MFP 10 transmits the input data (scan data) obtained by the scanning of S145 to the function server 30 (S523) and turns the scanned flag off (S525).

If the scanning of a document has not been executed yet, that is, if the input data to be transmitted to the function server 30 has not been prepared by the MFP 10 (S521: NO), the MFP 10 sets the parameters, prompts the user to perform an input operation (displays a message like "Set a document on the scanner and press OK key." or "Lift the handset and input voice." on the display 52 of the operation panel 102a) and successively transmits the input data to the function server 30 (S534). The input data may also be image data read out from a semiconductor memory (e.g. memory card), image data read out from the storage unit 106, etc. Incidentally, the input data is transmitted to the function server 30 together with the session ID and the job ID.

Subsequently, the MFP 10 resets the parameters set in the step S534 (S535). Subsequently, the MFP 10 receives the service status information from the function server 30 (S536) and turns the busy flag "Fi" off (S537). Incidentally, the service status information is transmitted by the function server 30 in step S1708 or S1712 of the scan job process shown in FIG. 39 (explained later) which is executed by the control unit 31 of the function server 30.

If there is an ending instruction from the session in the step S506 (S506: YES) or S511 (S511: YES), the MFP 10 directly advances to the step S537 and turns the busy flag "Fi" off. Thereafter, the MFP 10 informs the session about the ending (S538) and ends the input job.

Figure 26:
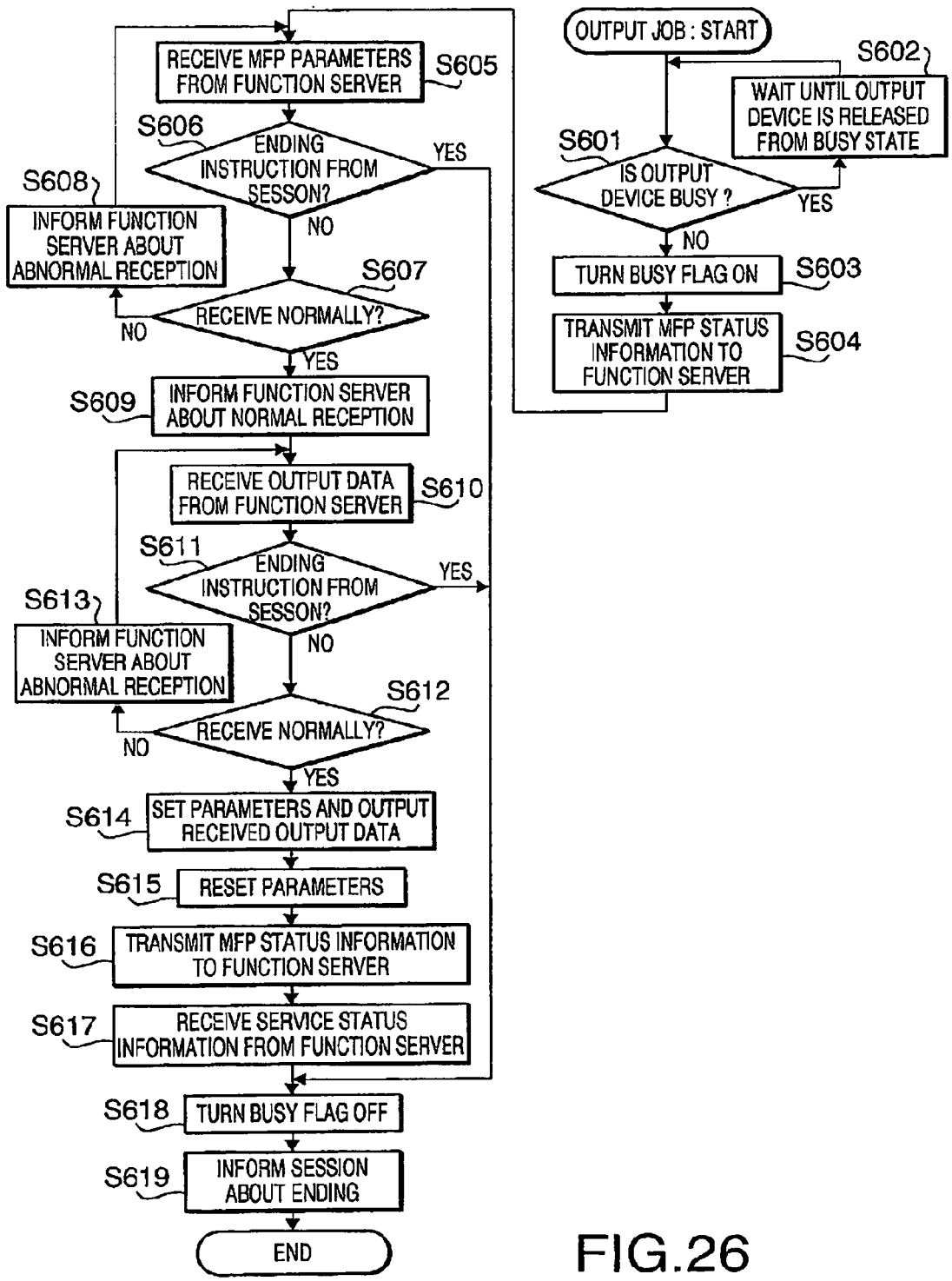
FIG. 26 is a flowchart showing an output job which is executed by the control unit of the MFP in accordance with aspects of the invention.

Next, the output job, which is activated in the step S308 of the designated job activation process (FIG. 23) to operate concurrently with the session process, the UI job and the input job, will be explained referring to a flowchart of FIG. 26.

At the start of the output job, the MFP 10 judges whether the output device (the recording unit 104 (when the service is a service regarding image data representing an image to be printed out by the recording unit 104) or the sound output unit 108 (when the service is a service regarding sound data representing sound to be outputted by the sound output unit 108)) is in a busy state or not (S601). Specifically, the MFP 10 judges that the output device is in the busy state when a busy flag "Fo" (indicating whether the output device is in the busy state or not) has been turned on (not in the busy state when the busy flag "Fo" is off).

If the output device is in the busy state (S601: YES), the MFP 10 waits until the output device is released from the busy state (S602) and thereafter returns to the step S601. If the output device is not in the busy state (S601: NO), the MFP 10 turns the busy flag "Fo" on (S603) and transmits the MFP status information to the function server 30 together with the session ID, the job ID and the error code (S604).

In response to the MFP status information transmitted in S604, the MFP 10 receives the MFP parameters from the function server 30 (S605). Incidentally, the MFP parameters are transmitted by the function server 30 in step S1803 of a print job process shown in FIG. 40 (explained later) which is executed by the control unit 31 of the function server 30.

Subsequently, the MFP 10 judges whether there is an ending instruction from the session or not (S606). Incidentally, the ending instruction from the session is issued in the step S210 of the session process of FIG. 22 which is executed by the control unit 101 of the MFP 10. If there is no ending instruction from the session (S606: NO), the MFP 10 judges whether the MFP parameters were received normally in S605 or not (S607).

If the MFP parameters were not received normally (S607: NO), the MFP 10 informs the function server 30 about the abnormal reception (NG) as the MFP reception status information indicating whether the MFP 10 received information from the function server 30 normally or not (S608) and thereafter returns to the step S605. Incidentally, the MFP reception status information is transmitted to the function server 30 together with the session ID and the job ID.

If the MFP parameters were received normally (S607: YES), the MFP 10 informs the function server 30 about the normal reception (OK) as the MFP reception status information (S609).

Subsequently, the MFP 10 receives the output data (e.g. image data or sound data) from the function server 30 (S610). Incidentally, the output data is transmitted by the function server 30 in step S1809 of the print job process shown in FIG. 40 (explained later) which is executed by the control unit 31 of the function server 30.

Subsequently, the MFP 10 judges whether there is an ending instruction from the session or not, similarly to S606 (S611). If there is no ending instruction from the session (S611: NO), the MFP 10 judges whether the output data was received normally in the step S610 or not (S612). If the output data was not received normally (S612: NO), the MFP 10 informs the function server 30 about the abnormal reception (NG) (S613) and thereafter returns to the step S610.

If the output data was received normally (S612: YES), the MFP 10 sets the parameters and executes a process for outputting the output data (e.g. outputting of an image represented by the image data or sound represented by the sound data) (S614). Subsequently, the MFP 10 resets the parameters set in the step S614 (S615) and transmits the MFP status information to the function server 30 together with the session ID, the job ID and the error code (S616).

Subsequently, the MFP 10 receives the service status information from the function server 30 (S617) and turns the busy flag "Fo" off (S618). Incidentally, the service status information is transmitted by the function server 30 in step S1808 or S1812 of the print job process shown in FIG. 40 (explained later) which is executed by the control unit 31 of the function server 30.

If there is an ending instruction from the session in the step S606 (S606: YES) or S611 (S611: YES), the MFP 10 directly advances to the step S618 and turns the busy flag "Fo" off. Thereafter, the MFP 10 informs the session about the ending (S619) and ends the output job.

In the following, a directory server process executed by the control unit 21 of the directory server 20 will be explained referring to flowcharts of FIGS. 27-33. The directory server process is started when an HTTP request is received by the directory server 20.

At the start of the directory server process, the control unit 21 of the directory server 20 (hereinafter also referred to simply as "the directory server 20") receives an HTTP request (S701).

Subsequently, the directory server 20 judges whether the HTTP request received in S701 is a service registration instruction or not (S702). Incidentally, the service registration instruction is transmitted by the function server 30 in step S1906 of a service addition process shown in FIG. 41 (explained later) which is executed by the control unit 31 of the function server 30.

If the HTTP request received in S701 is a service registration instruction (S702: YES), the directory server 20 receives the contents of the service definition information 25 and thereby registers a new service (S703). Specifically, information on the new service is registered in the service definition information 25 stored in the service definition information storage unit 24 of the storage unit 23. Thereafter, the directory server 20 transmits an HTTP response (S704) and ends the directory server process.

If the HTTP request received in S701 is not a service registration instruction (S702: NO), the directory server 20 judges whether the HTTP request is a service update instruction (requesting or reporting alteration of a URL for requesting a service, for example) or not (S705). Incidentally, the service update instruction is transmitted by the function server 30 in step S2003 of a service alteration process shown in FIG. 42 (explained later) which is executed by the control unit 31 of the function server 30.

If the HTTP request received in S701 is a service update instruction (S705: YES), the directory server 20 receives the contents of the service definition information 25 and thereby updates a service (S706). Specifically, information on a service included in the service definition information 25 stored in the service definition information storage unit 24 of the storage unit 23 is updated. Thereafter, the directory server 20 transmits an HTTP response (S704) and ends the directory server process If the HTTP request received in S701 is not a service update instruction (S705: NO), the directory server 20 judges whether the HTTP request is a service deletion instruction or not (S707). Incidentally, the service deletion instruction is transmitted by the function server 30 in step S2102 of a service deletion process shown in FIG. 43 (explained later) which is executed by the control unit 31 of the function server 30.

If the HTTP request received in S701 is a service deletion instruction (S707: YES), the directory server 20 deletes service definition information 25 corresponding to a service designated by the service deletion instruction (S708). Specifically, information on the designated service included in the service definition information 25 stored in the service definition information storage unit 24 of the storage unit 23 is deleted. Thereafter, the directory server 20 transmits an HTTP response (S704) and ends the directory server process.

If the HTTP request received in S701 is not a service deletion instruction (S707: NO), the directory server 20 judges whether the HTTP request is the service list reference request or not (S709). Incidentally, the service list reference request is transmitted by the MFP 10 in the step S106 Of the MFP process (FIG. 20) executed by the control unit 101 of the MFP 10.

If the HTTP request received in S701 is the service list reference request (S709: YES), the directory server 20 reads out the top service definition information 25 from the service definition information storage unit 24 of the storage unit 23 (S710), transmits an HTTP response containing the top service definition information 25 (S704) and ends the directory server process.

If the HTTP request received in S701 is not the service list reference request (S709: NO), the directory server 20 judges whether the HTTP request is the service reference request or not (S711). Incidentally, the service reference request is transmitted by the MFP 10 in the step S115 of the MFP process (FIG. 20) executed by the control unit 101 of the MFP 10.

If the HTTP request received in S701 is the service reference request (S711: YES), the directory server 20 reads out service definition information 25 (designated by an ID or a URL) from the service definition information storage unit 24 of the storage unit 23 (S712), transmits an HTTP response containing the service definition information 25 (S704) and ends the directory server process.

If the HTTP request received in S701 is not the service reference request (S711: NO), the directory server 20 judges whether the HTTP request is the suitable service search request or not (S721). Incidentally, the suitable service search request is transmitted by the MFP 10 in the step S153 of the MFP process (FIG. 21) executed by the control unit 101 of the MFP 10.

If the HTTP request received in S701 is the suitable service search request (S721: YES), the directory server 20 advances to step S741 shown in FIG. 28 and initializes the service presentation list (see FIG. 18). Specifically, all the statuses in the service presentation list are reset to "-". Subsequently, the directory server 20 receives the service search data (S743) and executes a "subroutine 3" (as a group of steps analyzing area information) (S745).

Figure 29:
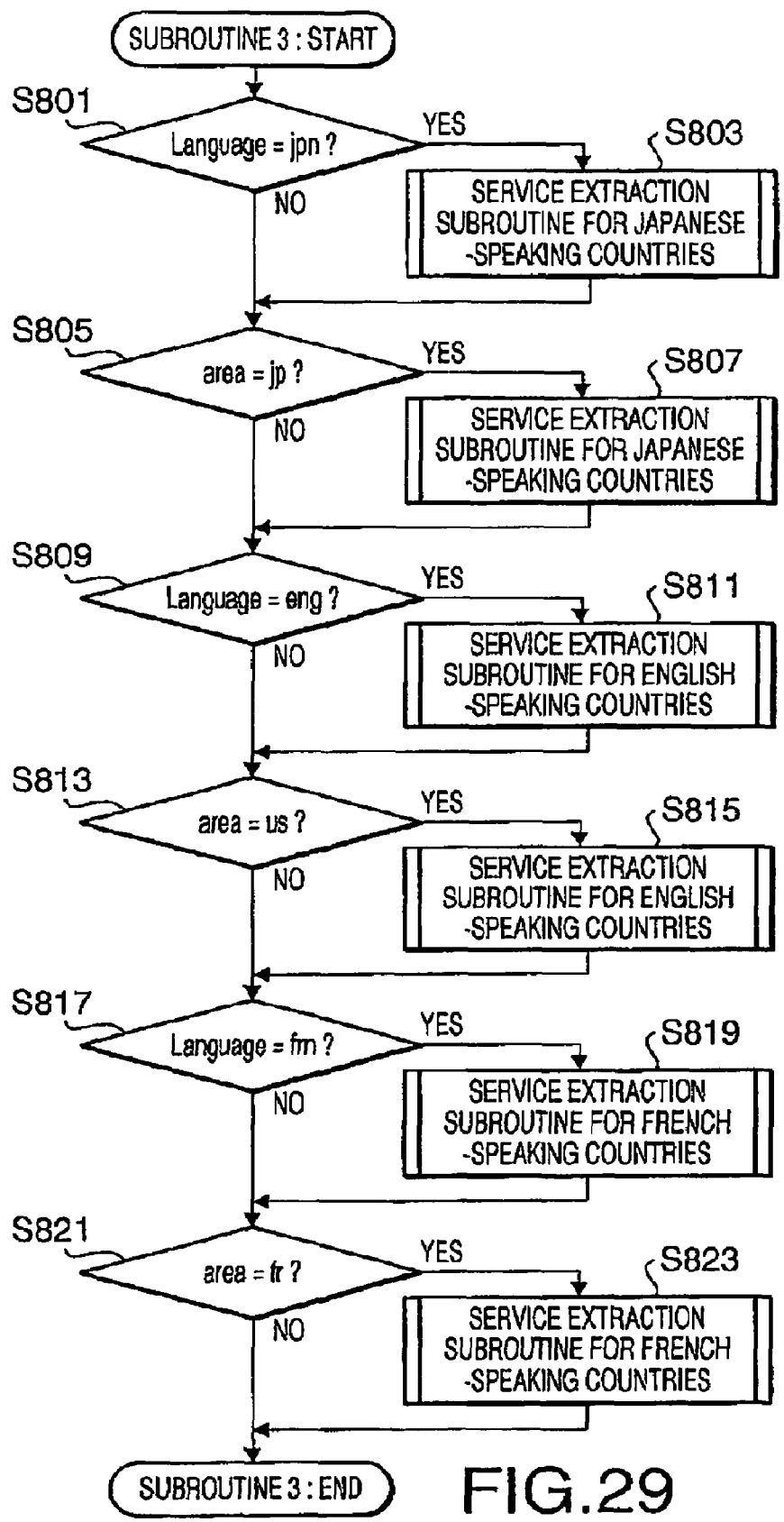
FIG. 29 is a flowchart showing a subroutine 3 of the directory server process in accordance with aspects of the invention.

FIG. 29 is a flowchart showing the details of the "subroutine 3". First, the directory server 20 judges whether the item "Language" in the service search data is "jpn" or not (S801). If the "Language" is "jpn" (S801: YES), the directory server 20 executes a service extraction subroutine for Japanese-speaking countries (S803).

Figure 31:
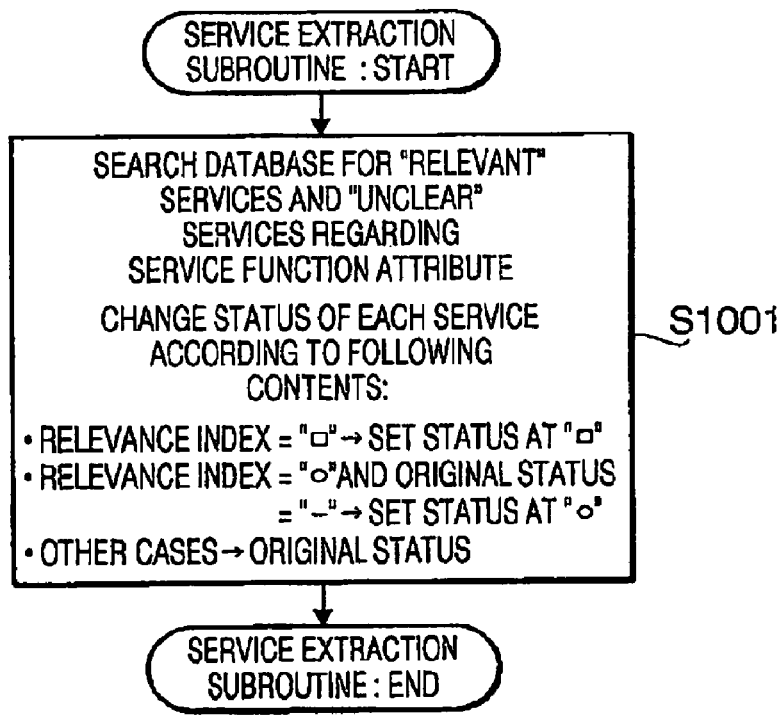
FIG. 31 is a flowchart showing a service extraction subroutine of the directory server process in accordance with aspects of the invention.

FIG. 31 is a flowchart showing the service extraction subroutine for Japanese-speaking countries. In step S1001, the directory server 20 searches a database (i.e. the service definition information table shown in FIG. 17) for services that are relevant to a service function attribute and services that are "-; Unclear" regarding the service function attribute. While the description "REGARDING SERVICE FUNCTION ATTRIBUTE" in FIG. 31 does not specify which service function attribute it is (in order to describe similar processes inclusively), the column "for Japanese-speaking Countries" of the service definition information table is searched in this case since the step S803 focuses on the service function attribute "for Japanese-speaking Countries" out of the m types of service function attributes in the service definition information table. For each of the n types of services, information is extracted from the service definition information table (FIG. 17) and the service presentation list (FIG. 18), and the "status" of each service in the service presentation list is changed according to the following conditions 1-3.

(Condition 1): RELEVANCE INDEX="□"→SET STATUS AT "□" (When the relevance index regarding a service extracted from (the column of) the service definition information table is "□: Irrelevant", the "status" of the service in the service presentation list is set at (changed to) "□".)

(Condition 2): RELEVANCE INDEX="○" AND ORIGINAL STATUS="-"→SET STATUS AT "○" (When the relevance index regarding a service extracted from (the column of) the service definition information table is "○: Relevant Service" and the "status" of the service extracted from the service presentation list is "-", the "status" of the service in the service presentation list is set at (changed to) "○".)

(Condition 3): OTHER CASES→ORIGINAL STATUS (In cases other than the condition 1 or 2, the "status" of the service in the service presentation list is not changed.)

By the above step S1001, the "status" of each service in the service presentation list is updated taking the relevance index regarding the particular service function attribute ("for Japanese-speaking Countries" in the case of S803) into consideration, by which the step S803 of FIG. 29 is completed.

After finishing the step S803 or when the judgment of the step S801 is "NO", the directory server 20 judges whether the item "Area" in the service search data is "jp" or not (S805). If the "Area" is "jp" (S805: YES), the directory server 20 executes the service extraction subroutine for Japanese-speaking countries (S807). The service extraction subroutine for Japanese-speaking countries executed in the step S807 is the same as that of S807 and thus repeated description thereof is omitted here.

After finishing the step S807 or when the judgment of the step S805 is "NO", the directory server 20 judges whether the item "Language" in the service search data is "eng" or not (S809). If the "Language" is "eng" (S809: YES), the directory server 20 executes a service extraction subroutine for English-speaking countries (S811).

The service extraction subroutine for English-speaking countries is also executed according to FIG. 31. In the step S1001, the directory server 20 searches the database (the service definition information table shown in FIG. 17) for services that are relevant to a service function attribute and services that are "-: Unclear" regarding the service function attribute. While the description "REGARDING SERVICE FUNCTION ATTRIBUTE" in FIG. 31 does not specify which service function attribute it is in order to describe similar processes inclusively as mentioned above, the column "for English-speaking Countries" of the service definition information table is searched in this case since the step S811 focuses on the service function attribute "for English-speaking Countries" out of the m types of service function attributes in the service definition information table (This part is the only difference from S803.). For each of the n types of services, information is extracted from the service definition information table (FIG. 17) and the service presentation list (FIG. 18), and the "status" of each service in the service presentation list is changed according to the aforementioned conditions 1-3 (The details have been explained above and thus repeated description thereof is omitted here.).

By the above step S1001, the "status" of each service in the service presentation list is updated taking the relevance index regarding the particular service function attribute ("for English-speaking Countries" in the case of S811) into consideration, by which the step S811 of FIG. 29 is completed.

After finishing the step S811 or when the judgment of the step S809 is "NO", the directory server 20 judges whether the item "Area" in the service search data is "us" or not (S813). If the "Area" is "us" (S813: YES), the directory server 20 executes the service extraction subroutine for English-speaking countries (S815). The service extraction subroutine For English-speaking countries executed in the step S815 is the same as that of S811 and thus repeated description thereof is omitted here.

After finishing the step S815 or when the judgment of the step S813 is "NO", the directory server 20 judges whether the item "Language" in the service search data is "frn" or not (S817). If the "language" is "frn" (S817: YES), the directory server 20 executes a service extraction subroutine for French-speaking countries (S819).

The service extraction subroutine for French-speaking countries is also executed according to FIG. 31. In the step S1001, the directory server 20 searches the database (the service definition information table shown in FIG. 17) for services that are relevant to a service function attribute and services that are "-: Unclear" regarding the service function attribute. While the description "REGARDING SERVICE FUNCTION ATTRIBUTE" in FIG. 31 does not specify which service function attribute it is in order to describe similar processes inclusively as mentioned above, the column "for French-speaking Countries" of the service definition information table is searched in this case since the step S819 focuses on the service function attribute "for French-speaking Countries" out of the m types of service function attributes in the service definition information table (This part is the only difference from S803 or S811.). As above, the service extraction subroutine of FIG. 31 is called up repeatedly while changing the service function attribute to be focused on. While the service extraction subroutine of FIG. 31 is executed repeatedly also in processes which will be explained later, the details of each service extraction subroutine will be omitted for the sake or simplicity of explanation.

After finishing the step S819 or when the judgment of the step S817 is "NO", the directory server 20 judges whether the item "Area" in the service search data is "fr" or not (S821). If the "Area" is "fr" (S821: YES), the directory server 20 executes the service extraction subroutine for French-speaking countries (S823). The service extraction subroutine for French-speaking countries executed in the step S823 is the same as that of S819 and thus repeated description thereof is omitted here. After finishing the step S823 or when the judgment of the step S821 is "NO", the subroutine 3 of FIG. 29 is ended.

After finishing the subroutine 3 (S745 of FIG. 28), the directory server 20 judges whether the item "MPTraySize" in the service search data is "postcard" or not (S747). If the "MPTraySize" is "postcard" (S747: YES), the directory server 20 executes a service extraction subroutine for postcard printing (S749). The service extraction subroutine for postcard printing is also executed according to FIG. 31, in which the column "for Postcard Printing" of the service definition information table is searched and the "status" of each service in the service presentation list is updated taking the relevance index regarding the particular service function attribute ("for Postcard Printing" in the case of S749) into consideration After finishing the step S749 or when the judgment of the step S747 is "NO", the directory server 20 judges whether the item "TargetDataType" in the service search data is "image" or not (S755). If the "TargetDataType" is "image" (S755: YES), the directory server 20 executes a service extraction subroutine for scanned images (S757). The service extraction subroutine for scanned images (S757) is also executed according to FIG. 31, in which the column "Service for Scanned Image" of the service definition information table is searched and the "status" of each service in the service presentation list is updated taking the relevance index regarding the particular service function attribute ("Service for Scanned Image" in the case of S757) into consideration. After finishing the step S757, the directory server 20 executes a "subroutine 2" (S759).

Figure 32:
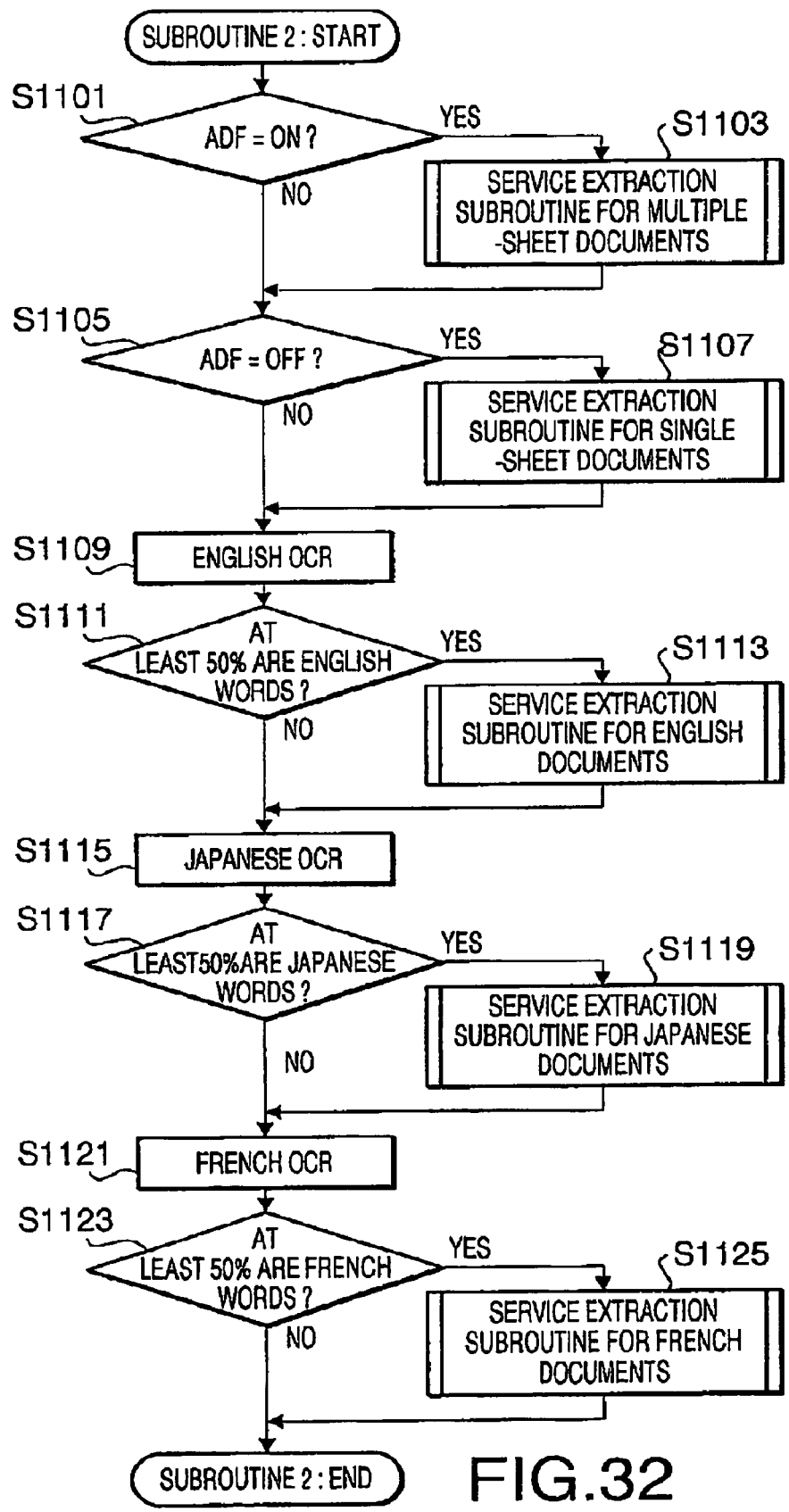
FIG. 32 is a flowchart showing a subroutine 2 of the directory server process in accordance with aspects of the invention.

FIG. 32 is a flowchart showing the details of the "subroutine 2". First, the directory server 20 judges whether the item "ADF" in the service search data is "ON" or not (S1101). If the "ADF" is "ON" (S1101: YES), the directory server 20 executes a service extraction subroutine for multiple-sheet documents (S1103). The service extraction subroutine for multiple-sheet documents (S1103) is also executed according to FIG. 31, in which the column "for Multiple-sheet Document" of the service definition information table is searched and the "status" of each service in the service presentation list is updated taking the relevance index regarding the particular service function attribute ("for Multiple-sheet Document" in the case of S1103) into consideration.

After finishing the step S1103 or when the judgment of the step S1101 is "NO", the directory server 20 judges whether the item "ADF" in the service search data is "OFF" or not (S1105). If the "ADF" is "OFF" (S1105: YES), the directory server 20 executes a service extraction subroutine for single-sheet documents (S1107). The service extraction subroutine for single-sheet documents (S1107) is also executed according to FIG. 31, in which the column "for Single-sheet Document" of the service definition information table is searched and the "status" of each service in the service presentation list is updated taking the relevance index regarding the particular service function attribute ("for Single-sheet Document" in the case of S1107) into consideration.

After finishing the step S1107 or when the judgment of the step S1105 is "NO", the directory server 20 converts image data handed over to the directory server 20 (image data sandwiched between Data tags <Data> and </Data>) into English text on a trial basis by executing an English OCR process to the image data (S1059) and judges whether at least 50% of the words contained in the text are English words or not (S1111). If at least 50% of the words of the text are English words (S111: YES), the directory server 20 executes a service extraction subroutine for English documents (S113). The service extraction subroutine for English documents (S1113) is also executed according to FIG. 31, in which the column "for English Document" of the service definition information table is searched and the "status" of each service in the service presentation list is updated taking the relevance index regarding the particular service function attribute ("for English Document" in the case of S1113) into consideration.

If the judgment of the step S1111 is "NO", the directory server 20 converts the image data handed over to the directory server 20 (image data sandwiched between Data tags <Data> and </Data>) into Japanese text on a trial basis by executing a Japanese OCR process to the image data (S1115) and judges whether at least 50% of the words contained in the text are Japanese words or not (S1117). If at least 50% of the words of the text are Japanese words (S1117: YES), the directory server 20 executes a service extraction subroutine for Japanese documents (S1119). The service extraction subroutine for Japanese documents (S1119) is also executed according to FIG. 31, in which the column "for Japanese Document" of the service definition information table is searched and the "status" of each service in the service presentation list is updated taking the relevance index regarding the particular service function attribute ("for Japanese Document" in the case of S1119) into consideration.

If the judgment of the step S1117 is "NO", the directory server 20 converts the image data handed over to the directory server 20 (image data sandwiched between Data tags <Data> and </Data>) into French text on a trial basis by executing a French OCR process to the image data (S1121) and judges whether at least 50% of the words contained in the text are French words or not (S1123). If at least 50% of the words of the text are French words (S1123: YES), the directory server 20 executes a service extraction subroutine for French documents (S1125). The service extraction subroutine for French documents (S1125) is also executed according to FIG. 31, in which the column "for French Document" of the service definition information table is searched and the "status" of each service in the service presentation list is updated taking the relevance index regarding the particular service function attribute ("for French Document" in the case of S1125) into consideration.

After finishing the step S1113, S1119 or S1125 or when the judgment of the step S1123 is "NO", the subroutine 2 of FIG. 32 (S759 of FIG. 28) is ended.

Figure 33:
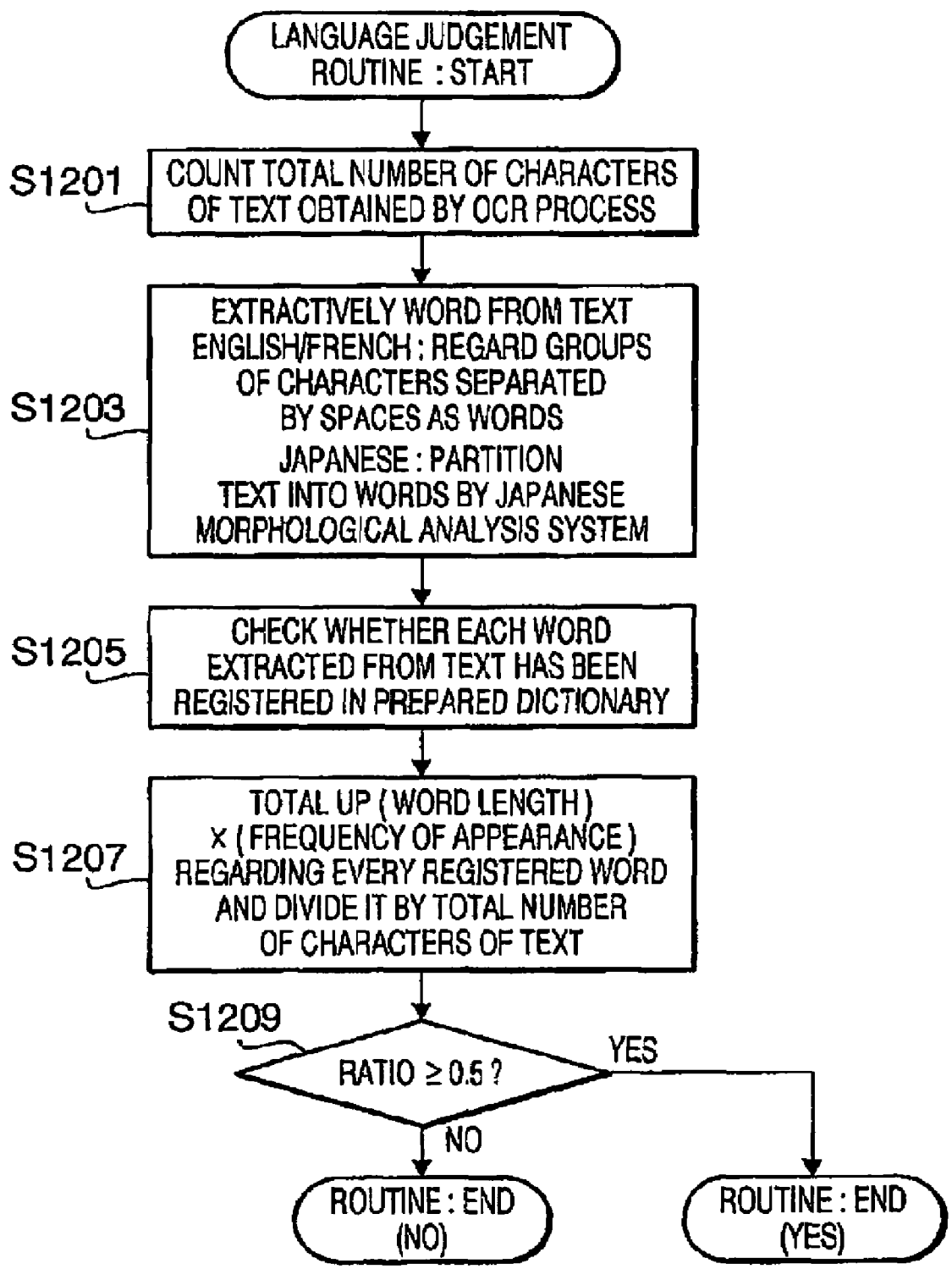
FIG. 33 is a flowchart showing a language judgment routine executed in the subroutine 2 in accordance with aspects of the invention.

While each language judgment step (S1111, S1117, S1123) in the above subroutine 2 Judges whether at least 50% of the text obtained by the OCR process are words of each language or not, the language judgment step may be executed according to a flowchart shown in FIG. 33.

First, the total number of characters contained in the text obtained by the OCR process is counted (S1201) and every word is extracted from the text (S1203). When the language is English or French, groups of characters separated by spaces can be regarded as words. When the language is Japanese, the text is partitioned into words by use of a Japanese morphological analysis system. Subsequently, whether each word extracted from the text has been registered in a prepared dictionary or not is checked (S1205). The total number of characters of registered words (registered in the dictionary) in the text is obtained by totaling up (word length)×(frequency of appearance) regarding every registered word, and the total number of characters of registered words is divided by the total number of characters of the text obtained in S1201 (S1207). Finally, whether or not the ratio obtained by S1207 is 0.5 or more is judged as the language judgment of S1111, S1117 or S1123 (S1208).

Returning to FIG. 28, if the judgment of S755 is "NO", the directory server 20 judges whether the item "TargetDataType" in the service search data is "photo" or not (S761). If the "TargetDataType" is "photo" (S761: YES), the directory server 20 executes a service extraction subroutine for digital photos (S763). The service extraction subroutine for digital photos (S763) is also executed according to FIG. 31, in which the column "for Digital Photo" of the service definition information table is searched and the "status" of each service in the service presentation list is updated taking the relevance index regarding the particular service function attribute ("for Digital Photo" in the case of S763) into consideration. After finishing the step S763, the directory server 20 executes a "subroutine 1" (S765).

Figure 30:
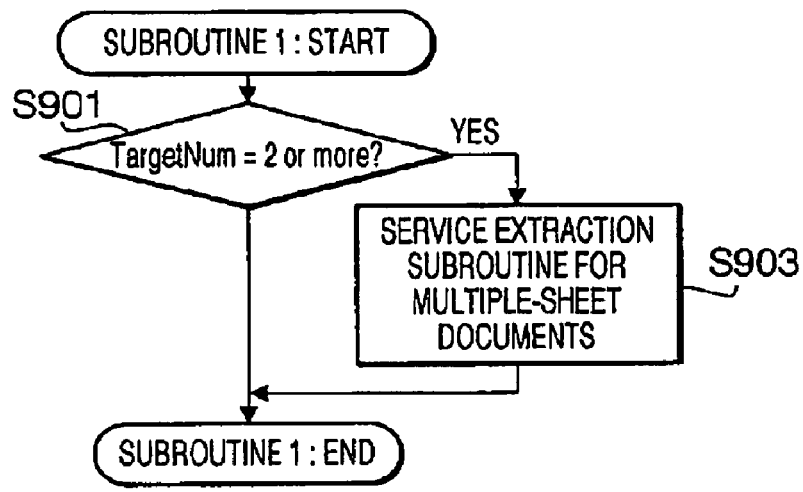
FIG. 30 is a flowchart showing a subroutine 1 of the directory server process in accordance with aspects of the invention.

FIG. 30 is a flowchart showing the details of the "subroutine 1". First, the directory server 20 judges whether or not the item "TargetNum" in the service search data is 2 or more (S901). If the "TargetNum" is 2 or more (S901: YES), the directory server 20 executes the service extraction subroutine for multiple-sheet documents (S903). The service extraction subroutine for multiple-sheet documents (S903) is also executed according to FIG. 31, in which the column "for Multiple-sheet Document" of the service definition information table is searched and the "status" of each service in the service presentation list is updated taking the relevance index regarding the particular service function attribute ("for Multiple-sheet Document" in the case of S903) into consideration.

After finishing the step S903 or when the judgment of the step S901 is "NO", the subroutine 1 of FIG. 30 (S765 of FIG. 28) is ended.

If the judgment of S761 is "NO", the directory server 20 judges whether the item "TargetDataType" in the service search data is "voice" or not (S767). If the "TargetDataType" is "voice" (S767: YES), the directory server 20 executes a service extraction subroutine for voice (S769). The service extraction subroutine for voice (S769) is also executed according to FIG. 31, in which the column "for Voice" of the service definition information table is searched and the "status" of each service in the service presentation list is updated taking the relevance index regarding the particular service function attribute ("for Voice" in the case of S769) into consideration.

When the step S759, S765 or S769 is finished or when the judgment of the step S767 is "NO" (that is, when the service presentation list has been completed), the directory server 20 judges whether or not the service presentation list includes any service whose "status" is "○" (S771). If the service presentation list includes no service whose status is "○" (S771: NO), it means that the directory server 20 presumes no service as a service that the MFP 10 is likely to request the function server 30 to execute. In this case, the directory server 20 generates a service list that includes the URL of the service list of the directory server 20 as a service (S773). On the other hand, if the service presentation list includes one or more services whose statuses are "○" (S771: YES), it means that the directory server 20 presumes one or more services that the MFP 10 is likely to request the function server 30 to execute. In this case, the directory server 20 generates a service list that includes the services having statuses "○" in the service presentation list (S775).

In short, the directory server 20 generates a service list including services that the MFP 10 is likely to request the function server 30 to execute when such services are found. When there is no service that the MFP 10 is likely to request the function server 30 to execute, the directory server 20 generates a service list including general services on the service list that is used in the "tree-type service search function".

Figure 27:
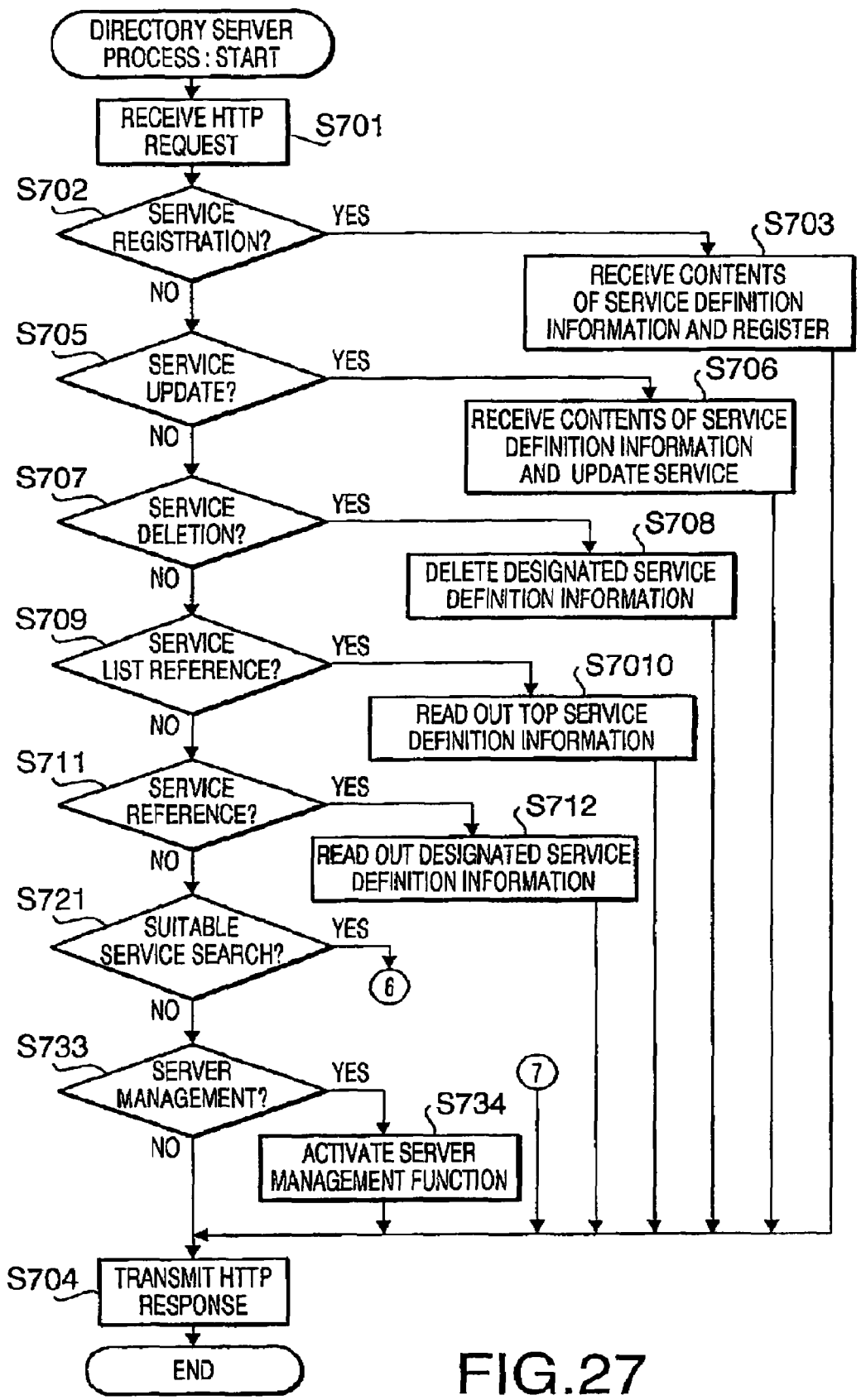
FIGS. 27 and 28 are flowcharts showing a directory server process executed by a control unit of the directory server in accordance with aspects of the invention.

After finishing the step S773 or S775, the directory server 20 transmits an HTTP response containing the generated service list (S704) and ends the directory server process of FIG. 27.

Returning to FIG. 27, if the HTTP request received in S701 is not the suitable service search request (S721: NO), the directory server 20 judges whether the HTTP request is a server management instruction for managing the directory server 20 or not (S733). Incidentally, a process transmitting the server management instruction is not directly relevant to the present invention and thus an explanation thereof is omitted here.

If the HTTP request received in S701 is a server management instruction (S733: YES), the directory server 20 activates a server management function (S734), transmits an HTTP response (S704) and ends the directory server process.

If the HTTP request received in S701 is not a server management instruction (S733: NO), the directory server 20 transmits an HTTP response (S704) and ends the directory server process.

Figure 34:
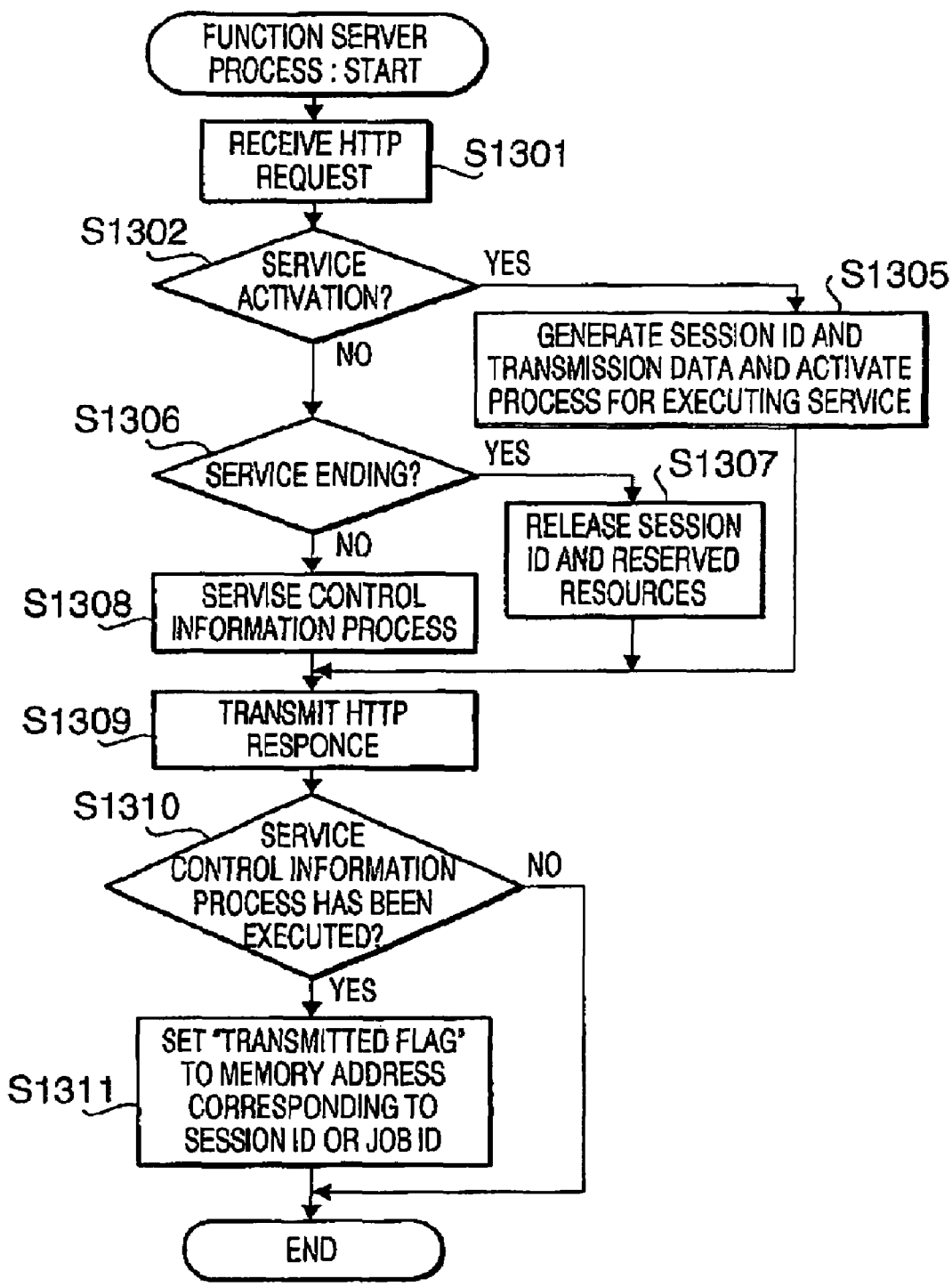
FIG. 34 is a flowchart showing a function server process executed by a control unit of the function server in accordance with aspects of the invention.

In the following, the aforementioned function server process executed by the control unit 31 of the function server 30 will be explained referring to a flowchart of FIG. 34. The function server process is started when an HTTP request is received by the function server 30.

At the start of the function server process, the control unit 31 of the function server 30 (hereinafter also referred to simply as "the function server 30") receives an HTTP request (S1301).

Subsequently, the function server 30 judges whether the HTTP request received in S1301 is the service activation instruction or not (S1302). Incidentally, the service activation instruction is transmitted by the MFP 10 in the step S201 of the session process (FIG. 22) executed by the control unit 101 of the MFP 10.

If the HTTP request received in S1301 is the service activation instruction (S1302: YES), the function server 30 generates a session ID and transmission data and activates a process for executing a service (specifically, a session process (FIG. 36) which will be explained later) (S1305). Thereafter, the process advances to step S1309.

If the HTTP request received in S1301 is not the service activation instruction (S1302: NO), the function server 30 judges whether the HTTP request is the service ending instruction or not (S1306). Incidentally, the service ending instruction is transmitted by the MFP 10 in response to an ending instruction (as an interrupt) from the user (e.g. the pressing of the cancel key 51 during the execution of a service).

If the HTTP request received in S1301 is the service ending instruction (S1306: YES), the function server 30 releases the session ID and reserved resources (S1307) and thereafter advances to the step S1309.

If the HTTP request received in S1301 is not the service ending instruction (S1306: NO), the function server 30 executes a service control information process (S1308) and thereafter advances to the step S1309. The details of the service control information process (FIG. 35) will be explained later.

In the step S1309, the function server 30 transmits an HTTP response which can contain generated information. Subsequently, the function server 30 judges whether the service control information process (S1308) has been executed or not (S1310). If the service control information process has been executed (S1310: YES), the function server 30 sets a "transmitted flag" to a memory address corresponding to the session ID or job ID (S1311) and ends the function server process.

If the service control information process has not been executed (S1310: NO), the function server 30 ends the function server process.

Figure 35:
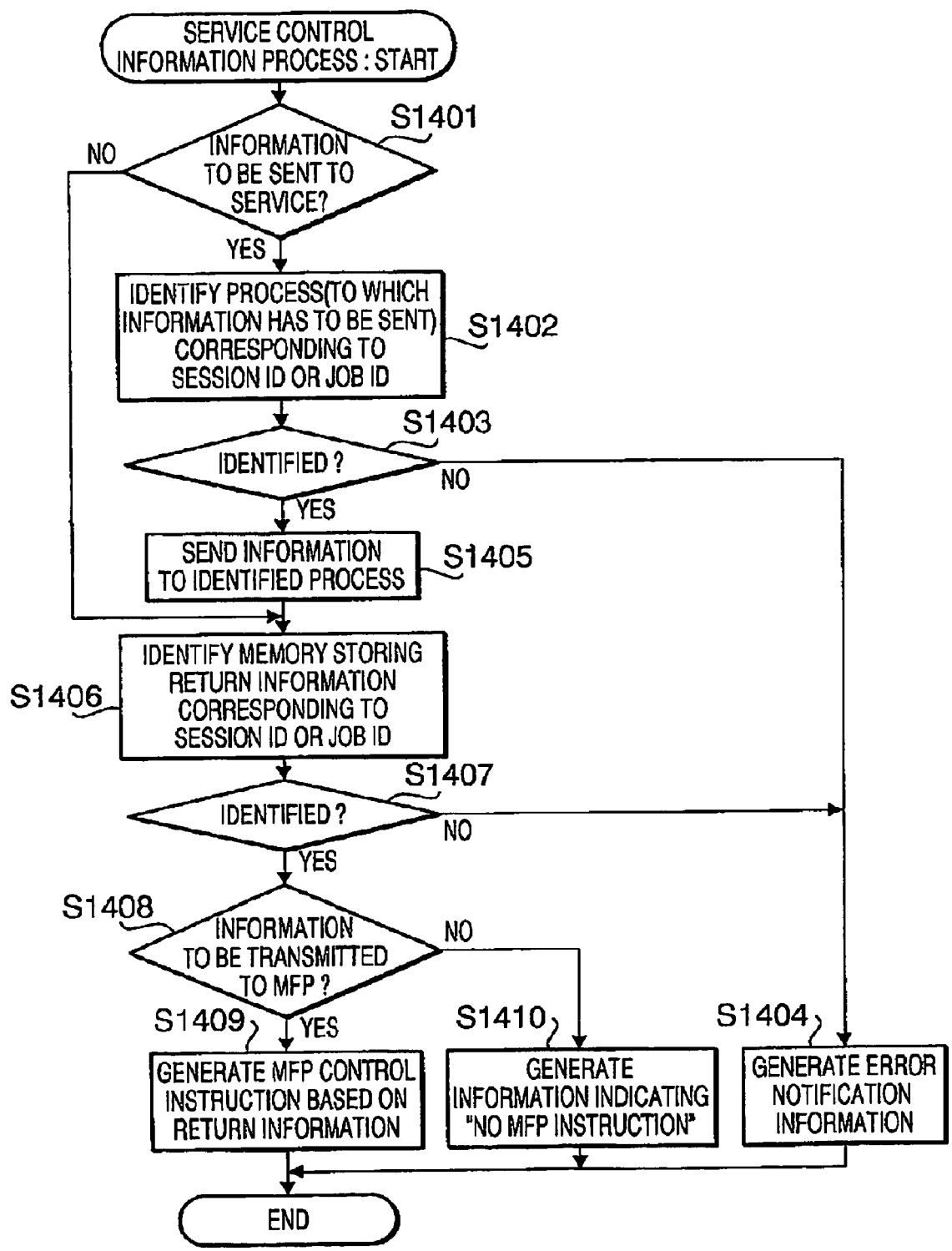
FIG. 35 is a flowchart showing a service control information process executed by the control unit of the function server in accordance with aspects of the invention.

Next, the service control information process which is executed in the step S1308 of the function server process (FIG. 34) will be explained referring to a flowchart of FIG. 35.

At the start of the service control information process, the function server 30 judges whether there exists information to be sent to a service or not (S1401). Specifically, the function server 30 judges whether the HTTP request received in S1301 of the function server process (FIG. 34) contains information on a service (session or job) or not.

If there exists information to be sent to a service (S1401: YES), the function server 30 identifies a process corresponding to the session ID or job ID, that is, a process as the destination of the information contained in the received HTTP request (S1402). Subsequently, the function server 30 judges whether the process (as the destination of the information contained in the received HTTP request) can be identified or not (S1403). If the process can not be identified due to some type of error (S1403: NO), the function server 30 generates error notification information (S1404) and ends the service control information process.

If the process can be identified (S1403: YES), the function server 30 sends the information to the identified process (S1405) and thereafter advances to step S1406. If there exists no information to be sent to a service (S1401: NO), the function server 30 directly advances to the step S1406. In the step S1406, the function server 30 identifies memory storing return information (to be sent back to the MFP 10) corresponding to the session ID or job ID.

Subsequently the function server 30 judges whether the memory storing return information can be identified or not (S1407). If the memory storing return information can not be identified (S1407: NO), the function server 30 generates error notification information (S1404) and ends the service control information process.

If the memory storing return information can be identified (S1407: YES), the function server 30 judges whether there exists information to be transmitted to the MFP 10 or not (S1408). If there exists information to be transmitted to the MFP 10 (S1408: YES), the function server 30 generates an MFP control instruction based on the return information (S1409) and ends the service control information process.

If there exists no information to be transmitted to the MFP 10 (S1408: NO), the function server 30 generates information indicating "no MFP instruction" (S1410) and ends the service control information process.

Figure 36:
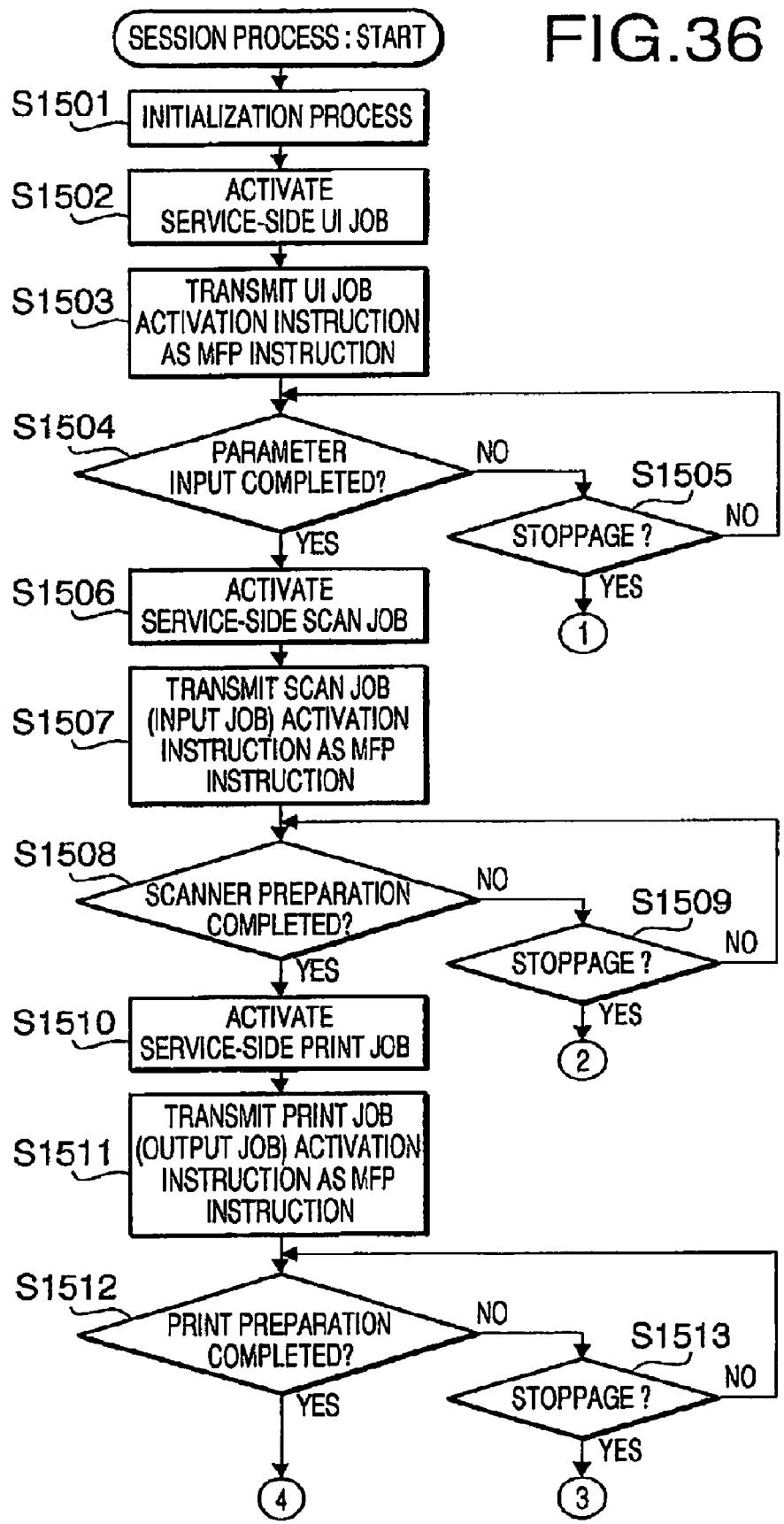
FIGS. 36 and 37 are flowcharts showing a session process executed by the control unit of the function server in accordance with aspects of the invention.
Figure 37:
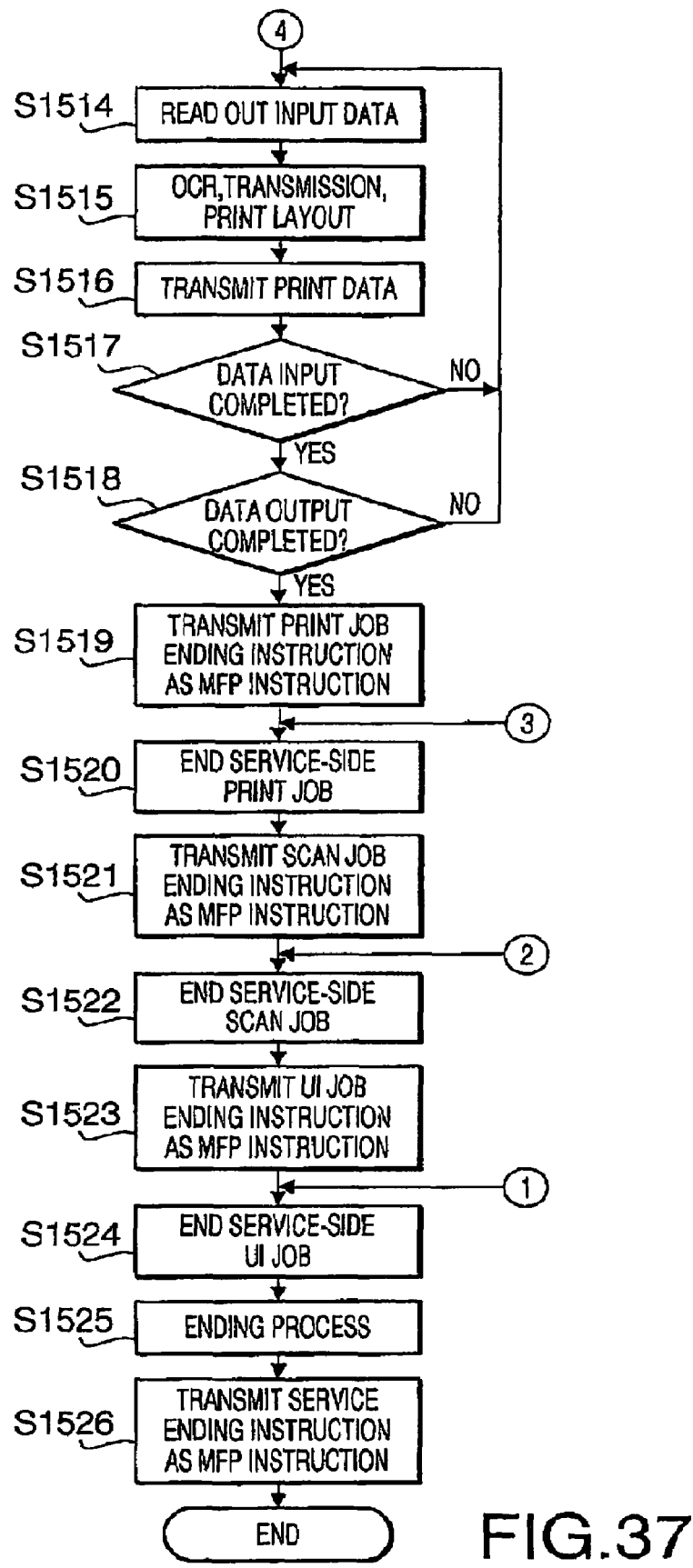

Next, the session process executed by the control unit 31 of the function server 30 will be explained referring to flowcharts of FIGS. 36 and 37. Since the contents of the session process vary depending on the type of service, the following explanation will be given taking a session process regarding the translation copy service as an example. The session process of FIGS. 36 and 37 is started in the step S1305 of the function server process (FIG. 34).

At the start of the session process, (the control unit 31 of) the function server 30 executes an initialization process (S1501) and thereafter activates a service-side UI job (S1502). The details of the service-side UI job (FIG. 38) will be explained later.

Subsequently, the function server 30 transmits a UI job activation instruction as an MFP instruction (S1503). Specifically, the MFP instruction is written in the aforementioned memory for storing return information and thereafter the "transmitted flag" is set by the step S1311 of the function server process (FIG. 34), by which the transmission of the MFP instruction (UI job activation instruction) is confirmed. The UI job activation instruction is transmitted together with a job ID and a destination URL of the job.

Subsequently, the function server 30 judges whether parameter input has been completed or not (S1504). Whether the parameter input has been completed or not is judged based on whether or not a parameter input completion notification has been issued by step S1611 of a UI job process (FIG. 38) which will be explained later.

If the parameter input has not been completed yet (S1504: NO), the function server 30 judges whether the session has been informed of stoppage or not (S1505). Incidentally, the session is informed of stoppage in step S1609 of the UI job process (FIG. 38) which will be explained later.

If the session has not been informed of stoppage (S1505: NO), the process returns to the step S1504. If the session has been informed of stoppage (S1505: YES), the process advances to step S1524 of FIG. 37 which will be explained later.

If the parameter input has already been completed (S1504: YES), the function server 30 activates a service-side scan job (S1506). The details of the service-side scan job (FIG. 39) will be explained later.

Subsequently, the function server 30 transmits a scan job (input job) activation instruction as an MFP instruction (S1507). The scan job activation instruction is transmitted together with a job ID and a destination URL of the job.

Subsequently, the function server 30 judges whether the preparation of the scanner has been completed or not (S1508). Whether the scanner preparation has been completed or not is judged based on whether or not a scanner preparation completion notification has been issued by step S1713 of a scan job process (FIG. 39) which will be explained later.

If the scanner preparation has not been completed yet (S1508: NO), the function server 30 judges whether the session has been informed of stoppage or not (S1509). Incidentally, the session is informed of stoppage in step S1707 of the scan job process (FIG. 39) which will be explained later.

If the session has not been informed of stoppage (S1509: NO), the process returns to the step S1508. If the session has been informed of stoppage (S1509: YES), the process advances to step S1522 of FIG. 37 which will be explained later. If the scanner preparation has been completed (S1508: YES), the function server 30 activates a service-side print job (S1510). The details of the service-side print job (FIG. 40) will be explained later.

Subsequently, the function server 30 transmits a print job (output job) activation instruction as an MFP instruction (S1511). The print job activation instruction is transmitted together with a job ID and a destination URL of the job.

Subsequently, the function server 30 judges whether the preparation for printing has been completed or not (S1512). Whether the print preparation has been completed or not is judged based on whether or not a print preparation completion notification has been issued by step S1813 of a print job process (FIG. 40) which will be explained later.

If the print preparation has not been completed yet (S1512: NO), the function server 30 judges whether the session has been informed of stoppage or not (S1513). Incidentally, the session is informed of stoppage in step S1807 of the print job process (FIG. 40) which will be explained later. If the session has not been informed of stoppage (S1513: NO), the process returns to the step S1512. If the session has been informed of stoppage (S1513: YES), the process advances to step S1520 of FIG. 37 which will be explained later.

If the print preparation has been completed (S1512: YES), the process advances to step S1514 of FIG. 37 and the function server 30 reads out the input data (image data generated by the reading unit 103).

Subsequently, the function server 30 generates image data for printing by recognizing text contained in the image data read out in the step S1514 (by executing an OCR process to the image data), executing a translation process to the recognized text, and setting print layout for the translated text (S1515).

Specifically, the image data for printing generated in S1515 (print data) is outputted (S1516).

Subsequently, the function server 30 judges whether data input (reading) of the whole input data has been completed or not (S1517). If the data input has not been completed (S1517: NO), the process returns to the step S1514.

If the data input of the whole input data has been completed (S1517: YES), the function server 30 judges whether data output of the whole output data (image data for printing) has been completed or not (S1518). If the data output has not been completed (S1518: NO), the process returns to the step S1514.

If the data output of the whole output data has been completed (S1518: YES), the function server 30 transmits a print job ending instruction (together with the job ID of the print job to be ended) as an MFP instruction (S1519) and thereafter ends the service-side print job (S1520).

Subsequently, the function server 30 transmits a scan job ending instruction (together with the job ID of the scan job to be ended) as an MFP instruction (S1521) and thereafter ends the service-side scan job (S1522).

Subsequently, the function server 30 transmits an UI job ending instruction (together with the job ID of the UI job to be ended) as an MFP instruction (S1523) and thereafter ends the service-side UI job (S1524).

Thereafter, the function server 30 executes an ending process such as releasing of memory (S1525), transmits a service ending instruction as an MFP instruction (S1526), and ends the session process of FIGS. 36 and 37.

Figure 38:
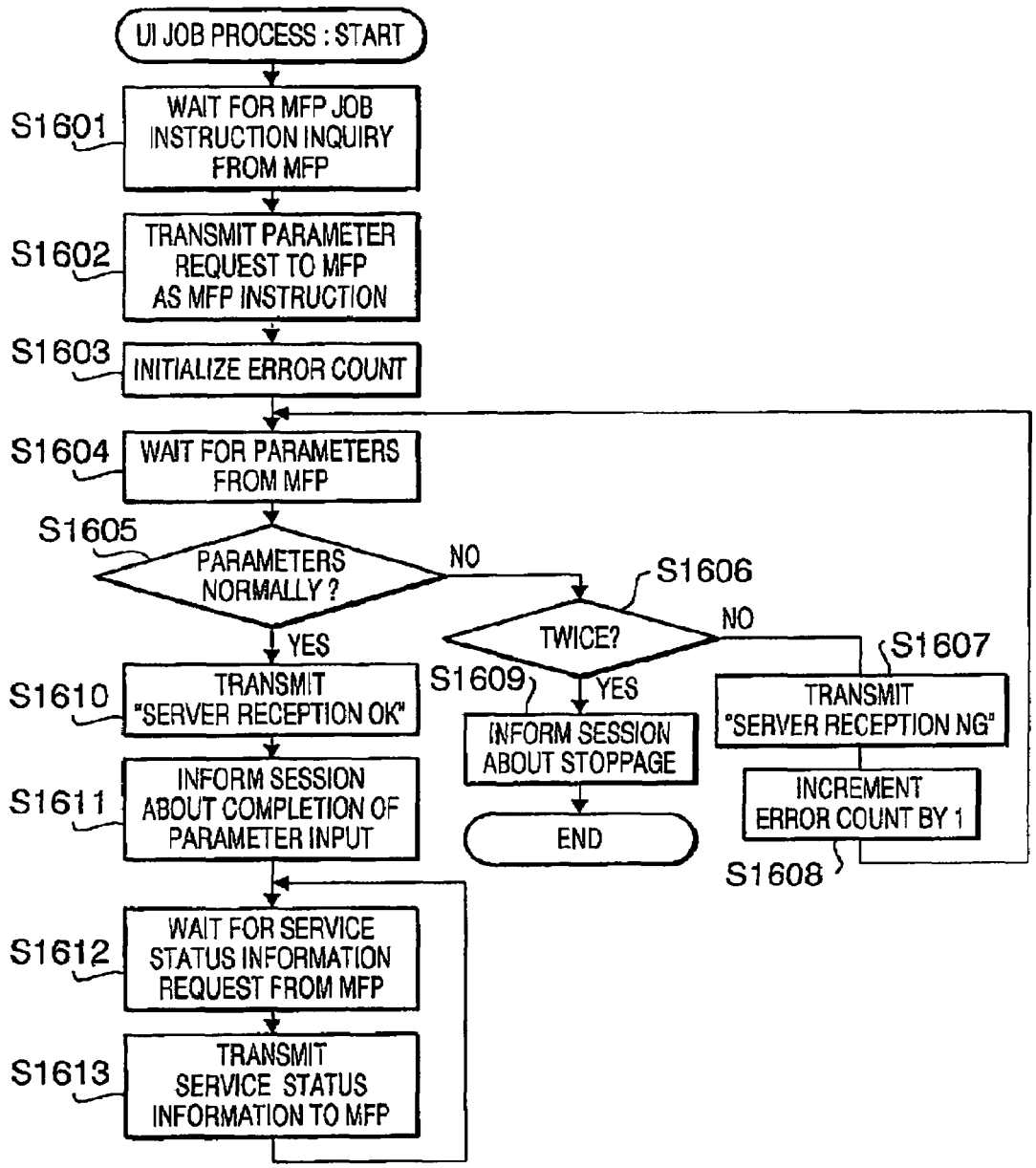
FIG. 38 is a flowchart showing a UI job process executed by the control unit of the function server in accordance with aspects of the invention.

Next, the UI job process (service-side UI job), which is activated in the step S1502 of the above session process (FIG. 36) to operate concurrently with the function server process and the session process, will be explained referring to a flowchart of FIG. 38.

At the start of the UI job process, the function server 30 receives the MFP job instruction inquiry from the MFP 10 (S1601). Incidentally, the MFP job instruction inquiry is set as transmission data in the MFP 10 in the step S400 or S423 of the UI job (FIG. 24) executed by the control unit 101 of the MFP 10 and transmitted by the MFP 10 in the step S406 of the UI job (FIG. 24).

Subsequently, the function server 30 transmits the parameter request (requesting the setting of parameters necessary for the execution of a service) to the MFP 10 as an MFP instruction (S1602). Incidentally, the parameter request is transmitted together with the service I/F information 36 stored in the service I/F information storage unit 34 of the storage unit 33 (in this example, service I/F information 36 corresponding to the translation copy service).

Subsequently, the function server 30 initializes an error count (S1603). Subsequently, the function server 30 receives parameters from the MFP 10 (S1604). Incidentally, the parameters are set as transmission data in the MFP 10 in the step S410 of the UI job (FIG. 24) executed by the control unit 101 of the MFP 10 and transmitted by the MFP 10 in the step S406 of the UI job (FIG. 24).

Subsequently, the function server 30 judges whether the parameters received in S1604 are normal or not (S1605). If the parameters are abnormal (S1605: NO), the function server 30 judges whether the judgment of S1605 has resulted in "NO" twice or not based on the error count initialized in S1603 (S1606).

If the judgment of S1605 has not resulted in "NO" twice, that is, if the judgment of S1605 is "NO" for the first time (S1606: NO), the function server 30 transmits the server reception status information (indicating whether the function server 30 received information from the MFP 10 normally or not) that indicates "server reception NG (abnormal reception)" to the MFP 10 (S1607), increments the error count by 1 (S1608), and returns to the step S1604.

If the judgment of S1605 has resulted in "NO" twice (S1606: YES), the function server 30 informs the session about stoppage (S1609) and ends the UI job process.

If the parameters received in S1604 are normal (S1605: YES), the function server 30 transmits the server reception status information that indicates "server reception OK (normal reception)" to the MFP 10 (S1610) and informs the session about the completion of parameter input (S1611).

Subsequently, the function server 30 receives the service status information request (S1612). Incidentally, the service status information request is set as transmission data in the MFP 10 in the step S421 or S422 of the UI job (FIG. 24) and transmitted by the MFP 10 in the step S406 of the UI job (FIG. 24) as explained above.

Subsequently, the function server 30 transmits the service status information to the MFP 10 (S1613) and returns to the step S1612. Therefore, the reception of the service status information request from the MFP 10 and the returning of the service status information are repeated until the loop is stopped by another process. Incidentally, the service status information is transmitted together with the service I/F information 36 and the error code.

Figure 39:
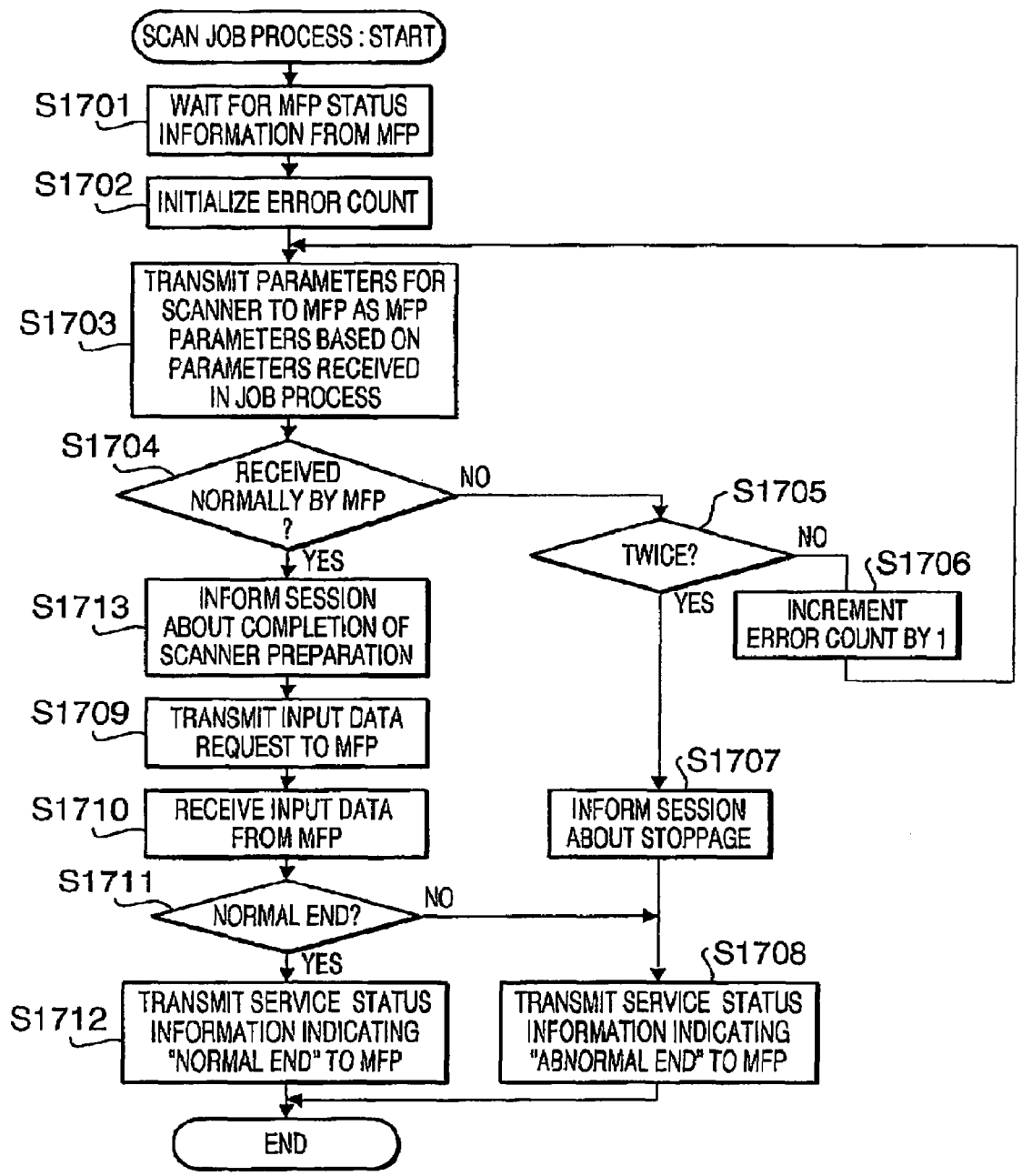
FIG. 39 is a flowchart showing a scan job process executed by the control unit of the function server in accordance with aspects of the invention.

Next, the scan job process (service-side scan job), which is activated in the step S1506 of the session process (FIG. 36) to operate concurrently with the function server process, the session process and the UI job process, will be explained referring to a flowchart of FIG. 39.

At the start of the scan job process, the function server 30 receives the MFP status information from the MFP 10 (S1701). Incidentally, the MFP status information is transmitted by the MFP 10 in the step S504 of the input job (FIG. 25) executed by the control unit 101 of the MFP 10.

Subsequently, the function server 30 initializes an error count (S1702). Subsequently, based on the parameters received in the step S1604 of the UI job process (FIG. 38), the function server 30 transmits parameters for the reading unit 103 (scanner) to the MFP 10 as the MFP parameters (S1703).

Subsequently, the function server 30 judges whether the MFP parameters have been received by the MFP 10 normally or not (S1704). Specifically, the MFP parameters are judged to have been received normally if the function server 30 is informed of normal reception (as the MFP reception status information) by the step S509 of the input job (FIG. 25). If the function server 30 is informed of abnormal reception (as the MFP reception status information) by the step S508 of the input job (FIG. 25), the MFP parameters are judged to have not been received normally.

If the MFP parameters have not been received by the MFP 10 normally (S1704: NO), the function server 30 judges whether the judgment of S1704 has resulted in "NO" twice or not based on the error count initialized in S1702 (S1705).

If the judgment of S1704 has not resulted in "NO" twice, that is, if the judgment of S1704 is "NO" for the first time (S1705: NO), the function server 30 increments the error count by 1 (S1706) and returns to the step S1703.

If the judgment of S1704 has resulted in "NO" twice (S1705: YES), the function server 30 informs the session about stoppage (S1707), transmits the service status information indicating "abnormal end" to the MFP 10 (S1708), and ends the scan job process. If the MFP parameters have been received by the MFP 10 normally (S1704: YES), the function server 30 informs the session about the completion of scanner preparation (S1713) and transmits the input data request (requesting the inputting of data of a type corresponding to the job) to the MFP 10 (S1709).

Subsequently, the function server 30 receives the input data from the MFP 10 (S1710). Incidentally, the input data is transmitted by the MFP 10 in the step S534 of the input job (FIG. 25) executed by the control unit 101 of the MFP 10.

Subsequently, the function server 30 judges whether the scan job process is at a normal end or not (S1711). If the scan job process is not judged to be at a normal end (S1711: NO), the function server 30 transmits the service status information indicating "abnormal end" to the MFP 10 (S1708) and ends the scan job process.

On the other hand, if the scan job process is judged to be at a normal end (S1711: YES), the function server 30 transmits the service status information indicating "normal end" to the MFP 10 (S1712) and ends the scan job process.

Figure 40:
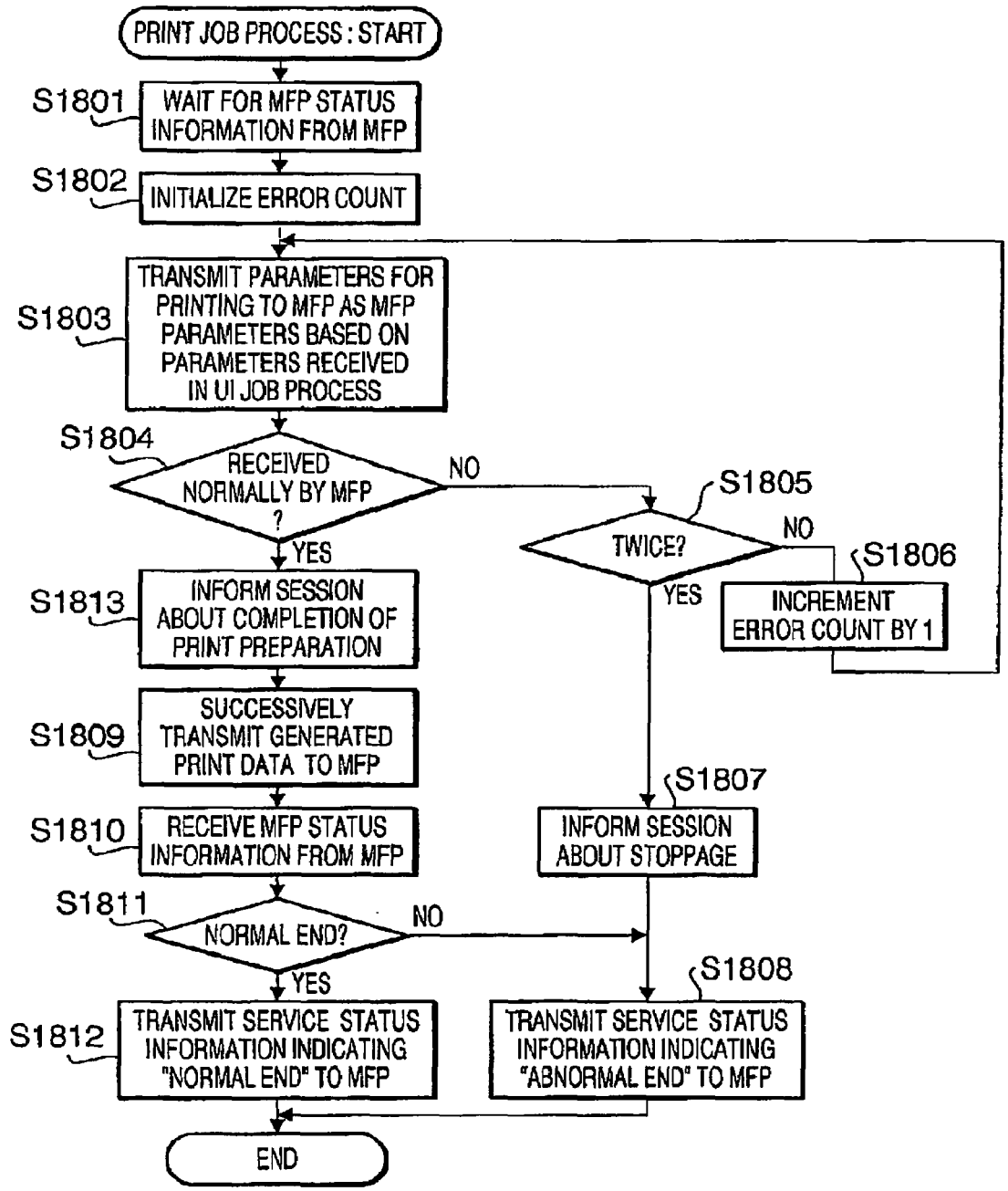
FIG. 40 is a flowchart showing a print job process executed by the control unit of the function server in accordance with aspects of the invention.

Next, the print job process (service-side print job), which is activated in the step S1510 of the session process (FIG. 36) to operate concurrently with the function server process, the session process, the UI job process and the scan job process, will be explained referring to a flowchart of FIG. 40.

At the start of the print job process, the function server 30 receives the MFP status information from the MFP 10 (S1801). Incidentally, the MFP status information is transmitted by the MFP 10 in the step S604 of the output job (FIG. 26) executed by the control unit 101 of the MFP 10.

Subsequently, the function server 30 initializes an error count (S1802). Subsequently, based on the parameters received in the step S1604 of the UI job process (FIG. 38), the function server 30 transmits parameters for printing to the MFP 10 as the MFP parameters (S1803).

Subsequently, the function server 30 judges whether the MFP parameters have been received by the MFP 10 normally or not (S1804). Specifically, the MFP parameters are judged to have been received normally if the function server 30 is informed of normal reception (as the MFP reception status information) by the step S609 of the output job (FIG. 26). If the function server 30 is informed of abnormal reception (as the MFP reception status information) by the step S608 of the output job (FIG. 26), the MFP parameters are judged to have not been received normally.

If the MFP parameters have not been received by the MFP 10 normally (S1804: NO), the function server 30 judges whether the judgment of S1804 has resulted in "NO" twice or not based on the error count initialized in S1802 (S1805).

If the judgment of S1804 has not resulted in "NO" twice, that is, if the judgment of S1804 is "NO" for the first time (S1805: NO), the function server 30 increments the error count by 1 (S1806) and returns to the step S1803.

If the judgment of S1804 has resulted in "NO" twice (S1805: YES), the function server 30 informs the session about stoppage (S1807), transmits the service status information indicating "abnormal end" to the MFP 10 (S1808), and ends the print job process.

If the MFP parameters have been received by the MFP 10 normally (S1804: YES), the function server 30 informs the session about the completion of print preparation (S1813) and thereafter successively transmits the generated print data to the MFP 10 (S1819).

Subsequently, the function server 30 receives the MFP status information from the MFP 10 (S1810). Incidentally, the MFP status information is transmitted by the MFP 10 in the step S616 of the output job (FIG. 26) executed by the control unit 101 or the MFP 10.

Subsequently, the function server 30 judges whether the print job process is at a normal end or not (S1811). If the print job process is not judged to be at a normal end (S1811: NO), the function server 30 transmits the service status information indicating "abnormal end" to the MFP 10 (S1808) and ends the print job process.

On the other hand, if the print job process is judged to be at a normal end (S1811: YES), the function server 30 transmits the service status information indicating "normal end" to the MFP 10 (S1812) and ends the print job process.

Figure 41:
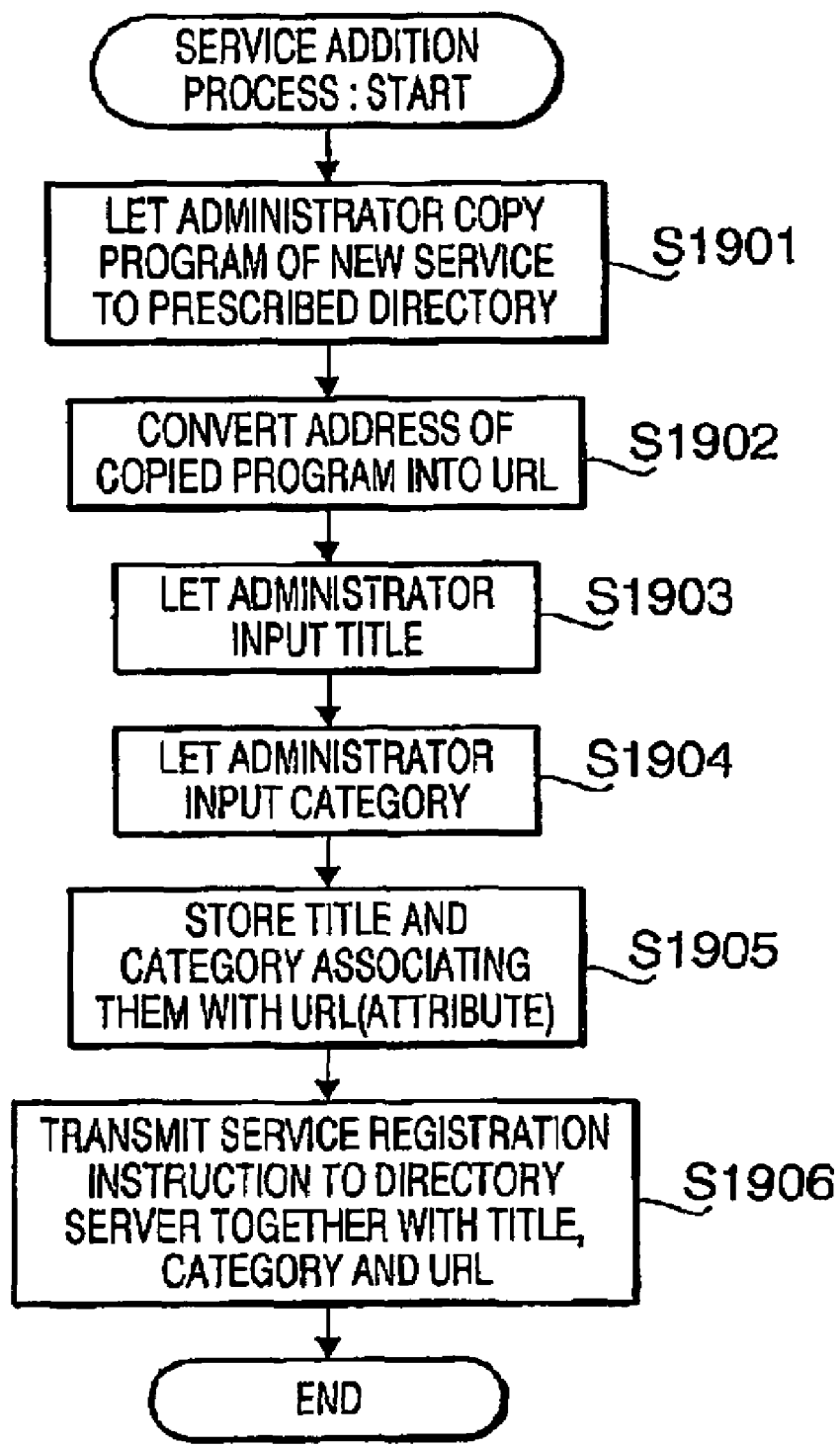
FIG. 41 is a flowchart showing a service addition process executed by the control unit of the function server in accordance with aspects of the invention.

Next, the service addition process executed by the control unit 31 of the function server 30 will be explained referring to a flowchart of FIG. 41. The service addition process is started when a prescribed operation is performed by an administrator of the function server 30.

At the start of the service addition process, the function server 30 lets the administrator perform an operation for copying a program of a service to be added (service software 37 of a new service) to a prescribed directory (S1901).

Subsequently, the function server 30 executes a process for converting the address of the program copied in S1901 into a URL (S1902) and lets the administrator input the title (service name) of the added service (S1903). Subsequently, the function server 30 lets the administrator input the category of the added service (S1904). In this step, the administrator can input one of the aforementioned three categories "data storage service", "printing service" and "copy application service".

Thereafter, the function server 30 stores the title inputted in S1903 and the category inputted in S1904 associating them with the URL generated in the step S1902 (S1905), informs the directory server 20 about the addition (registration) of the service by transmitting the service registration instruction to the directory server 20 together with the title, category and URL stored in the step S1905 (S1906), and ends the service addition process.

Figure 42:
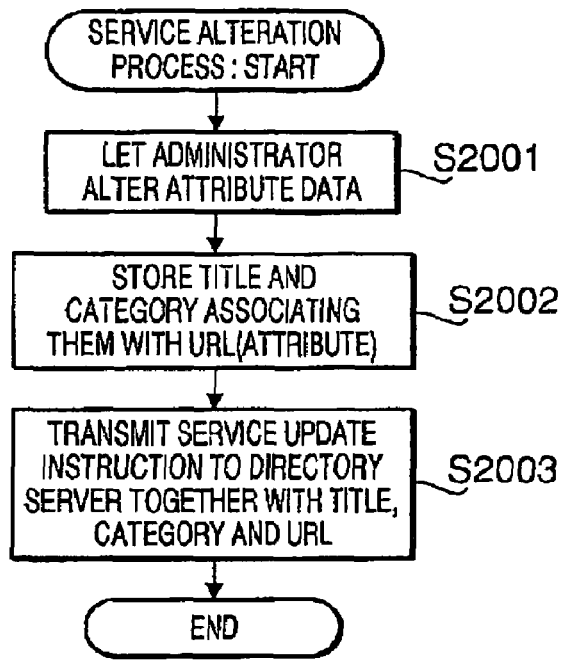
FIG. 42 is a flowchart showing a service alteration process executed by the control unit of the function server in accordance with aspects of the invention.

Next, the service alteration process executed by the control unit 31 of the function server 30 will be explained referring to a flowchart of FIG. 42. The service alteration process is started when a prescribed operation is performed by the administrator of the function server 30.

At the start of the service alteration process, the function server 30 lets the administrator perform an operation for altering attribute data regarding a service (S2001). Subsequently, the function server 30 stores the title and the category of the altered service associating them with the URL (S2002).

Thereafter, the function server 30 informs the directory server 20 about the alteration of the service by transmitting the service update instruction to the directory server 20 together with the title, category and URL (S2003) and ends the service alteration process.

Figure 43:
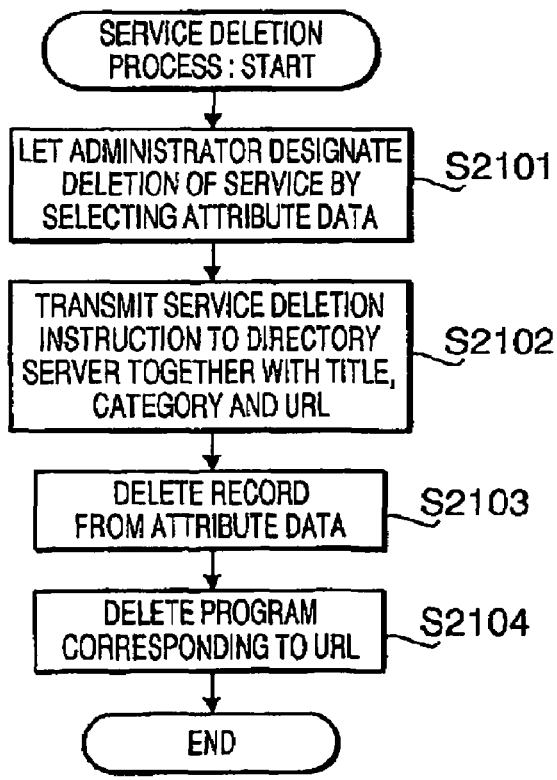
FIG. 43 is a flowchart showing a service deletion process executed by the control unit of the function server in accordance with aspects of the invention.

Next, the service deletion process executed by the control unit 31 of the function server 30 will be explained referring to a flowchart of FIG. 43. The service deletion process is started when a prescribed operation is performed by the administrator of the function server 30.

At the start of the service deletion process, the function server 30 lets the administrator designate the deletion of a service by selecting attribute data (S2101). Subsequently, the function server 30 informs the directory server 20 about the deletion of the service by transmitting the service deletion instruction to the directory server 20 together with the title, category and URL (S2102).

Thereafter, the function server 30 deletes a record from the attribute data (S2103), deletes a program (service software 37) corresponding to the URL (S2104), and ends the service deletion process.

As explained above, various processes are executed by the control units 101, 21 and 31 of the MFP 10, the directory server 20 and the function server 30 for realizing the "suitable service search function".

Figure 44:
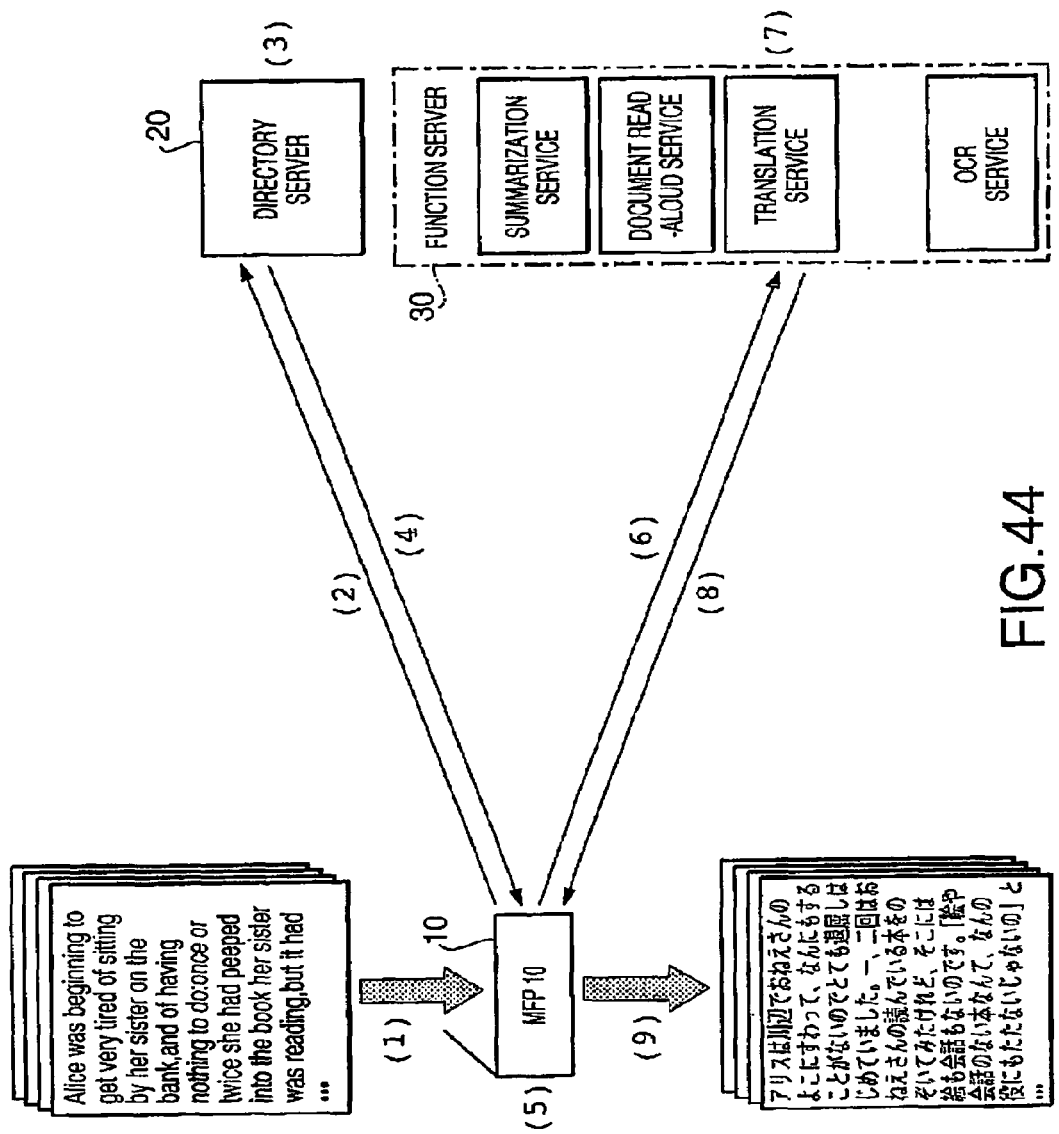
FIG. 44 is an explanatory diagram showing an example of the flow of communication and processes executed in a first embodiment according to the present invention.

FIG. 44 is an explanatory diagram showing the flow (1)-(9) of communication and processes executed by the MFP 10, the directory server 20 and the function server 30, taking the "English-Japanese Document Translation Service" as an example. The communication and processes shown in FIG. 44 will be explained below along the flow (1)-(9).

First, the user of the MFP 10 selects the "suitable service search" and lets the reading unit 103 (scanner) scan an English document ((1) in FIG. 44). Specifically, the user presses the service key 44 of the MFP 10 to call up the service menu (see FIG. 45A) and thereafter selects the "Suitable Service Search" from the service menu by operating the operation panel 102a. Since guidance shown in FIG. 45A or 45B is displayed on the display 52 of the operation panel 102a, the user sets an English document including a plurality of sheets (four sheets, for example) on the ADF of the MFP 10 and presses the scanner key 42. In response to the pressing of the scanner key 42, the MFP 10 reads the document on the ADF and thereby generates the service search data (see FIG. 46A) while employing only one sheet of the English document as part of the service search data. Incidentally, while scan data of the first sheet of the document is used for part of the service search data in this embodiment, the amount of the scan data to be used for the service search data can be set arbitrarily. For example, the first two or three sheets of the document (or inversely, ½ or ⅓ of the first sheet) may be used for the service search data. The MFP 10 may also employ a prescribed amount (bytes) of data from the front end of the scan data (irrespective of the number of pages) for the service search data.

Subsequently, the MFP 10 transmits the service search data (FIG. 46A) to the directory server 20 ((2) in FIG. 44). Subsequently, the directory server 20 searches for suitable services based on the service search data and thereby generates the service list ((3) in FIG. 44). Specifically, the directory server 20 receives the service search data (FIG. 46A), stores information on services having high/low probability of being used ("○: Relevant Service", "□: Irrelevant") by analyzing the received service search data and updating the statuses of services in the service presentation list (see FIG. 47), and generates the service list (see FIG. 46B) based on the information stored in the service presentation list.

After generating the service list as above, the directory server 20 transmits the service list to the MFP 10 ((4) in FIG. 44).

The MFP 10 receiving the service list displays the service selection screen (see FIG. 45D) according to the service list, and the user viewing the service selection screen selects a service from the screen ((5) in FIG. 44). As mentioned above, this explanation will be continued assuming that the user selects the "English-Japanese Document Translation Service" from the service selection screen.

In response to the selection by the user, the MFP 10 transmits the scan data obtained in the step (1) to the function server 30 (specifically, to the URL corresponding to the translation service) ((6) in FIG. 44). The function server 30 receiving the scan data executes a process (translation service) for translating the document ((7) in FIG. 44). After the translation is finished, the function server 30 (translation service) transmits translation data to the MFP 10 ((8) in FIG. 44).

The MFP 10 receiving the translation data prints out the translation data ((9) in FIG. 44). Consequently, the result of translation of the English document is recorded (printed) on a medium by the recording unit 104 of the MFP 10.

As explained above, the MFP 10 (an "image processing device" in the present invention) functions as a service search data transmission unit in the present invention by executing the step S153 of FIG. 21. The MFP 10 generates the service search data by combining one or more pieces of information selected from:

(1) one or more pieces of information regarding the settings of the MFP 10 (the language used in the MFP 10, the area of installation of the MFP 10, etc.) which are stored in the MFP 10

(2) one or more pieces of information indicating the status of the MFP 10 (that a postcard-size sheet has been set, that the ADF is used or not used, etc.) detected in each part of the MFP 10

(3) one or more pieces of information indicating operations that the MFP 10 has received from the user (the lifting of the handset, key operations, etc.)

(4) one or more pieces of information (image data generated by scanning, sound data, photo data, etc.) to be transmitted from the MFP 10 and handed over to the function server 30 (a "service supply unit" in the present invention) when a service is executed, and transmits the generated service search data to the directory server 20 (an "information supply unit" in the present invention).

Figure 28:
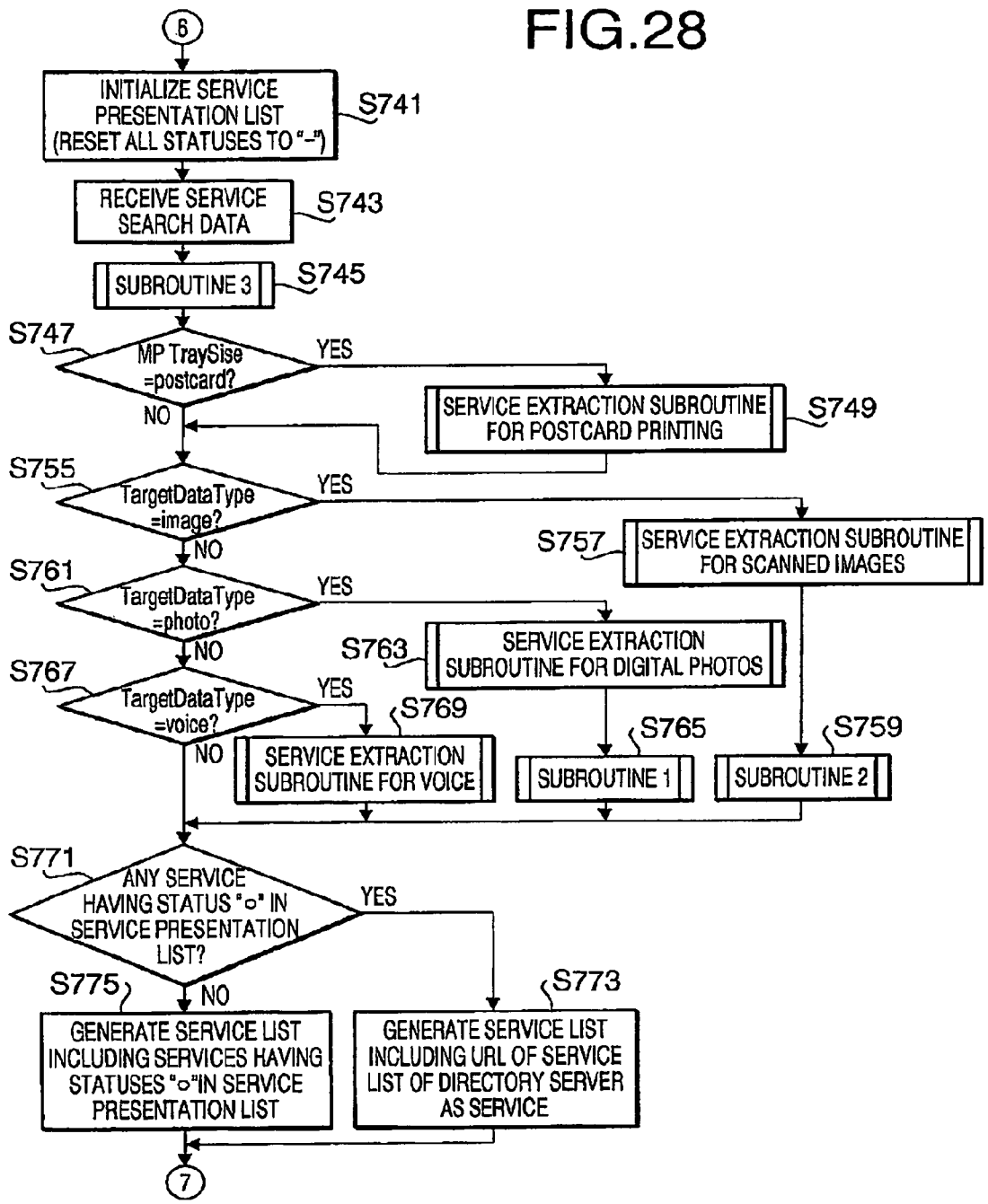

Meanwhile, the directory server 20 functions as a service search data reception unit in the present invention by executing the step S743 of FIG. 28. The directory server 20 receiving the service search data from the MFP 10 functions as a presumption unit in the present invention by executing the steps of FIGS. 28-33, in which the directory server 20 presumes the probability that the MFP 10 requests the function server 30 to execute each of the services executable by the function server 30, based on the service search data and according to prescribed presumption rules.

Thereafter, the directory server 20 functions as a list supply unit in the present invention by executing the step S775 of FIG. 28 and the step S704 of FIG. 27, in which the directory server 20 supplies the MFP 10 with the service list ("information on services executable by the service supply unit" in the present invention) which is generated by extracting suitable services (services that the MFP 10 is likely to request the function server 30 to execute) from all the services executable by the function server 30 (or by sorting the services executable by the function server 30 according to the probability that the MFP 10 requests the function server 30 to execute each service ("○", "-")) based on the service presentation list ("presumption result" in the present invention).

The MFP 10 receiving the service list from the directory server 20 functions as a service determination unit in the present invention by executing the steps S108-S110 of FIG. 20, in which the MFP 10 displays the service selection screen according to the service list supplied from the directory server 20, lets the user select a service from the screen, and determines the selected service as the service to be requested from the function server 30. Thereafter, the MFP 10 functions as a service requesting unit in the present invention by executing the steps S116 of FIG. 20, in which the MFP 10 requests the function server 30 to execute the service determined by the input (selection) received from the user in the step S110.

Consequently, the function server 30 executes the service according to the request by the MFP 10.

With the image processing system configured as above, the user, selecting a service based on a list presented by the MFP 10, is presented with a list generated by extracting suitable services (services that the MFP 10 is likely to request the function server 30 to execute) from all the services executable by the function server 30 (or by sorting the services executable by the function server 30 according to the probability that the MFP 10 requests the function server 30 to execute each service ("○", "-")), by which the number of services presented to the user can be reduced considerably or the hierarchy of a list in tree structure can be made less extensive compared to cases where all the services executable by the function server 30 are presented to the user (e.g. the "tree-type service search function").

Therefore, the user is allowed to find a desired service easily and efficiently. While a simple reduction of the number of services presented to the user might cause suitable services (likely to be selected by the user) to be excluded from the list or cause unsuitable services (unlikely to be selected by the user) to be included in the list, the credibility of the list (supposed to include services likely to be selected by the user) is kept high by letting the directory server 20 presume services having high probability of being selected by the user based on the service search data supplied from the MFP 10.

Embodiment 2

In the following, a second embodiment in accordance with the present invention will be described in detail. Since part of the configuration of the second embodiment is common with that of the first embodiment, only the difference from the first embodiment will be described in detail, in which reference characters identical with those in the first embodiment designate elements identical or equivalent to those of the first embodiment and thus repeated description thereof is omitted for brevity.

In the second embodiment explained below, a service definition information table and a service presentation list different from those of the first embodiment are employed.

FIG. 48 is a table showing a service definition information table which is stored in the storage unit 23 of the directory server 20 in an image processing system in accordance with the second embodiment. While the service definition information table of FIG. 48 stores (n×m) pieces of relevance information similarly to the service definition information table of the first embodiment, the service definition information table of FIG. 48 contains numerical information "1"-"5" indicating the level of relevance (hereinafter referred to as "relevance levels") and information "−1" (blank in FIG. 48) indicating "Irrelevant", differently from the first embodiment in which three types of information "○: Relevant Service", "-: Unclear" and "□: Irrelevant" are contained in the service definition information table.

FIG. 49 is a table showing a service presentation list which is used by the directory server 20 in the second embodiment. While the service presentation list in the first embodiment stores "○", "-" or "□" as the status of each service in order to record the progress of the presumption, the directory server 20 in the second embodiment calculates priority of each service by summing up the relevance levels (values of the numerical information: 1-5) according to conditions explained below and stores the priority of each service (corresponding to the sum) in the service presentation list of FIG. 49.

In the following, processes differing from those of the first embodiment will be explained in detail.

Figure 50:
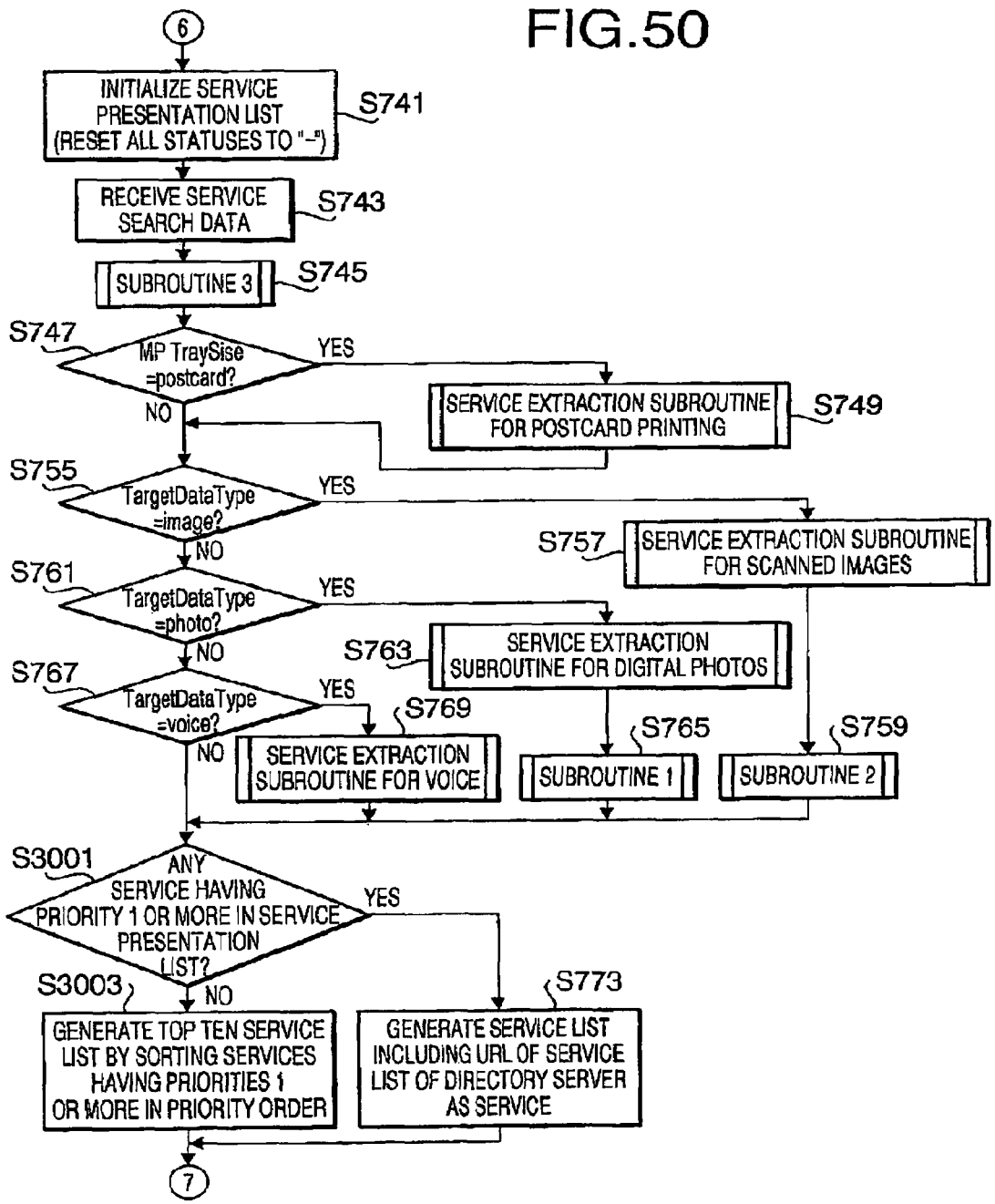
FIG. 50 is a flowchart showing a process executed by the directory server in the second embodiment instead of the process of FIG. 28.
Figure 51:
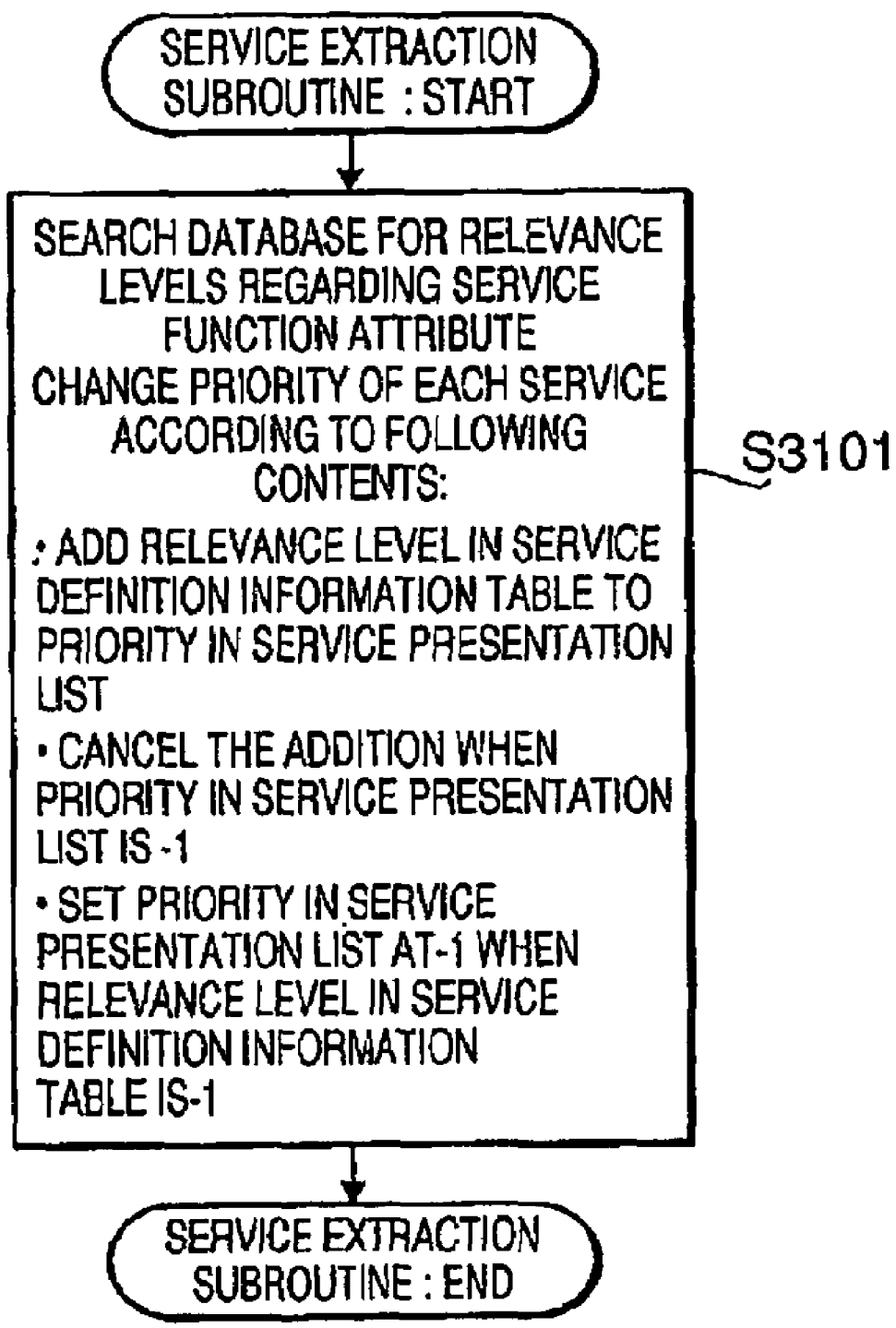
FIG. 51 is a flowchart showing a process executed by the directory server in the second embodiment instead of the process of FIG. 31.

FIG. 50 is a flowchart showing a process executed by the directory server 20 in the second embodiment instead of the process of FIG. 28. The difference from the process of FIG. 28 is steps S3001 and S3003 which are executed instead of the steps S771 and S775 of FIG. 28. FIG. 51 is a flowchart showing a process executed by the directory server 20 in the second embodiment instead of the process of FIG. 31. The difference from the process of FIG. 31 is step S3101 which is executed instead of the step S1001 of FIG. 31.

With the above configuration, the process of FIG. 51 (service extraction subroutine), substituting for the process of FIG. 31, is called up in the steps S749, S757, S763 and S769 of FIG. 50. The service extraction subroutine of FIG. 51 is called up also in the steps S803, S807, S811, S815, S819 and S823 of FIG. 29, the step S903 of FIG. 30, and the steps S1103, S1107, S1113, S1119 and S1125 of FIG. 32.

When the service extraction subroutine of FIG. 51 is called up, the directory server 20 in the step S3001 searches the database (the service definition information table shown in FIG. 48) for the relevance levels regarding a service function attribute. While the description "REGARDING SERVICE FUNCTION ATTRIBUTE" in FIG. 51 does not specify which service function attribute it is in order to describe similar processes inclusively, the particular service function attribute to be focused on out of the m types of service function attributes in the service definition information table (i.e. the column of the service definition information table to be searched) is predetermined for each step (S749, S757, S763, S769, S803, S807, S811, S815, S819, S823, S903, S1103, S1107, S1113, S1119, S1125) that calls up the service extraction subroutine of FIG. 51, similarly to the case of the service extraction subroutine of FIG. 31. For each of the n types of services, information is extracted from the service definition information table (FIG. 48) and the service presentation list (FIG. 49), and the "priority" of each service in the service presentation list is changed according to the following conditions 4-6.

(Condition 4). ADD RELEVANCE LEVEL, IN SERVICE DEFINITION INFORMATION TABLE TO PRIORITY IN SERVICE PRESENTATION LIST (The relevance level of a service (regarding the particular service function attribute) extracted from the service definition information table is added to the priority of the service in the service presentation list.)

(Condition 5): CANCEL THE ADDITION WHEN PRIORITY IN SERVICE PRESENTATION LIST IS −1 (When the priority in the service presentation list is −1, the priority (−1) is not changed irrespective of the relevance level extracted from the service definition information table.)

(Condition 6): SET PRIORITY IN SERVICE PRESENTATION LIST AT −1 WHEN RELEVANCE LEVEL IN SERVICE DEFINITION INFORMATION TABLE IS −1 (When the relevance level extracted from the service definition information table is −1, the priority in the service presentation list is set at −1 irrespective of the original value of the priority in the service presentation list.)

By the above step S3001, the "priority" of each service in the service presentation list is updated taking the relevance level regarding the particular service function attribute into consideration.

After some of the steps S749, S757, S763, S769, S803, S807, S811, S815, S819, S823, S903, S1103, S1107, S1113, S1119 and S1125 have been executed, when the step S759, S765 or S769 in FIG. 50 is finished or when the judgment of the step S767 is "NO" (that is, when the service presentation list has been completed), the directory server 20 judges whether or not the service presentation list includes any service whose "priority" is 1 or more (S3001). If the service presentation list includes no service whose priority is 1 or more (S3001: NO), it means that the directory server 20 presumes no service as a service that the MFP 10 is likely to request the function server 30 to execute. In this case, the directory server 20 generates a service list that includes the URL of the service list of the directory server 20 as a service (S773), similarly to the step S773 of the first embodiment. On the other hand, if the service presentation list includes one or more services whose priorities are 1 or more (S3001: YES), it means that the directory server 20 presumes one or more services that the MFP 10 is likely to request the function server 30 to execute. In this case, the directory server 20 sorts such services (whose priorities are 1 or more in the service presentation list) in descending order of the priority and thereby generates a service list (top ten service list) that includes top ten high-priority services (S3003).

In short, when there is no service that the MFP 10 is likely to request the function server 30 to execute, the directory server 20 generates a service list including general services on the service list that is used in the "tree-type service search function", similarly to the first embodiment. When one or more services that the MFP 10 is likely to request the function server 30 to execute are found, the directory server 20 not only generates a service list including such services (as in the first embodiment) but also figures out the priorities of the services, sorts the services in order of the priority, and generates the top ten service list.

After finishing the step S773 or S3003, the directory server 20 transmits an HTTP response containing the generated service list (S704 of FIG. 27) and ends the directory server process similarly to the first embodiment. The other processes are executed similarly to the first embodiment.

In the following, communication and processes executed by the MFP 10, the directory server 20 and the function server 30 in the image processing system of the second embodiment will be explained taking the "English-Japanese Document Translation Service" as an example, along the flow (1)-(9) shown in FIG. 44.

First, the user of the MFP 10 selects the "suitable service search" and lets the reading unit 103 (scanner) scan an English document ((1) in FIG. 44). Specifically, the user presses the service key 44 of the MFP 10 to call up the service menu (see FIG. 45A) and thereafter selects the "Suitable Service Search" from the service menu by operating the operation panel 102a. Since guidance shown in FIG. 45A or 45B is displayed on the display 52 of the operation panel 102a, the user sets an English document including a plurality of sheets (four sheets, for example) on the ADF of the MFP 10 and presses the scanner key 42. In response to the pressing of the scanner key 42, the MFP 10 reads the document on the ADF and thereby generates the service search data (see FIG. 46A) while employing only one sheet of the English document as part of the service search data.

Subsequently, the MFP 10 transmits the service search data (FIG. 46A) to the directory server 20 ((2) in FIG. 44). Subsequently, the directory server 20 searches for suitable services based on the service search data and thereby generates the service list ((3) in FIG. 44). Specifically, the directory server 20 receives the service search data (FIG. 46A), updates the "priority" of each service in the service presentation list (see FIG. 52A) with the sum of the relevance levels (values of the numerical information: 1-5) or "−1", and generates the service list (see FIG. 52B) based on the resultant priority of each service (the sum or −1) stored in the service presentation list.

As shown in FIG. 52B, the service list generated in the second embodiment includes the suitable services that have been sorted in descending order of the priority in the service presentation list, differently from the service list in the first embodiment (see FIG. 46B).

After generating the service list as above, the directory server 20 transmits the service list to the MFP 10 ((4) in FIG. 44). The MFP 10 receiving the service list displays the service selection screen according to the service list (FIG. 52B). In the second embodiment, the service selection screen presents the suitable services in the order of the service list (i.e. in descending order of priority). The user viewing the service selection screen selects a service from the screen ((5) in FIG. 44).

Thereafter, assuming that the user selects the "English-Japanese Document Translation Service" from the service selection screen as mentioned above, processes are executed as below similarly to the first embodiment. The MFP 10 receiving the selection by the user transmits the scan data obtained in the step (1) to the function server 30 (specifically, to the URL corresponding to the translation service) ((6) in FIG. 44). The function server 30 receiving the scan data executes a process (translation service) for translating the document ((7) in FIG. 44) and transmits translation data to the MFP 10 ((8) in FIG. 44). The MFP 10 receiving the translation data prints out the translation data ((9) in FIG. 44). Consequently, the result of translation of the English document is recorded (printed) on a medium by the recording unit 104 of the MFP 10.

As explained above, also in the image processing system of the second embodiment, the directory server 20 presumes the probability that the MFP 10 requests the function server 30 to execute each of the services executable by the function server 30 based on the service search data and according to prescribed presumption rules. Further, the directory server 20 in the second embodiment figures out the "priority" of each service as the probability that the MFP 10 requests the function server 30 to execute the service, sorts the services executable by the function server 30 in descending order of the priority, and supplies the sorted service list to the MFP 10. Therefore, the MFP 10 in the second embodiment is capable of presenting services of higher probabilities (services having higher probabilities of being requested from the function server 30) to the user giving them higher priorities only by displaying the service selection screen according to the service list, by which the user is allowed to find a desired service still more easily and efficiently compared to the first embodiment.

Embodiment 3

In the following, a third embodiment in accordance with the present invention will be described in detail. Since part of the configuration of the third embodiment is common with that of the first embodiment, only the difference from the first embodiment will be described in detail, in which reference characters identical with those in the first embodiment designate elements identical or equivalent to those of the first embodiment and thus repeated description thereof is omitted for brevity. Processes differing from those of the first embodiment will be explained below in detail.

Figure 25:
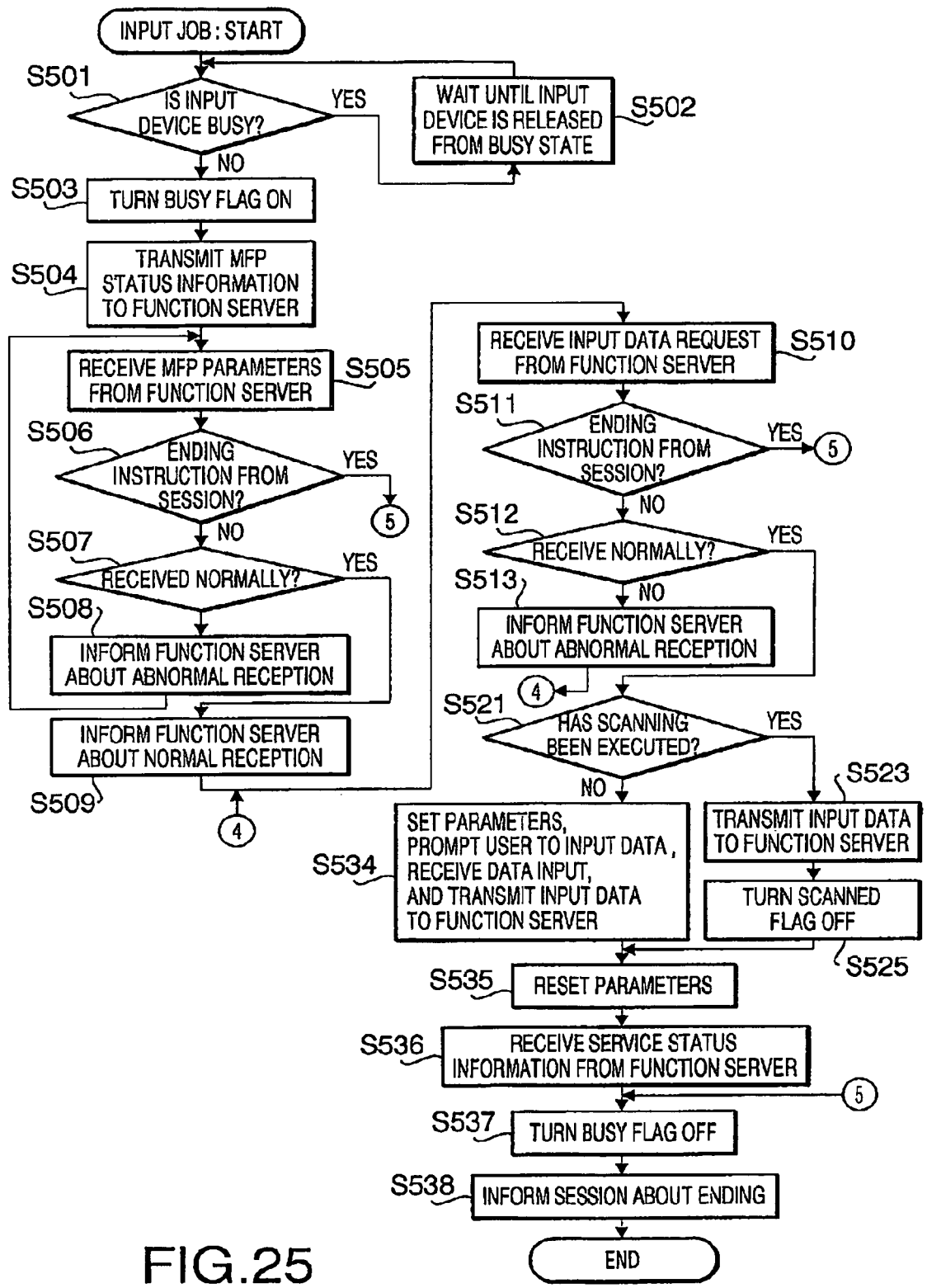
FIG. 25 is a flowchart showing an input job which is executed by the control unit of the MFP in accordance with aspects of the invention.
Figure 53:
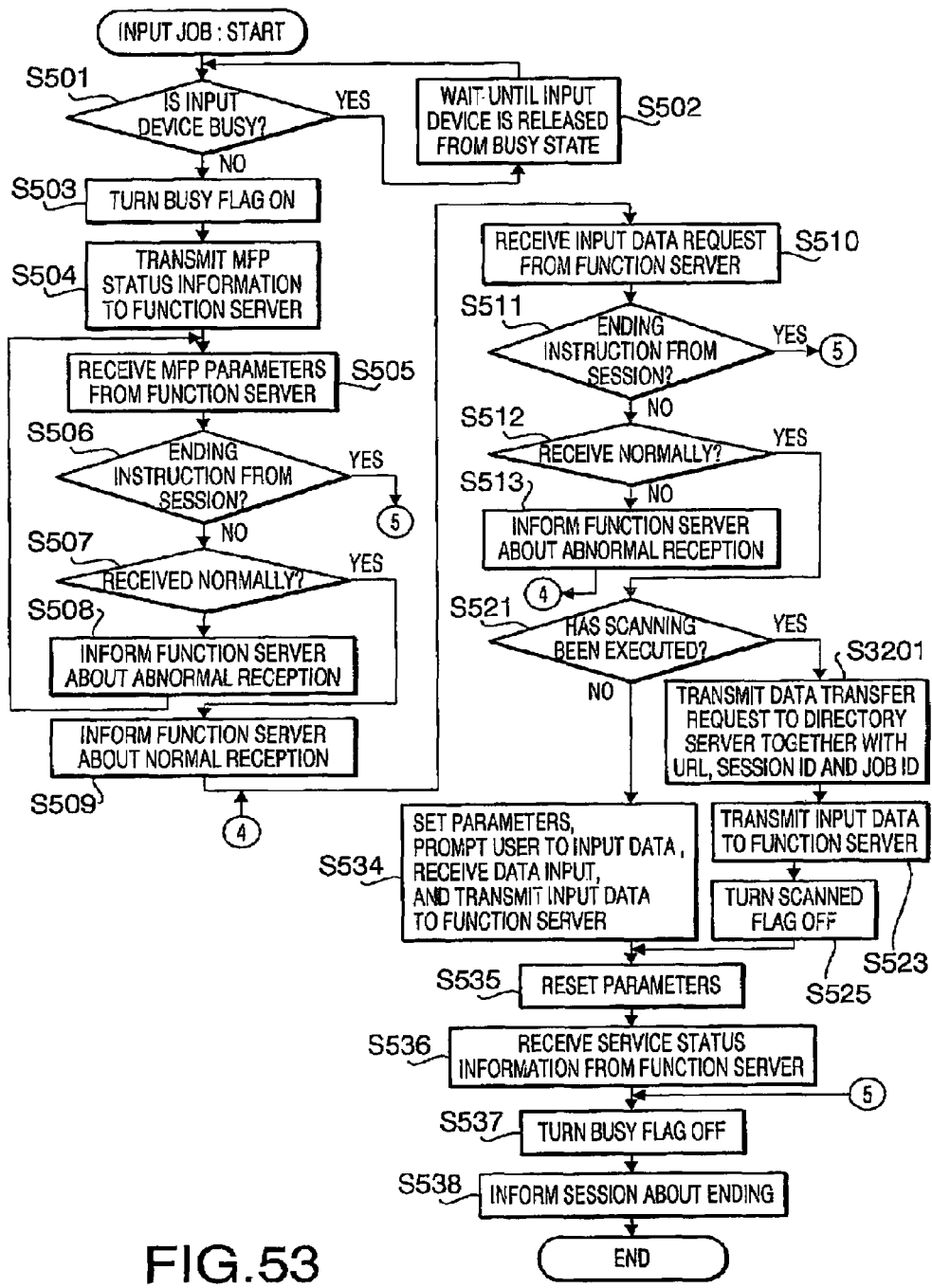
FIG. 53 is a flowchart showing a process executed by the MFP in an image processing system in accordance with a third embodiment according to the present invention instead of the process of FIG. 25.
Figure 54:
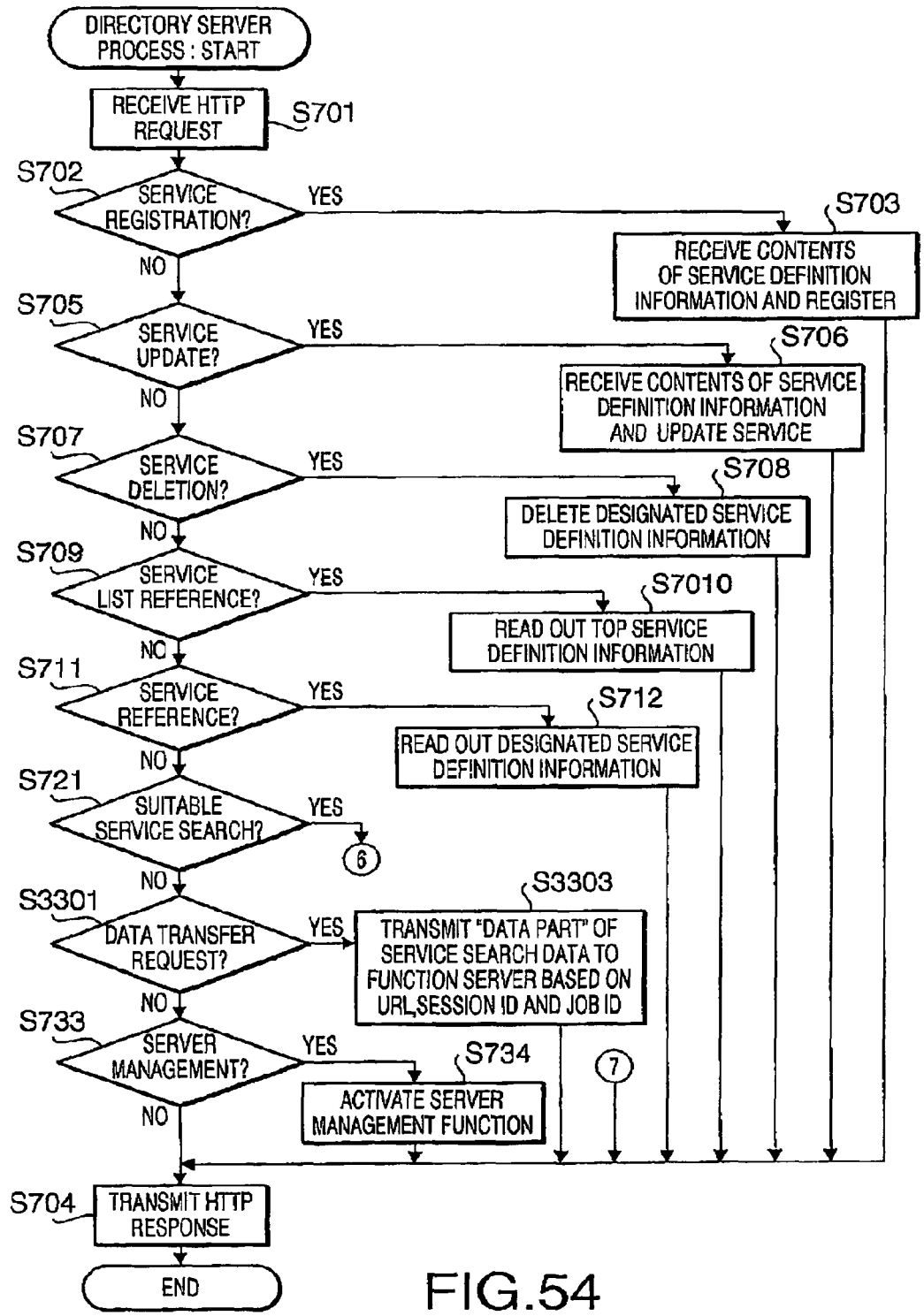
FIG. 54 is a flowchart showing a process executed by the directory server in the third embodiment instead of the process of FIG. 27.
Figure 55:
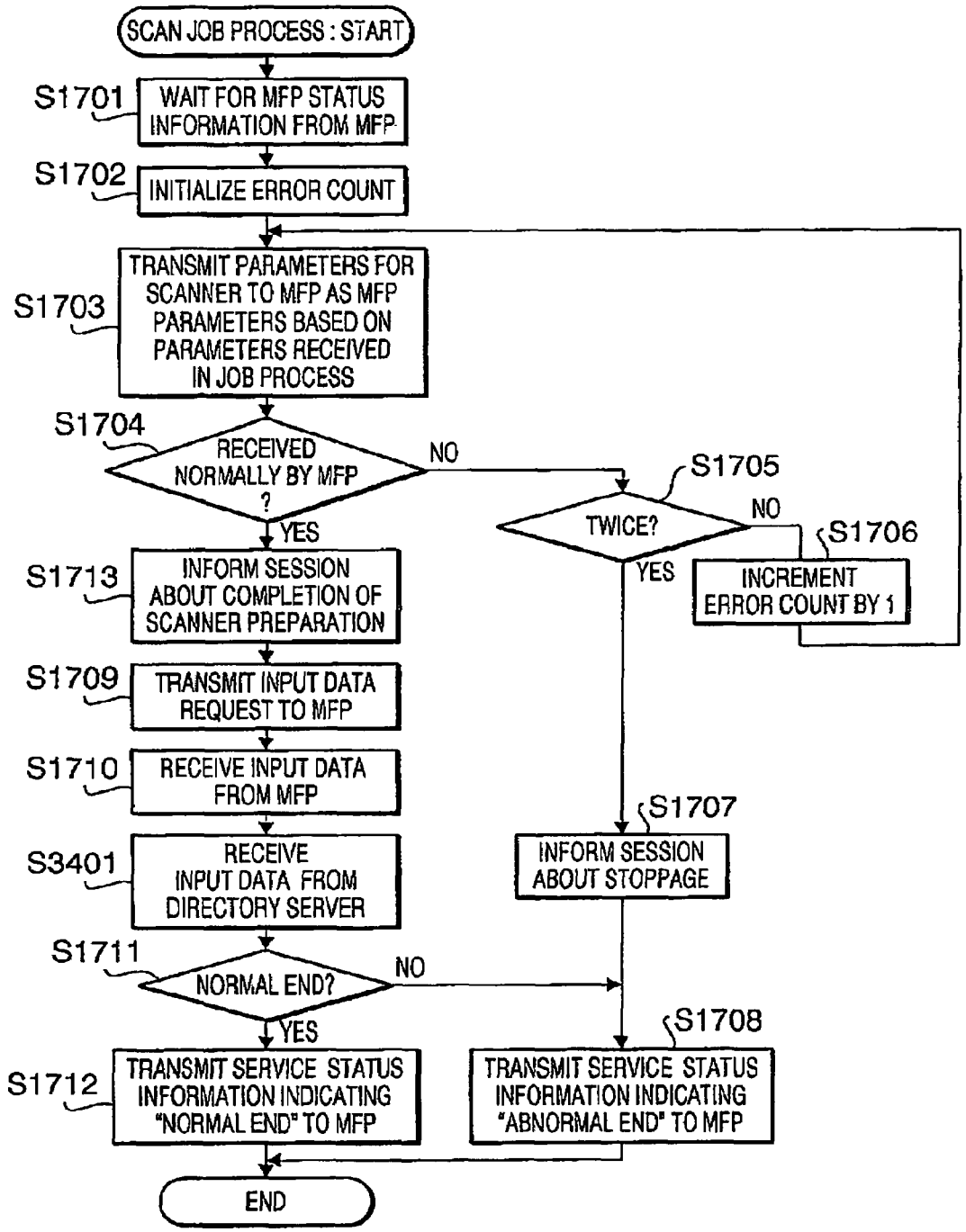
FIG. 55 is a flowchart showing a process executed by the function server in the third embodiment instead of the process of FIG. 39.

FIG. 53 is a flowchart showing a process executed by the MFP 10 in the third embodiment instead of the process of FIG. 25. The difference from the process of FIG. 25 is that a new step S3201 is added between the steps S521 and S523. FIG. 54 is a flowchart showing a process executed by the directory server 20 in the third embodiment instead of the process of FIG. 27. The difference from the process of FIG. 27 is that a new step S3301 is added between the steps S721 and S733 and another new step S3303 is added between the steps S3301 and S704. FIG. 55 is a flowchart showing a process executed by the function server 30 in the third embodiment instead of the process of FIG. 39: The difference from the process of FIG. 39 is that a new step S3401 is added between the steps S1710 and S1711.

Referring to FIG. 53, the MFP 10 in the step S521 judges whether the scanning of a document has already been executed or not, similarly to the first embodiment. If the scanning of a document has already been executed (S521: YES), it means that the input data to be transmitted to the function server 30 (scan data) has already been read by the MFP 10 and part of the scan data has already been transmitted to the directory server 20 as part of the service search data. Therefore, in this case, the MFP 10 transmits a data transfer request, requesting the directory server 20 to transfer already received data (art of the scan data) to the function server 30, to the directory server 20 together with the URL, the session ID and the job ID (S3201). Subsequently, the MFP 10 transmits the scan data obtained by the scanning of S145 to the function server 30 (S523) similarly to the first embodiment However, in the step S523 of the third embodiment, the MFP 10 transmits "difference data", which is obtained by excluding the "part of the scan data" (already transmitted to the directory server 20 as part of the service search data) from all the data necessary for the function server 30 to execute the service, to the function server 30. Therefore, the MFP 10 in the third embodiment functions as a difference data transmission unit in the present invention. Thereafter, the MFP 10 turns the scanned flag off (S525) and executes subsequent steps similarly to the first embodiment.

Referring to FIG. 54, if the HTTP request received in S701 is not the suitable service search request (S721: NO), the directory server 20 judges whether the HTTP request is the data transfer request or not (S3301). Incidentally, the data transfer request is transmitted by the MFP 10 in the step S3201 of the above input job (FIG. 53) executed by the control unit 101 of the MFP 10.

If the HTTP request received in S701 is the data transfer request (S3301: YES), the directory server 20 transmits (transfers) a "data part" of the service search data (the aforementioned "part of the scan data") to the function server 30 as transfer data based on the URL, session ID and job ID contained in the data transfer request (S3302). Therefore, the directory server 20 in the third embodiment functions as a transfer data transmission unit in the present invention. Thereafter, the directory server 20 advances to the step S704. If the HTTP request received in S701 is not the data transfer request (S3301: NO), the directory server 20 advances to the step S733.

Referring to FIG. 55, the function server 30 receives the input data from the MFP 10 (S1710) similarly to the first embodiment. However, in the step S1710 of the third embodiment, the function server 30 receives the "difference data" from the MFP 10 which transmits the difference data as the input data in the step S523 of FIG. 53 as mentioned above. Therefore, the function server 30 in the third embodiment functions as a difference data reception unit in the present invention. Subsequently, the function server 30 receives input data also from the directory server 20 (S3401). The input data received in S3401 is the transfer data transmitted by the directory server 20 in the step S3303 of FIG. 54. Therefore, the function server 30 in the third embodiment functions also as a transfer data reception unit in the present invention. Thereafter, the function server 30 advances to the step S1711 and executes subsequent steps similarly to the first embodiment.

The above processes are those differing from the first embodiment. The other processes are executed similarly to the first embodiment.

Figure 56:
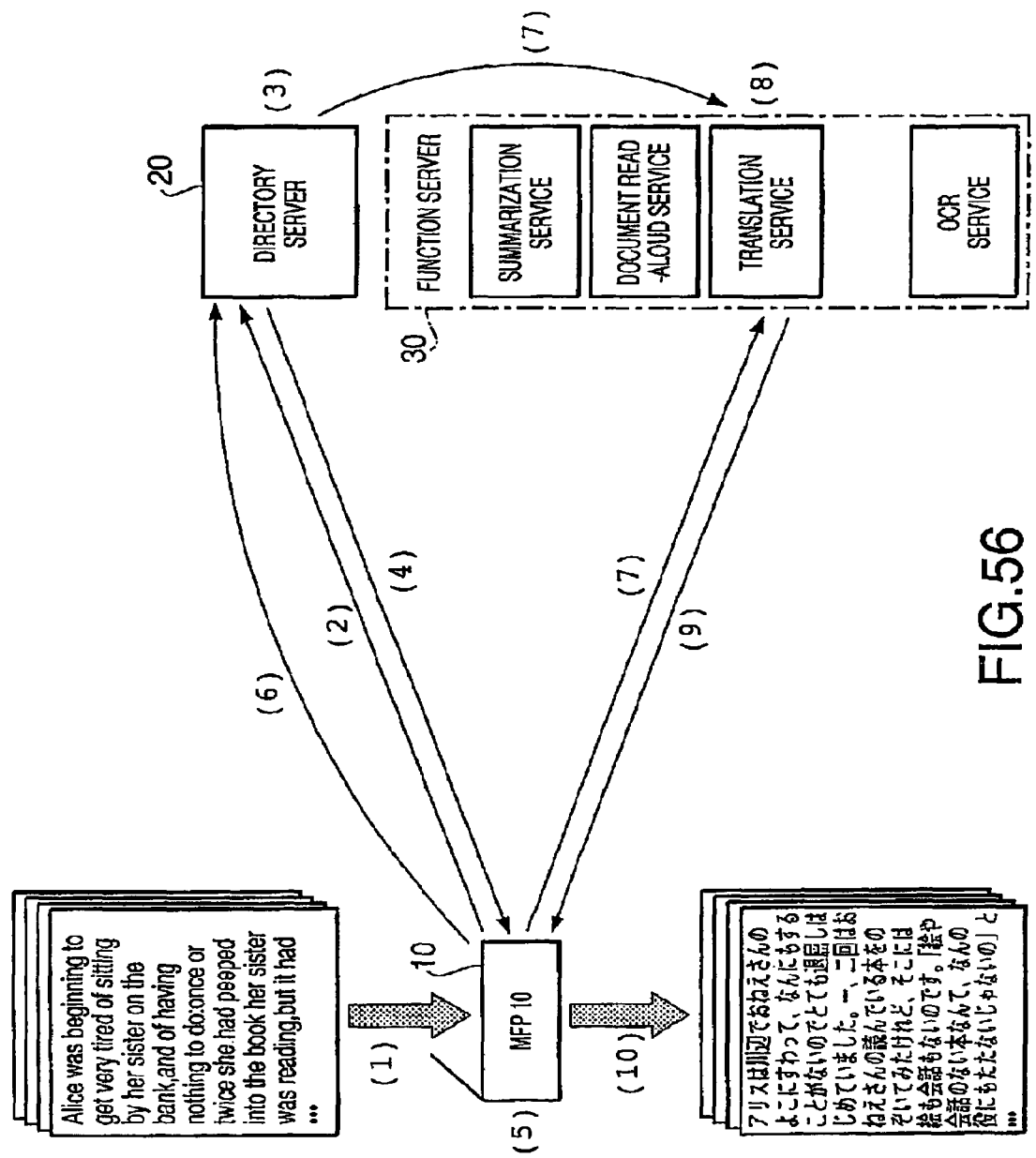
FIG. 56 is an explanatory diagram showing an example of the flow of communication and processes executed in the third embodiment.

FIG. 56 is an explanatory diagram showing the flow (1)-(10) of communication and processes executed by the MFP 10, the directory server 20 and the function server 30 in the image processing system of the third embodiment, taking the "English-Japanese Document Translation Service" as an example. The communication and processes shown in FIG. 56 will be explained below along the flow (1)-(10).

First, the user of the MFP 10 selects the "suitable service search" and lets the reading unit 103 (scanner) scan an English document ((1) in FIG. 56). Specifically, the user presses the service key 44 of the MFP 10 to call up the service menu (see FIG. 45A) and thereafter selects the "Suitable Service Search" from the service menu by operating the operation panel 102*a*. Since guidance shown in FIG. 45A or 45B is displayed on the display 52 of the operation panel 102*a*, the user sets an English document including a plurality of sheets (four sheets, for example) on the ADF of the MFP 10 and presses the scanner key 42. In response to the pressing of the scanner key 42, the MFP 10 reads the document on the ADF and thereby generates the service search data (see FIG. 46A) while employing only one sheet of the English document as part of the service search data Subsequently, the MFP 10 transmits the service search data (FIG. 46A) to the directory server 20 ((2) in FIG. 56). Subsequently, the directory server 20 searches for suitable services based on the service search data and thereby generates the service list ((3) in FIG. 56). Specifically, the directory server 20 receives the service search data (FIG. 46A), stores information on services having high/low probability of being used ("◯: Relevant Service", "☐: Irrelevant") by analyzing the received service search data and updating the statuses of services in the service presentation list (see FIG. 47), and generates the service list (see FIG. 46B) based on the information stored in the service presentation list.

After generating the service list as above, the directory server 20 transmits the service list to the MFP 10 ((4) in FIG. 56). The MFP 10 receiving the service list displays the service selection screen (see FIG. 45D) according to the service list, and the user viewing the service selection screen selects a service from the screen ((5) in FIG. 56). This explanation will be continued assuming that the user selects the "English-Japanese Document Translation Service" from the service selection screen as mentioned above.

In response to the selection by the user, the MFP 10 transmits the data transfer request (requesting the directory server 20 to transfer the part of the scan data (scan data of the first sheet of the document) to the function server 30 (translation service)) to the directory server 20 ((6) in FIG. 56).

The directory server 20 receiving the data transfer request transmits the scan data already received (scan data of the first sheet) to the function server 30 (specifically, to the URL corresponding to the translation service) ((7) in FIG. 56). Meanwhile, the MFP 10 transmits the "difference data" as the remainder of the scan data obtained in the step (1) (scan data of the second through fourth sheets of the document) to the function server 30 (specifically, to the URL corresponding to the translation service) ((7) in FIG. 56). While the MFP 10 and the directory server 20 in the third embodiment transmit data to the function server 30 without synchronizing with each other, the MFP 10 and the directory server 20 may also be configured, as needed, to transmit data in sequence to the function server 30 by synchronizing with each other. For example, the directory server 20 completing the transmission (transfer) of the scan data of the first sheet to the function server 30 (translation service) may inform the MFP 10 of the completion of data transfer so as to let the MFP 10 start the transmission of the difference data (scan data of the second through fourth sheets) to the function server 30 (translation service).

The function server 30 receiving the scan data from the MFP 10 and the directory server 20 executes a process (translation service) for translating the document ((8) in FIG. 56). After the translation is finished, the function server 30 (translation service) transmits translation data to the MFP 10 ((9) in FIG. 56).

The MFP 10 receiving the translation data prints out the translation data ((10) in FIG. 56). Consequently, the result of translation of the English document is recorded (printed) on a medium by the recording unit 104 of the MFP 10.

Incidentally, while scan data of the first sheet of the document is used for part of the service search data in the third embodiment similarly to the first embodiment, the amount of the scan data to be used for the service search data can be set arbitrarily as mentioned in the first embodiment. In this case, the directory server 20 may transmit (transfer) all the scan data received from the MFP 10 to the function server 30 and the MFP 10 may transmit the remainder of the scan data to the function server 30 as the difference data. If necessary, the directory server 20 may transmit (transfer) part of the scan data received from the MFP 10 to the function server 30 and the MFP 10 may transmit the remainder of the scan data (obtained by excluding the "part of the scan data" received by the directory server 20 from all the scan data) to the function server 30 as the difference data. In the latter case, it is necessary to predetermine which "part" of the scan data should be transferred from the directory server 20 to the function server 30, or to let the MFP 10 and the directory server 20 communicate information regarding the "part".

As explained above, also in the image processing system according to the third embodiment, the user (selecting a service based on a list presented by the MFP 10) is presented with a list generated by extracting suitable services (services that the MFP 10 is likely to request the function server 30 to execute) from all the services executable by the function server 30 (or by sorting the services executable by the function server 30 according to the probability that the MFP 10 requests the function server 30 to execute each service ("◯", "-")) similarly to the first embodiment, by which the user is allowed to find a desired service easily and efficiently.

Further, the directory server 20 in the third embodiment transfers part of the input data (scan data) necessary for the execution of the service by the function server 30 (part or all of the scan data contained in the service search data supplied from the MFP 10) to the function server 30 as the transfer data. Therefore, the MFP 10 is relieved of the need of transmitting input data corresponding to the transfer data to the function server 30, by which the load on the MFP 10 can be reduced. In cases where the directory server 20 and the function server 30 are implemented by a single server computer, the transfer data can be transferred from the directory server 20 to the function server 30 by an intra-computer data transfer process (e.g. data transfer via a shared memory), by which the load on the network outside the server computer can also be lightened.

Embodiment 4

In the following, a fourth embodiment in accordance with the present invention will be described in detail. Since part of the configuration of the fourth embodiment is common with that of the third embodiment, only the difference from the third embodiment will be described in detail, in which reference characters identical with those in the third embodiment (or the first embodiment as the basis of the third embodiment) designate elements identical or equivalent to those of the third embodiment (or the first embodiment) and thus repeated description thereof is omitted for brevity.

In the fourth embodiment described below, the communication procedure when the MFP 10 obtains the service list from the directory server 20 differs from that in the third embodiment.

Figure 57:
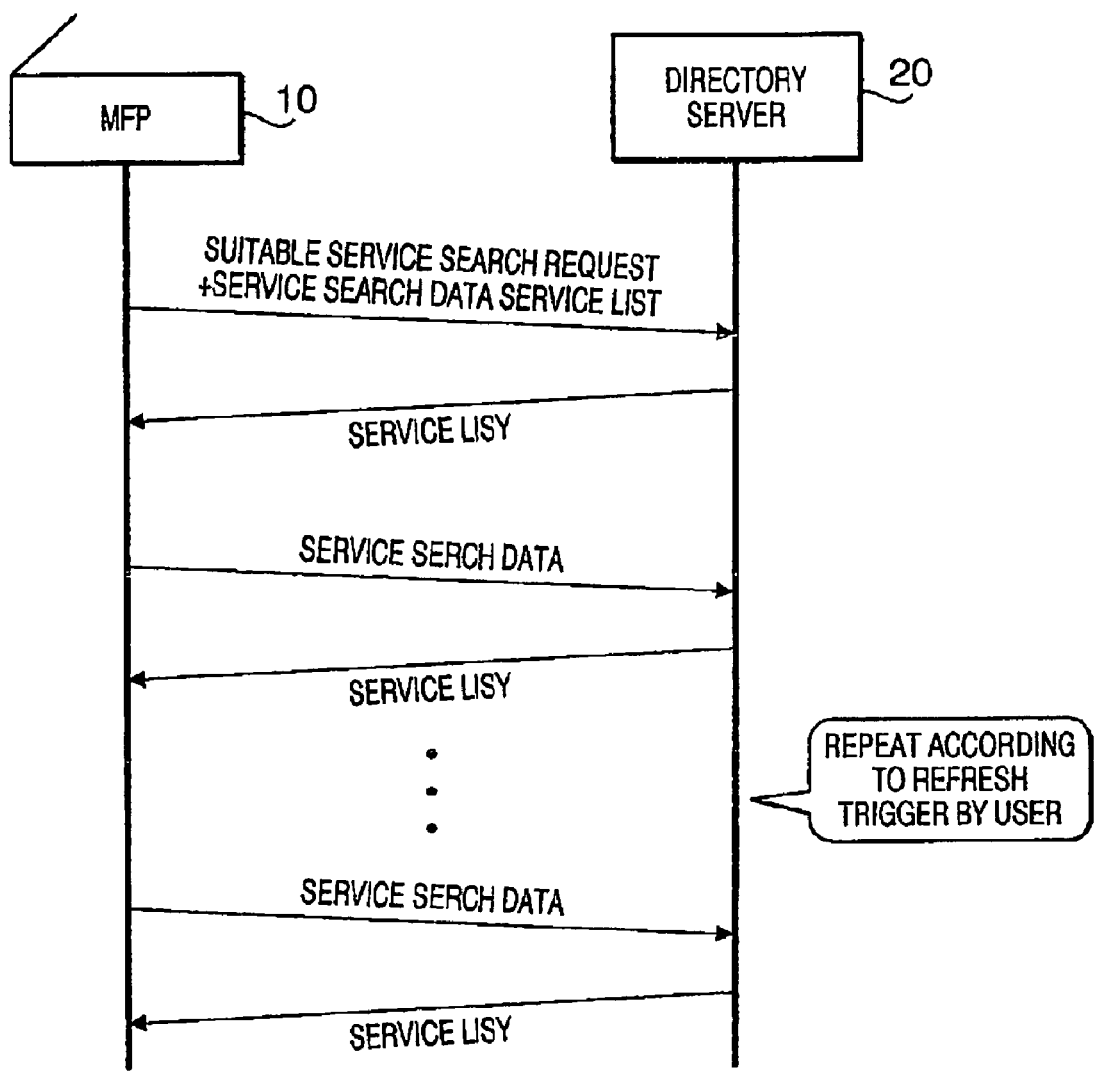
FIG. 57 is a sequence chart showing a communication procedure when the MFP obtains the service list from the directory server in an image processing system in accordance with a fourth embodiment according to the present invention.

FIG. 57 is a sequence chart showing the communication procedure when the MFP 10 obtains the service list from the directory server 20 in the fourth embodiment. When the "suitable service search function" is used in the fourth embodiment, the MFP 10 first transmits a suitable service search request to the directory server 20 together with the service search data. The directory server 20 receiving the suitable service search request (with the service search data) selects services suitable for the service search data, generates the service list, and transmits the service list to the MFP 10. The communication procedure up to this point is identical with that of the third embodiment. Subsequently, the MFP 10 further transmits service search data, and the directory server 20 receiving the service search data generates a new service list and transmits the service list to the MFP 10. The exchange of the service search data and service list is repeated periodically. By the repetition, the service list is refined successively to let the user select a more suitable service.

In the following, a specific configuration employed in the fourth embodiment for realizing the "suitable service search function" will be described in detail.

FIG. 58 is a table showing a data format used in the service search data in the fourth embodiment. The difference from the data format used in the service search data in the third embodiment (see FIG. 15) is that a value "unknown" is added to the values indicating the types of data (TargetDataType).

FIG. 59 is a table showing a service definition information table which is stored in the storage unit 23 of the directory server 20 in the fourth embodiment. The service definition information table shown in FIG. 59 stores (n×m) relevance indices between the n types of services and the m types of service function attributes and each relevance index can be "◯: Relevant Service", "□: Irrelevant" or "-: Unclear", similarly to the third embodiment. The difference from the third embodiment is that the m types of service function attributes include an attribute "All". The attribute "All" is a service function attribute to deal with cases where the service search data contains the aforementioned "unknown" as a value indicating the type of data (TargetDataType).

Processes differing from those of the third embodiment will be explained below in detail.

Figure 60:
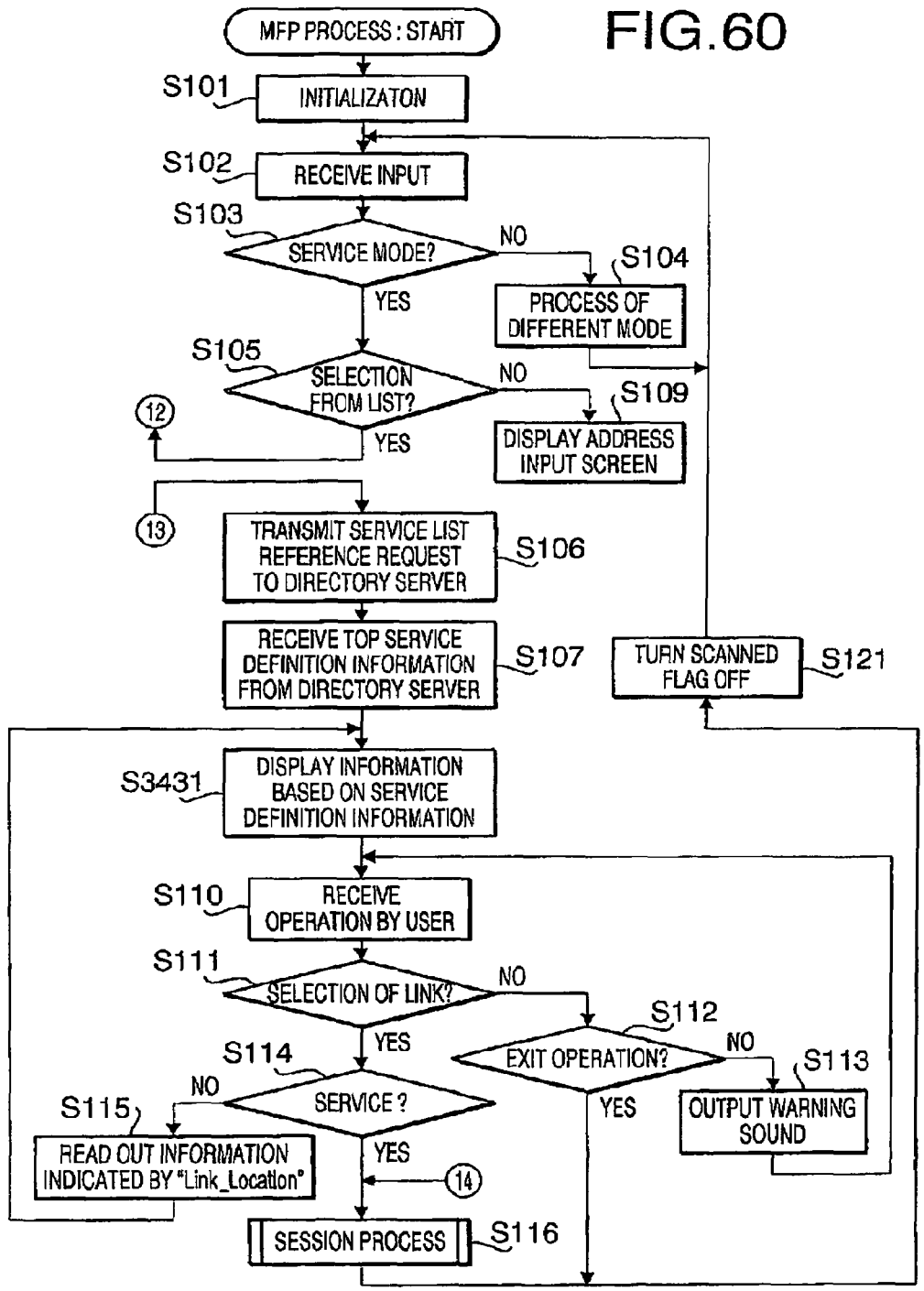
FIGS. 60 and 61 are flowcharts showing a process executed by the MFP in the fourth embodiment instead of the process of FIGS. 20 and 21.
Figure 61:
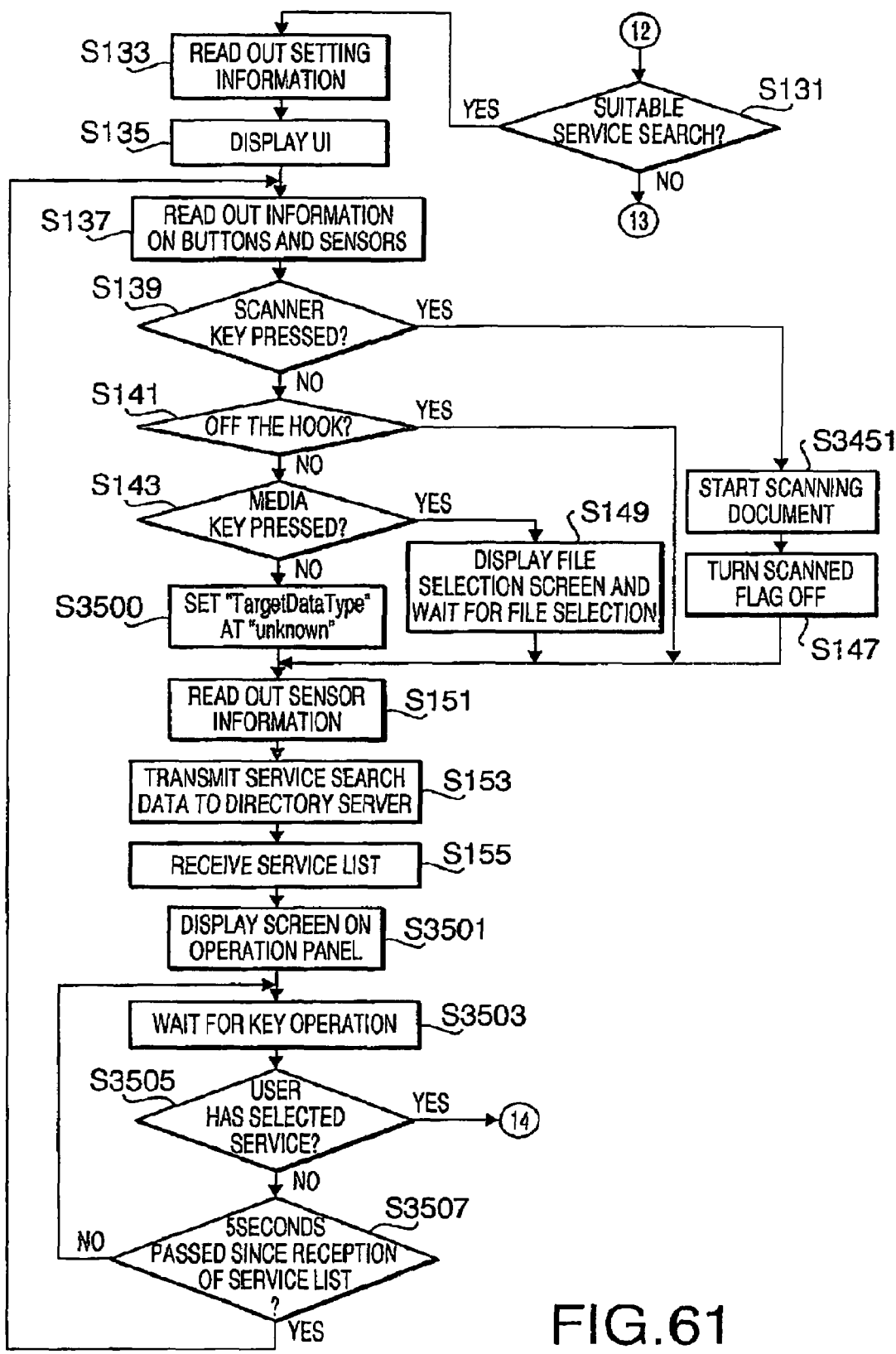
Figure 62:
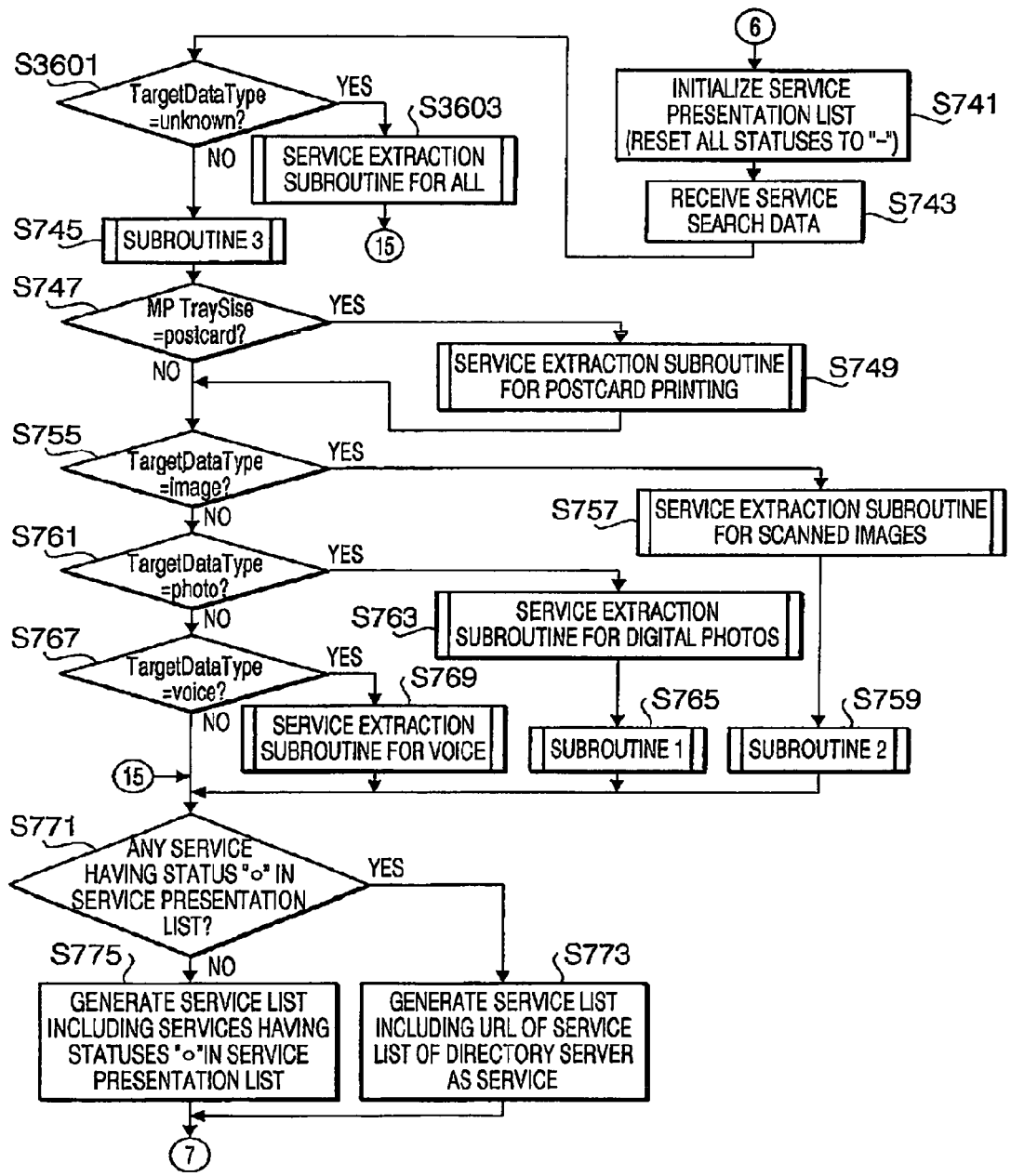
FIG. 62 is a flowchart showing a process executed by the directory server in the fourth embodiment instead of the process of FIG. 28.

FIGS. 60 and 61 are flowcharts showing a process executed by the MFP 10 in the fourth embodiment instead of the process of FIGS. 20 and 21. The difference from the process of FIGS. 20 and 21 is that the step S108 of FIG. 20 is replaced with step S3431, the step S145 of FIG. 21 is replaced with step S3451, the process advances to a new step S3500 and the step S151 when the judgment of the step S143 is "NO" instead of returning to the step S137, the process after the step S155 advances to new steps S3501-3507 (including a judgment step S3505 branching to the steps S137 and S116) instead of returning to the step S108. FIG. 62 is a flowchart showing a process executed by the directory server 20 in the fourth embodiment instead of the process of FIG. 28. The difference from the process of FIG. 28 is that a new step S3601 is added between the steps S743 and S745 and the process advances to a new step S3603 and the step S771 when the judgment of the step S3601 is "NO".

Referring to FIG. 61, when the MFP 10 in the step S139 judges that the scanner key 42 has been pressed (S139: YES), the MFP 10 starts scanning the document (S3451). Specifically, the MFP 10 activates a job that actually executes various control steps regarding the scanning of the document and immediately advances to the step S147 without waiting for the completion of the scanning of the document (while letting the job execute the various control steps regarding the scanning in parallel). When the MFP 10 in the step S143 judges that the media key 40 has not been pressed (S143: NO), the MFP 10 executes the new step S3500 and the steps S151-S155 instead of returning to the step S137 as in the third embodiment. The above alteration from the third embodiment means that the service search data to be transmitted to the directory server 20 in the step S153 is generated after the starting of the scanning of the document, even if the scanning has not been completed. Even when the value ("voice", "image" or "photo") indicating the type of data ("TargetDataType") has not become clear (i.e. when the judgments of the steps S139, S141 and S143 are all "NO"), the "TargetDataType" is set at "unknown" (S3500) and the service search data to be transmitted to the directory server 20 is generated.

In short, even when information for generating the service search data has not been collected completely, the MFP 10 in the fourth embodiment generates the service search data in the step S153 based on information that has been collected so far and transmits the suitable service search request to the directory server 20 together with the service search data.

Since the directory server 20 receiving the suitable service search request returns a service list (The contents of the service list will be explained later in an explanation of the process executed by the directory server 20.), the MFP 10 receives the service list (S1155) and displays a screen on the operation panel 102*a* according to the service list received in S855 (S3501).

Subsequently, the MFP 10 waits for a key operation by the user (S3503) and thereafter judges whether the user has selected a service or not (S3505). If the user has selected no service (S3505: NO), the MFP 10 judges whether five seconds have passed or not since the reception of the service list (S3507). If five seconds have not passed (S3507: NO), the MFP 10 returns to the step S3505 to repeat the steps S3503-S3507, by which the wait for a key operation by the user is continued for five seconds.

When the user performs a key operation for selecting a service within the five seconds (S3505: YES), the MFP 10 advances to the step S116 of FIG. 60 and executes the session process (FIG. 22), etc. similarly to the third embodiment.

When five seconds have passed since the reception of the service list with no key operation for selecting a service (S3507: YES), the MFP 10 returns to the step 8 137 to repeat the loop of steps S137-S3507. In the loop, the MFP 10 collects information on buttons, sensors, etc. again (S137-S151), generates new service search data based on the collected information and transmits the service search data to the directory server 20 (S153), receives a new service list generated by the directory server 20 based on the newly transmitted service search data (S155), and displays a screen on the operation panel 102*a* according to the new service list (S3501), by which the contents of the screen are updated. Thereafter, the MFP 10 waits for a key input for five seconds by repeating the steps S3503-S3507.

Corresponding to the above steps executed by the MFP 10, the directory server 20 executes the following steps. Referring to FIG. 62, after receiving the service search data (S743) and before executing the "subroutine 3" (S745), the directory server 20 judges whether the item "TargetDataType" in the service search data is "unknown" or not (S3601). If the "TargetDataType" is "unknown" (S3601: YES), the directory server 20 executes a service extraction subroutine for "all" (S3603). The service extraction subroutine for "all" (S3603) is also executed according to FIG. 31, in which the column "All" of the service definition information table (see FIG. 59) is searched and the "status" of each service in the service presentation list is updated taking the relevance index regarding the particular service function attribute ("All" in the case of S3603) into consideration. The steps S3601 and S3603 in FIG. 62 are steps corresponding to the aforementioned new step S3500 of the process executed by the MFP 10 (FIGS. 60 and 61).

Incidentally, while the MFP 10 advances to the step S106 (FIG. 60) when the selection by the user in S105 is not the "Suitable Service Search" in S131 of FIG. 61 (S131: NO) similarly to the third embodiment and thereafter executes steps similar to those of the third embodiment, the MFP 10 executes the step S3431 instead of the step S108 of the third embodiment (displaying information based on the service list or the service definition information 25) and thereby displays information based on the service definition information 25 on the display 52. The step S3431 in the fourth embodiment is only required to display information based on the service definition information 25 since information based on the service list received in S155 is displayed in the step S3501 in the case of the suitable service search (when the judgment of S131 of FIG. 61 is "YES") as explained above.

The above processes are those differing from the third embodiment. The other processes are executed similarly to the third embodiment.

Figure 63:
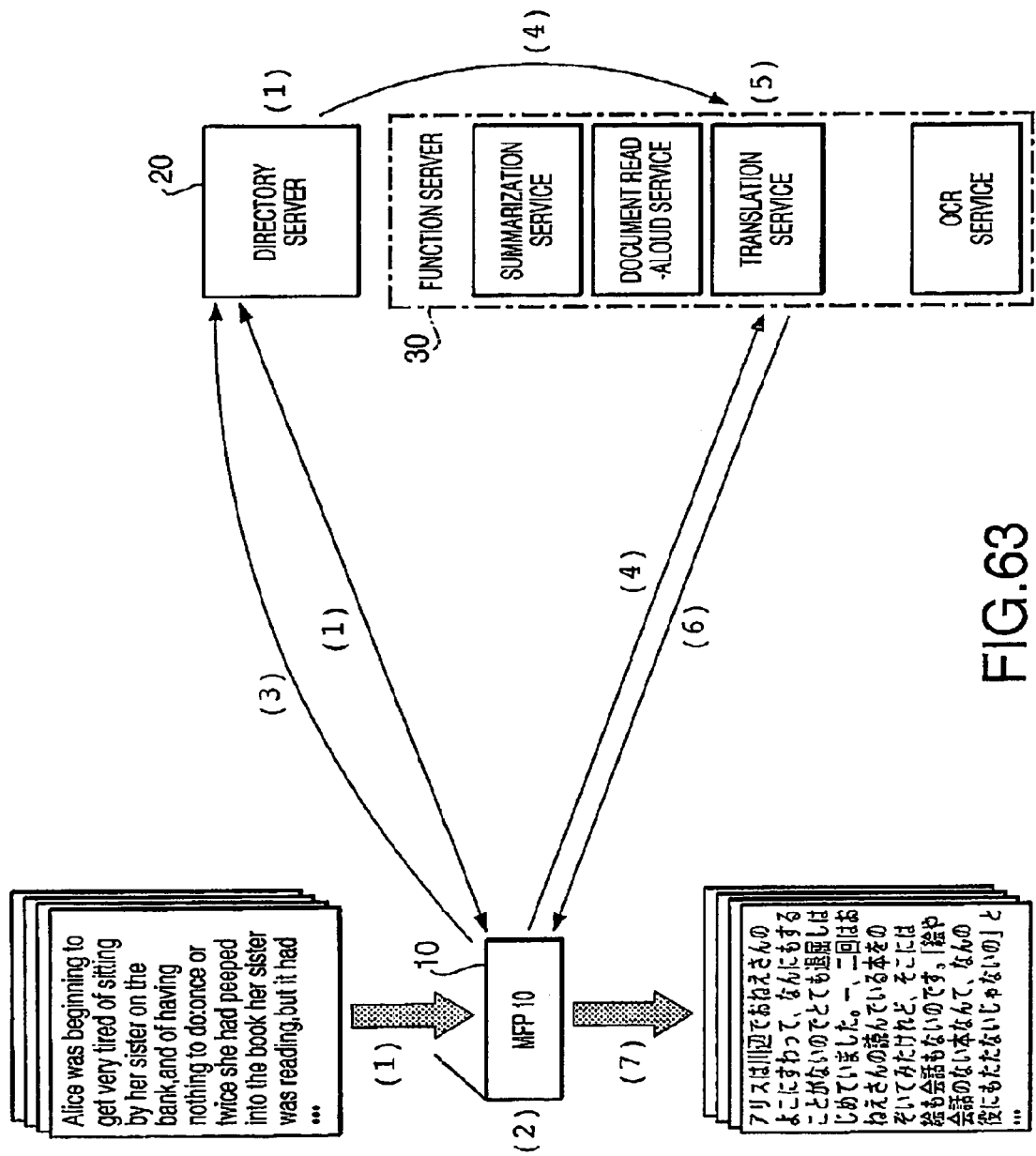
FIG. 63 is an explanatory diagram showing an example of the flow of communication and processes executed in the fourth embodiment.

FIG. 63 is an explanatory diagram showing the flow (1)-(7) of communication and processes executed by the MFP 10, the directory server 20 and the function server 30 in the image processing system of the fourth embodiment, taking the "English-Japanese Document Translation Service" as an example. The communication and processes shown in FIG. 63 will be explained below along the flow (1)-(7).

In a period after the start of an operation by the user and before the selection (determination) of a service requested by the MFP 10, the MFP 10 executes the scanning of the English document while repeating the transmission of the service search data to the directory server 20, the reception of the service list from the directory server 20, the displaying of information based on the service list, etc. at intervals of approximately five seconds ((1) in FIG. 63).

During the repetition, the service search data transmitted from the MFP 10 to the directory server 20 changes successively according to the user operation status of the MFP 10 and the progress of the scanning. For example, when the user performs no particular operation just after pressing the service key 44, data to be transmitted to the function server 30 can not be identified at this point, and thus the item "TargetDataType" in the service search data generated by the MFP 10 is set at "unknown" (see FIG. 64A). The directory server 20 receiving such service search data (S3601: YES) advances to the step S3603 and executes the service extraction subroutine for "all", by which a service presentation list presenting all the services (see FIG. 64C) is generated. A service list generated based on such a service presentation list is transmitted from the directory server 20 to the MFP 10 and is displayed on the display 52 of the MFP 10 (see FIG. 64B). The screen shown in FIG. 64B displays 14 services (all the services executable by the function server 30) as candidates of selection.

After the above loop is executed once, the second loop is executed in the next five seconds. If the scanner key 42 is pressed by the user for starting the scanning of a document and the first sheet of the document is scanned during the five seconds, the item "TargetDataType" in the service search data generated by the MFP 10 is set at "image" and scan data obtained by the scanning of the first sheet is added to the service search data (see FIG. 65A). The directory server 20 receiving such service search data including the scan data analyzes the scan data to determine the language of the document by successively executing OCR processes in different languages as explained in the first embodiment. While whether the analysis can determine the language or not varies depending on the scan data, this explanation will be continued assuming that the analysis can not determine the language from the scan data of the first sheet. When the language of the document can not be determined, the directory server 20 executes the "subroutine 3" (as a group of service extraction subroutines using area information) (S745) and the service extraction subroutine for scanned images (S757), by which a service presentation list presenting services filtered by the area information and the service extraction subroutine for scanned images (see FIG. 65C) is generated. A service list generated based on such a service presentation list is transmitted from the directory server 20 to the MFP 10 and is displayed on the display 52 of the MFP 10 (see FIG. 65B). The screen shown in FIG. 65B displays 6 services having statuses "◯" in the service presentation list.

After the above second loop, the third loop is executed in the next five seconds. If the second sheet of the document is scanned during the five seconds, scan data of the second sheet is added to the service search data generated by the MFP 10 (see FIG. 66A). The directory server 20 receiving such service search data analyzes the scan data (including the scan data of the second sheet) to determine the language of the document by successively executing OCR processes in different languages as explained in the first embodiment. While whether the analysis can determine the language or not varies depending on the scan data as mentioned above, this explanation will be continued assuming that the analysis successfully determines that the document is an English document from the scan data of the second sheet. When the document is determined to be an English document, the directory server 20 further executes the service extraction subroutine for English documents (S113 in FIG. 32) in the "second subroutine" (S759), by which a service presentation list presenting services further filtered by the service extraction subroutine for English documents (see FIG. 66C) is generated. A service list generated based on such a service presentation list is transmitted from the directory server 20 to the MFP 10 and is displayed on the display 52 of the MFP 10 (see FIG. 66B). The screen shown in FIG. 66B displays 4 services having statuses "○" in the service presentation list.

Figure 67:
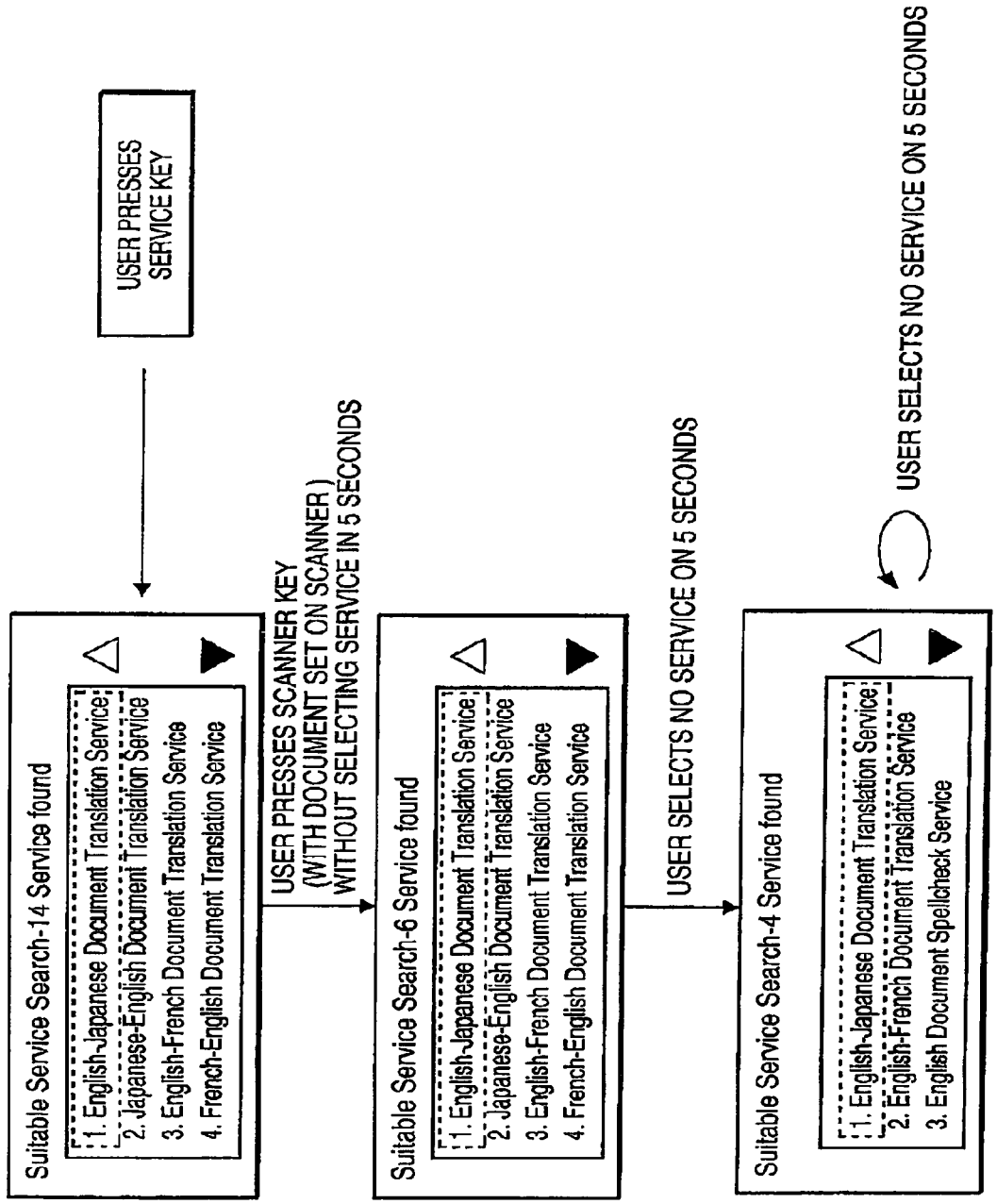
FIG. 67 is a schematic diagram showing the transition of the screen displayed on the operation panel in the fourth embodiment.

As above, by the three repetitions of the loop, the screen displayed on the display 52 of the MFP 10 changes in three stages as shown in FIG. 67 after the pressing of the service key 44 by the user. While the number of stages of search refinement varies depending on the total number of services, new information added to the service search data, etc., this explanation will be continued assuming that no information further refining the service search is obtained after the third displaying of the screen and the third screen remains on the display 52.

The user viewing the screen on the display 52 changing successively as above selects a service from the screen ((2) in FIG. 63). This explanation will be continued assuming that the user selects the "English-Japanese Document Translation Service" from the screen.

In response to the selection by the user, the MFP 10 requests the directory server 20 to transfer already received scan data to the function server 30 (translation service) ((3) in FIG. 63).

The directory server 20 receiving the data transfer request transmits the already received scan data to the function server 30 (specifically, to the URL corresponding to the translation service) ((4) in FIG. 63). Meanwhile, the MFP 10 transmits the "difference data" as the remainder of the scan data obtained in the step (1) to the function server 30 (specifically, to the URL corresponding to the translation service) ((4) in FIG. 63). While the MFP 10 and the directory server 20 in the fourth embodiment transmit data to the function server 30 without synchronizing with each other, the MFP 10 and the directory server 20 may also be configured to synchronize with each other as needed, similarly to the third embodiment.

The function server 30 receiving the scan data from the MFP 10 and the directory server 20 executes a process (translation service) for translating the document ((5) in FIG. 63). After the translation is finished, the function server 30 (translation service) transmits translation data to the MFP 10 ((6) in FIG. 63).

The MFP 10 receiving the translation data prints out the translation data ((7) in FIG. 63). Consequently, the result of translation of the English document is recorded (printed) on a medium by the recording unit 104 of the MFP 10.

As explained above, also in the image processing system according to the fourth embodiment, the user (selecting a service based on a list presented by the MFP 10) is presented with a list generated by extracting suitable services (services that the MFP 10 is likely to request the function server 30 to execute) from all the services executable by the function server 30 (or by sorting the services executable by the function server 30 according to the probability that the MFP 10 requests the function server 30 to execute each service ("○", "-")) similarly to the first embodiment, by which the user is allowed to find a desired service easily and efficiently.

Further, the service search data in the fourth embodiment is transmitted from the MFP 10 to the directory server 20 a plurality of times, and the directory server 20 executes the presumption process (presuming the probability that the MFP 10 requests the function server 30 to execute each of the services executable by the function server 30) on every reception of service search data based on the service search data (including newly received data or updated with the newly received data) and according to prescribed presumption rules.

Therefore, with the image processing system of the fourth embodiment, the presumption with higher accuracy becomes possible as time passes, by which suitable services (services having high probabilities of being requested by the MFP 10 from the function server 30) can be narrowed down gradually while leaving services of higher probabilities in the list, and the list gradually refined as above can be successively presented to the user.

Incidentally, while the list is refined every five seconds in the above embodiment, the cycle of search refinement is of course not restricted to five seconds. The MFP 10 may also be configured to let the user arbitrarily set the search refinement cycle. Further, the search refinement is not necessarily required to be strictly periodic; no problem is caused even if the timing of search refinement is varied due to other processes, etc.

Embodiment 5

In the following, a fifth embodiment in accordance with the present invention will be described in detail. Since part of the configuration of the fifth embodiment is common with that of the fourth embodiment, only the difference from the fourth embodiment will be described in detail, in which reference characters identical with those in the fourth embodiment (or other embodiments as the basis of the Fourth embodiment) designate elements identical or equivalent to those of the fourth embodiment (or other embodiments) and thus repeated description thereof is omitted for brevity In the fifth embodiment described below, the service search data is transmitted from the MFP 10 to the directory server 20 a plurality of times similarly to the fourth embodiment. However, the trigger for the transmission of service search data differs from that in the fourth embodiment.

Figure 68:
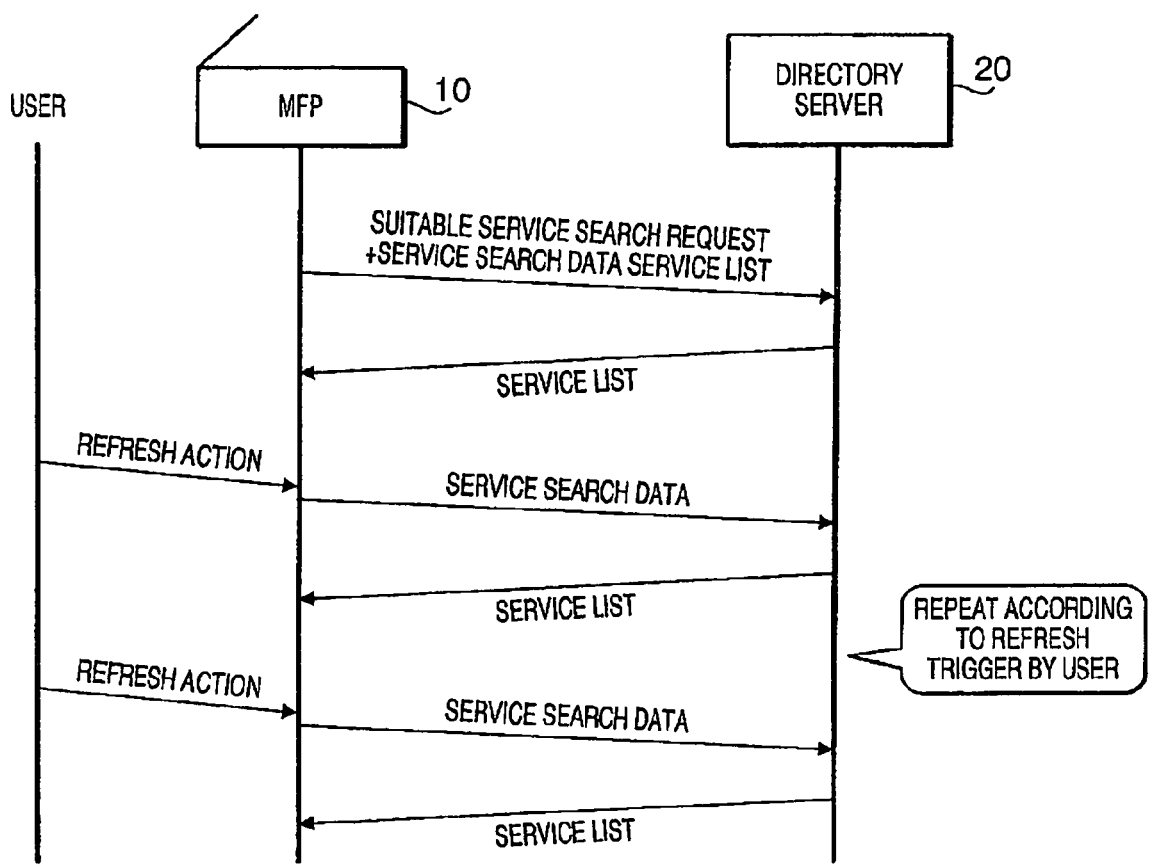
FIG. 68 is a sequence chart showing a communication procedure when the MFP obtains the service list from the directory server in an image processing system in accordance with a fifth embodiment according to the present invention.

FIG. 68 is a sequence chart showing a communication procedure when the MFP 10 obtains the service list from the directory server 20 in the fifth embodiment. When the "suitable service search function" is used in the fifth embodiment, the MFP 10 first transmits a suitable service search request to the directory server 20 together with the service search data The directory server 20 receiving the suitable service search request (with the service search data) selects services suitable for the service search data, generates the service list, and transmits the service list to the MFP 10. The communication procedure up to this point is identical with that of the fourth embodiment. Thereafter, the MFP 10 further transmits service search data when the "Refresh" key 55 is pressed by the user. The directory server 20 receiving the service search data generates a new service list and transmits the service list to the MFP 10. The exchange of the service search data and service list is repeated on every pressing of the "Refresh" key 55. By the repetition, the service list is refined successively to let the user select a more suitable service.

A process differing from that of the fourth embodiment will be explained below in detail.

Figure 69:
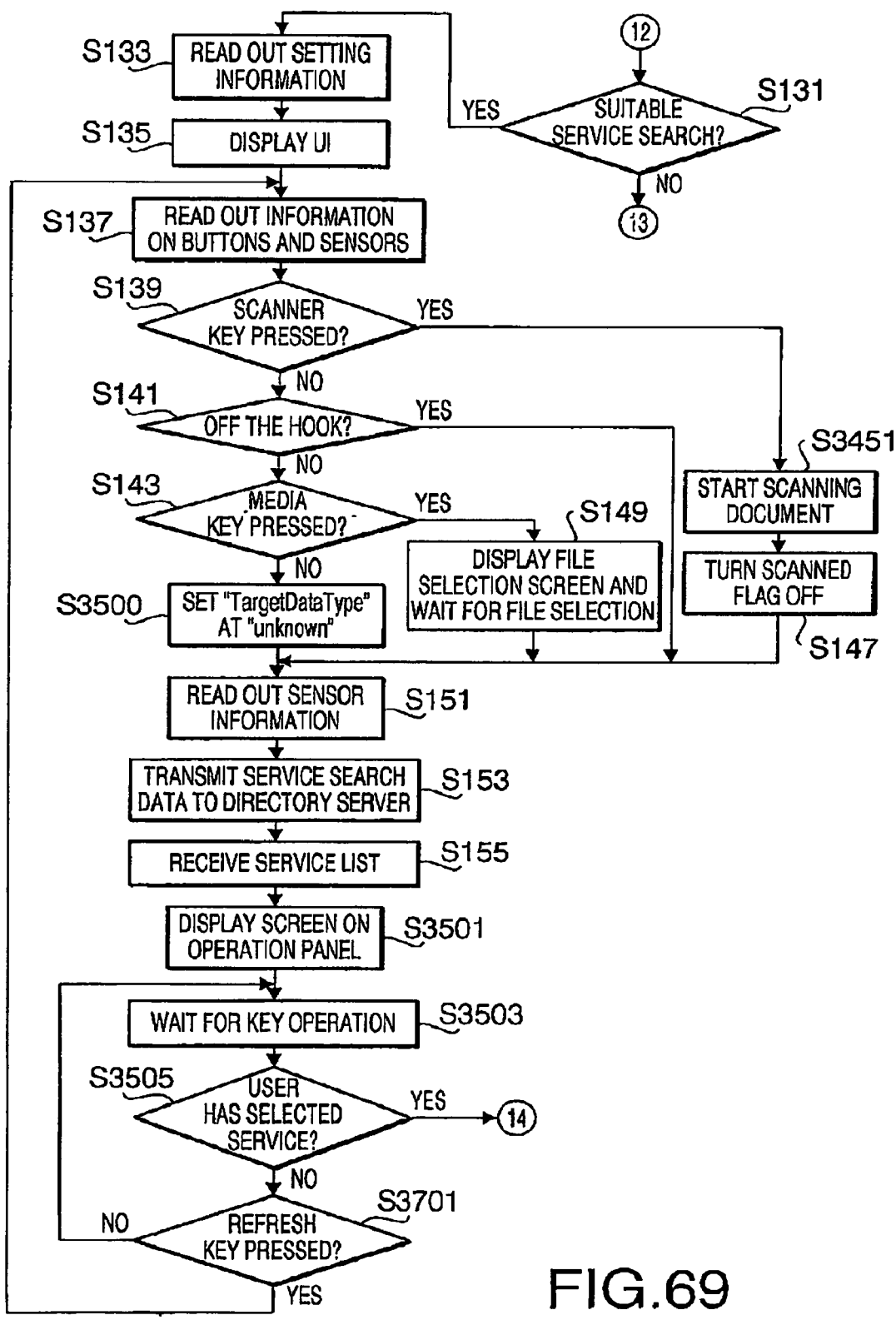
FIG. 69 is a flowchart showing a process executed by the MFP in the fifth embodiment instead of the process of FIG. 61.

FIG. 69 is a flowchart showing a process executed by the MFP 10 in the fifth embodiment instead of the process of FIG. 61. The difference from the process of FIG. 61 is step S3701 which is executed instead of the step S3507 of FIG. 61.

Figure 70:
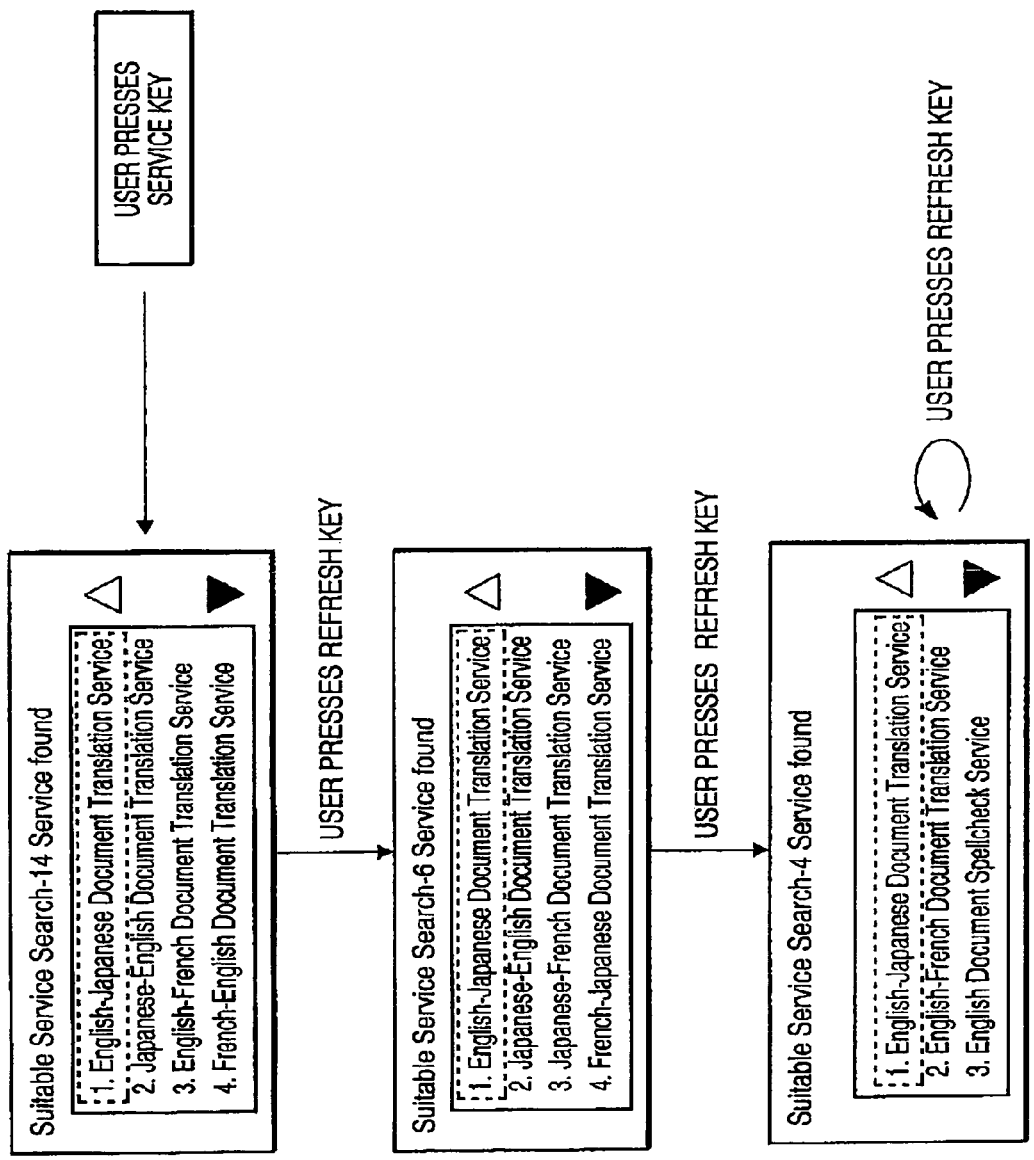
FIG. 70 is a schematic diagram showing the transition of the screen displayed on the operation panel in the fifth embodiment.

With the above configuration, the MFP 10 in the fifth embodiment returns to the step S137 when the "Refresh" key 55 is pressed by the user, differently from the MFP 10 in the fourth embodiment returning to the step S137 when five seconds have passed since the reception of the service list. Consequently, the screen displayed on the display 52 of the MFP 10 changes each time the user presses the "Refresh" key 55 as shown in FIG. 70 after the pressing of the service key 44 by the user. While the number of stages of search refinement varies depending on the total number of services, new information added to the service search data, etc., the third screen shown in FIG. 70 remains unchanged even when the "Refresh" key 55 is pressed if no information further refining the service search is obtained after the displaying of the third screen.

Also in the image processing system of the fifth embodiment, the user (selecting a service based on a list presented by the MFP 10) is presented with a list generated by extracting suitable services (services that the MFP 10 is likely to request the function server 30 to execute) from all the services executable by the function server 30 (or by sorting the services executable by the function server 30 according to the probability that the MFP 10 requests the function server 30 to execute each service ("○", "-")) similarly to the first embodiment, by which the user is allowed to find a desired service easily and efficiently.

Similarly to the fourth embodiment, suitable services (services having high probabilities of being requested by the MFP 10 from the function server 30) can be narrowed down gradually while leaving services of higher probabilities in the list, and the list gradually refined as above can be successively presented to the user.

Further, the search refinement in the fifth embodiment is executed only when the "Refresh" key 55 is pressed by the user, in contrast with the fourth embodiment executing the search refinement automatically with time. While which embodiment is more convenient varies depending on the status of use of the system, the user's familiarity with the system, etc., the fifth embodiment is more convenient for users hoping to avoid the automatic search refinement with time irrespective of the user's intention or operation while the fourth embodiment is more convenient for users feeling it troublesome to press the "Refresh" key 55 each time.

Embodiment 6

In the following, a sixth embodiment in accordance with the present invention will be described in detail. Since part of the configuration of the sixth embodiment is common with that of the fourth embodiment, only the difference from the fourth embodiment will be described in detail, in which reference characters identical with those in the fourth embodiment (or other embodiments as the basis of the fourth embodiment) designate elements identical or equivalent to those of the fourth embodiment (or other embodiments) and thus repeated description thereof is omitted for brevity.

In the sixth embodiment described below, the service search data is transmitted from the MFP 10 to the directory server 20 a plurality of times similarly to the fourth embodiment. However, the trigger for the transmission of service search data differs from that in the fourth embodiment.

Figure 71:
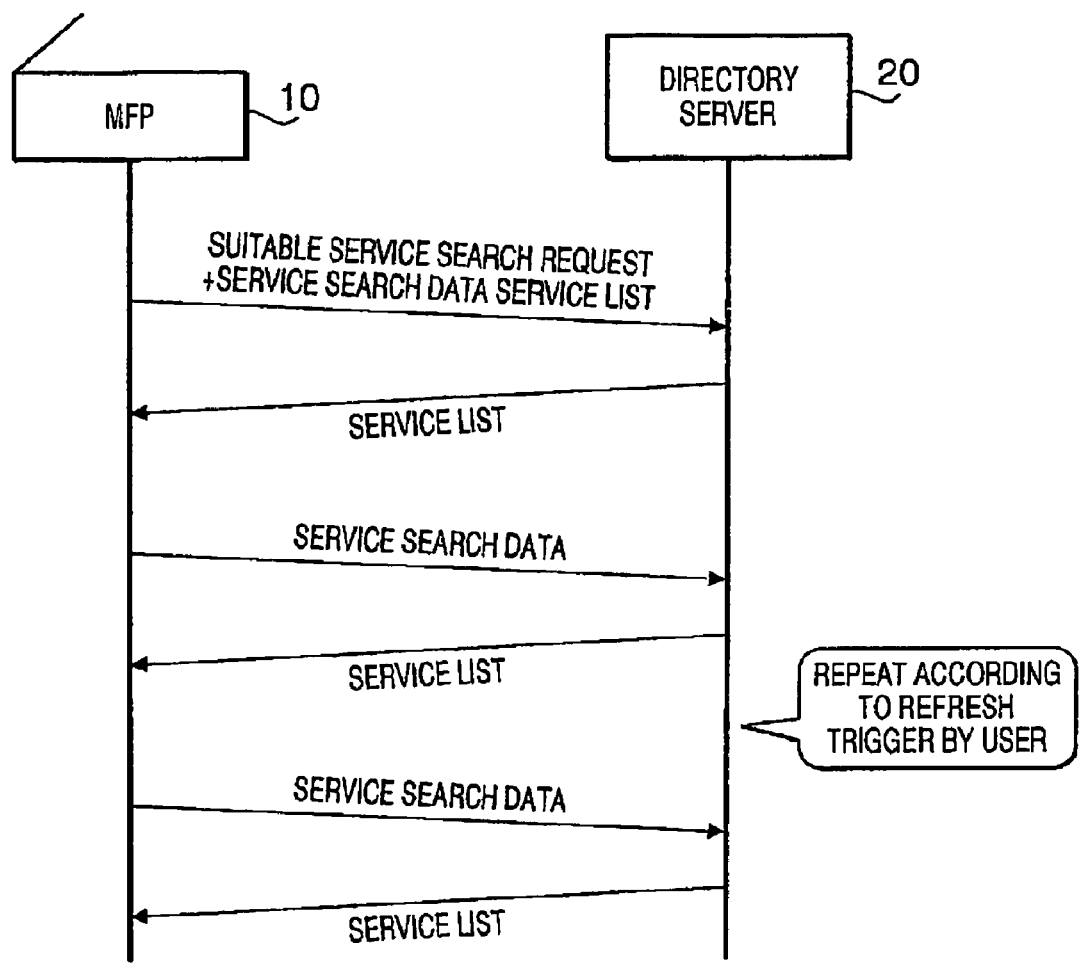
FIG. 71 is an explanatory diagram showing an example of the flow of communication and processes executed in a sixth embodiment according to the present invention.

FIG. 71 is a sequence chart showing a communication procedure when the MFP 10 obtains the service list from the directory server 20 in the sixth embodiment. When the "suitable service search function" is used in the sixth embodiment, the MFP 10 first transmits a suitable service search request to the directory server 20 together with the service search data. The directory server 20 receiving the suitable service search request (with the service search data) selects services suitable for the service search data, generates the service list, and transmits the service list to the MFP 10. The communication procedure up to this point is identical with that of the fourth embodiment. Thereafter, the MFP 10 further transmits service search data when a "no-operation state" (in which no operation is received from the user) has continued for five seconds. The directory server 20 receiving the service search data generates a new service list and transmits the service list to the MFP 10. The exchange of the service search data and service list is repeated every time the "no-operation state" continues for five seconds. By the repetition, the service list is refined successively to let the user select a more suitable service.

A process differing from that of the fourth embodiment will be explained below in detail.

Figure 72:
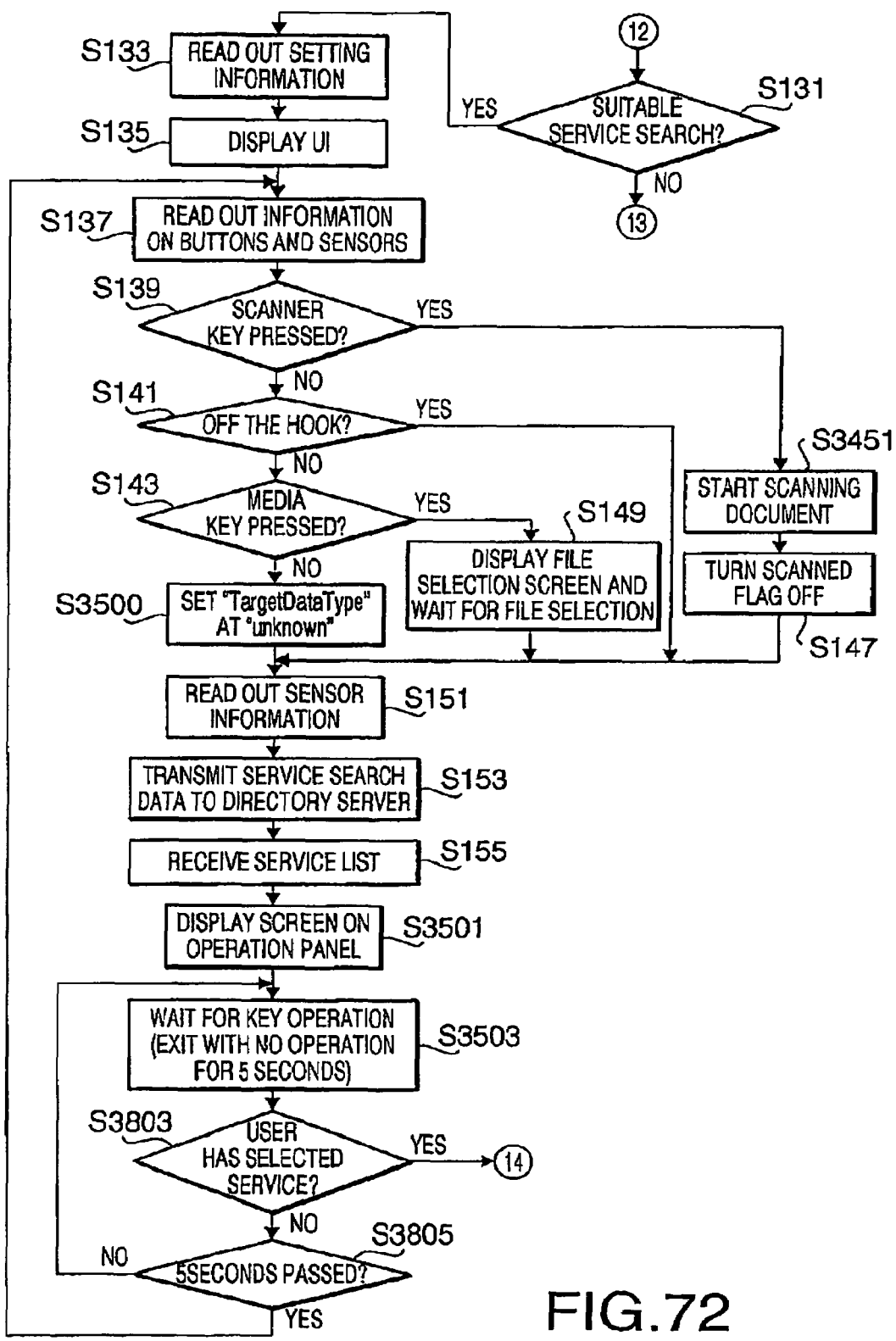
FIG. 72 is a flowchart showing a process executed by the MFP in the sixth embodiment instead of the process of FIG. 61.

FIG. 72 is a flowchart showing a process executed by the MFP 10 in the sixth embodiment instead of the process of FIG. 61. The difference from the process of FIG. 61 is steps S3801-S3805 which are executed instead of the steps S3503-S3507 of FIG. 61.

Figure 73:
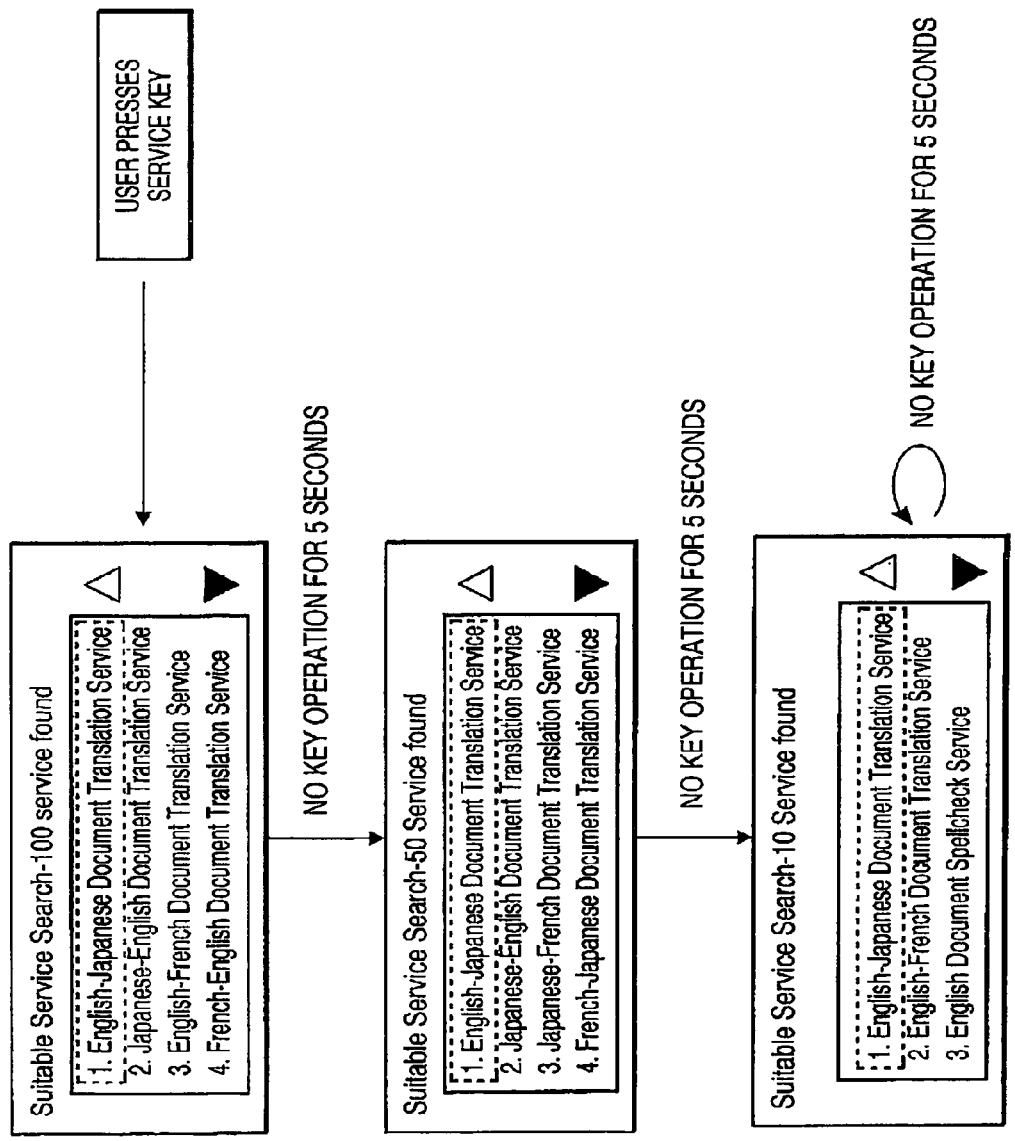
FIG. 73 is a schematic diagram showing the transition of the screen displayed on the operation panel in the sixth embodiment

With the above configuration, the MFP 10 in the sixth embodiment returns to the step S137 when the "no-operation state" (with no operation by the user in step S3801) has continued for five seconds (S3805: YES), differently from the MFP 10 in the fourth embodiment returning to the step S137 when five seconds have passed since the reception of the service list. Consequently, the screen displayed on the display 52 of the MFP 10 changes each time the "no-operation state" continues for five seconds as shown in FIG. 73 after the pressing of the service key 44 by the user. While the number of stages of search refinement varies depending on the total number of services, new information added to the service search data, etc., the third screen shown in FIG. 73 remains unchanged even when the "no-operation state" continues for five seconds if no information further refining the service search is obtained after the displaying of the third screen.

Also in the image processing system of the sixth embodiment, the user (selecting a service based on a list presented by the MFP 10) is presented with a list generated by extracting suitable services (services that the MFP 10 is likely to request the function server 30 to execute) from all the services executable by the function server 30 (or by sorting the services executable by the function server 30 according to the probability that the MFP 10 requests the function server 30 to execute each service ("○", "-")) similarly to the first embodiment, by which the user is allowed to find a desired service easily and efficiently.

Similarly to the fourth embodiment, suitable services (services having high probabilities of being requested by the MFP 10 from the function server 30) can be narrowed down gradually while leaving services of higher probabilities in the list, and the list gradually refined as above can be successively presented to the user.

Further, the search refinement in the sixth embodiment is executed only when the "no-operation state" continues for five seconds, in contrast with the fourth embodiment executing the automatic search refinement every five seconds irrespective of the user's operation. While which embodiment is more convenient varies depending on the status of use of the system, the user's familiarity with the system, etc., the sixth embodiment is more convenient for users hoping to avoid the automatic search refinement during the user's operation while the fourth embodiment is more convenient for users hoping for the automatic search refinement even during the user's operation.

Incidentally, while the list is refined when the "no-operation state" has continued for five seconds in the above embodiment, the duration of the "no-operation state" required for the search refinement may of course be increased/decreased from five seconds. The MFP 10 may also be configured to let the user arbitrarily set the duration.

Embodiment 7

In the following, a seventh embodiment in accordance with the present invention will be described in detail. Since part of the configuration of the seventh embodiment is common with that of the fourth embodiment, only the difference from the fourth embodiment will be described in detail, in which reference characters identical with those in the fourth embodiment (or other embodiments as the basis of the fourth embodiment) designate elements identical or equivalent to those of the fourth embodiment (or other embodiments) and thus repeated description thereof is omitted for brevity.

In the seventh embodiment described below, the service search data is transmitted from the MFP 10 to the directory server 20 a plurality of times similarly to the fourth embodiment. However, the transmission of service search data is stopped when a condition explained below is satisfied.

A process differing from that of the fourth embodiment will be explained below in detail.

Figure 74:
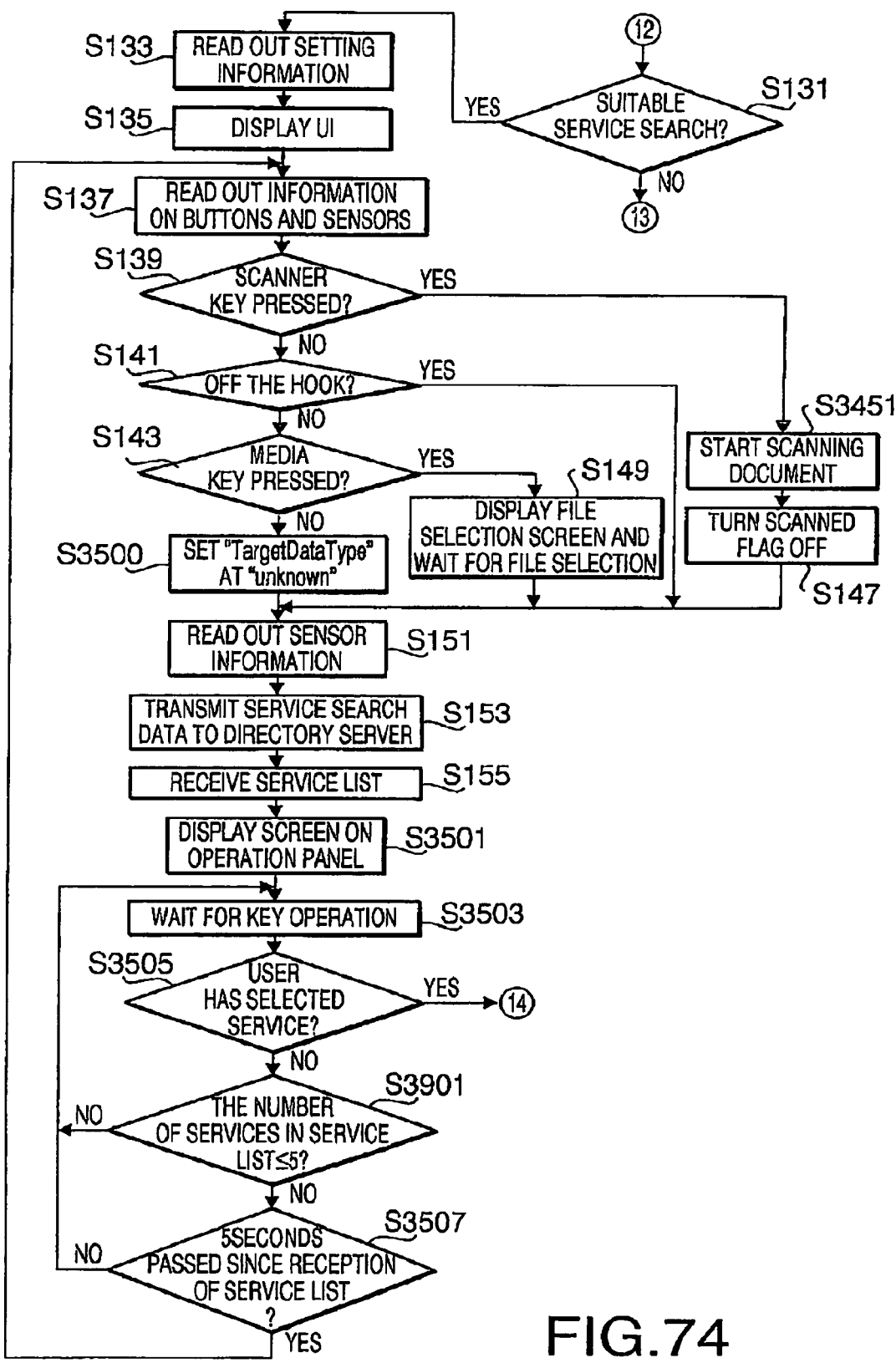
FIG. 74 is a flowchart showing a process executed by the MFP in an image processing system in accordance with a seventh embodiment of the present invention instead of the process of FIG. 61.

FIG. 74 is a flowchart showing a process executed by the MFP 10 in the seventh embodiment instead of the process of FIG. 61. The difference from the process of FIG. 61 is that a new step S3901 is added between the steps S3505 and S3507.

Figure 75:
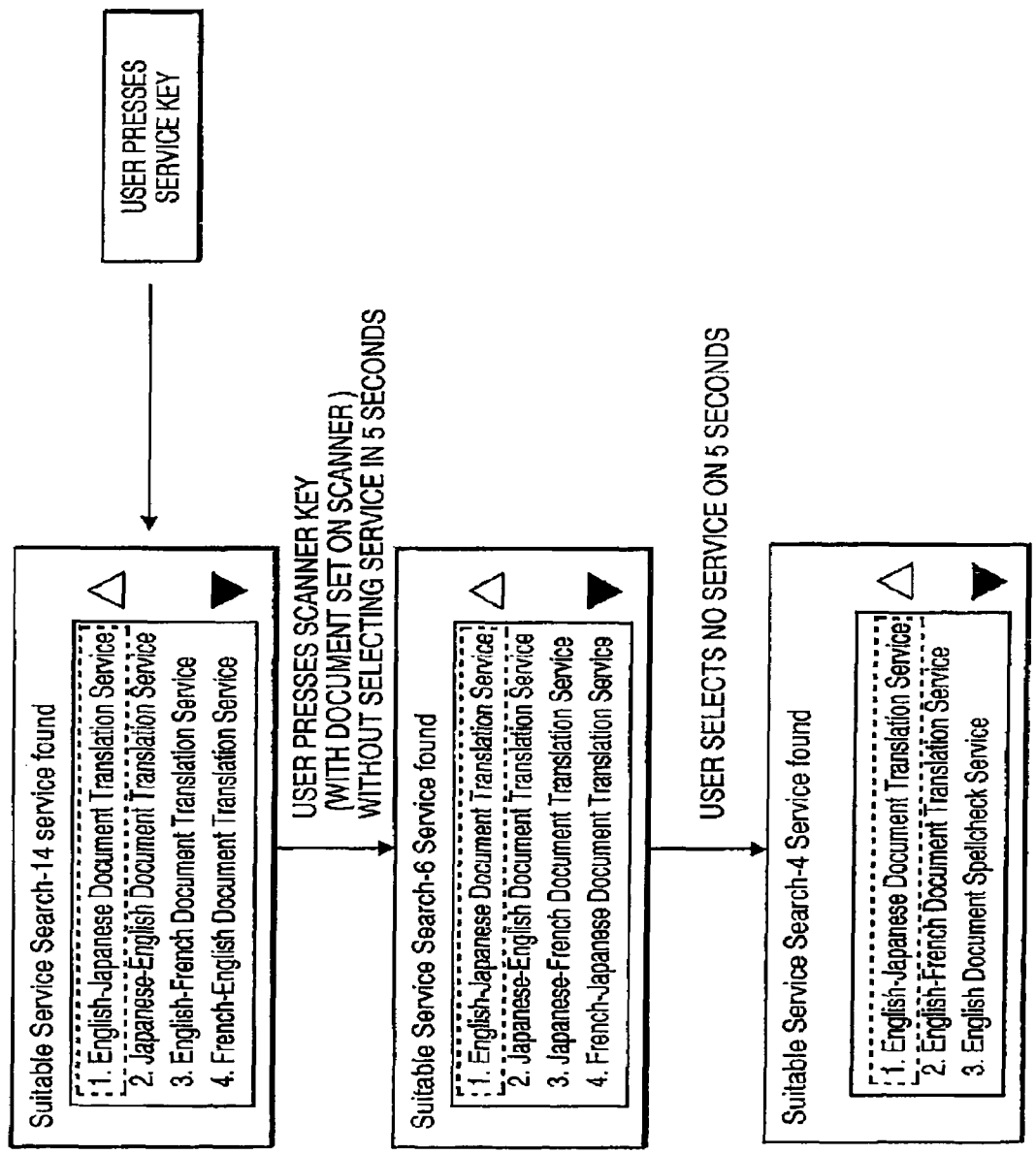
FIG. 75 is a schematic diagram showing the transition of the screen displayed on the operation panel in the seventh embodiment.

With the above configuration, in contrast with the MFP 10 in the fourth embodiment necessarily returning to the step S137 due to the affirmative judgment of S3507 when five seconds have passed since the reception of the service list, the MFP 10 in the seventh embodiment judges whether or not the number of services is five or less in the new step S3901. If the number of services is more than five (S3901: NO), the MFP 10 (advances to the judgment step S3507 similarly to the fourth embodiment. If the number of services is five or less (S3901: YES), the MFP 10 returns to the step S3503 without advancing to S3507. Therefore, when the number of services in the service list has reduced to five or less, the MFP 10 does not advance to the judgment step S3507 and the transmission of service search data is not executed even when five seconds have passed since the reception of the service list. Consequently, while the screen displayed on the display 52 of the MFP 10 changes as shown in FIG. 75 after the pressing of the service key 44 by the user similarly to the fourth embodiment, the transmission of service search data and the update of the service list (search refinement) are stopped when the number of services has reduced to five or less.

Also in the image processing system of the seventh embodiment, the user (selecting a service based on a list presented by the MFP 10) is presented with a list generated by extracting suitable services (services that the MFP 10 is likely to request the function server 30 to execute) from all the services executable by the function server 30 (or by sorting the services executable by the function server 30 according to the probability that the MFP 10 requests the function server 30 to execute each service ("○", "-")) similarly to the first embodiment, by which the user is allowed to find a desired service easily and efficiently.

Similarly to the fourth embodiment, suitable services (services having high probabilities of being requested by the MFP 10 from the function server 30) can be narrowed down gradually while leaving services of higher probabilities in the list, and the list gradually refined as above can be successively presented to the user.

Further, in the seventh embodiment, the transmission of service search data is stopped when the number of services has reduced to five or less (in contrast with the fourth embodiment in which the transmission of service search data is repeated unlimitedly) by which the load on the network and the directory server 20 can be reduced. Incidentally, while the number of services as the condition for the stoppage of the transmission of service search data (threshold number) is five in the above embodiment, the threshold number may be set arbitrarily (e.g. ten). The MFP 10 may also be configured to let the user arbitrarily set the threshold number.

While a description has been given above of preferred embodiments in accordance with the present invention, the present invention is not to be restricted by the particular illustrative embodiments and a variety of modifications, design changes, etc. are possible without departing from the scope and spirit of the present invention described in the appended claims.

For example, while each embodiment described above employed a directory server 20 and a function server 30 as servers forming the image processing system, such a configuration is only an example for easy explanation and understanding of the present invention and thus other configurations may also be employed.

For example, the image processing system may include two or more directory servers 20 (e.g. a first directory server 20 transmitting the top service definition information 25 and a second directory server 20 transmitting the service definition information 25 on each category) or two or more function servers 30 (e.g. a first function server 30 transmitting the service I/F information 36 and a second function server 30 executing services). The function server 30 executing services may also be implemented by two or more separated servers. For example, a function server 30 executing the session process and a function server 30 executing the job processes may be implemented by separate servers. It is also possible to let a plurality of function servers 30 execute separate services (e.g. a first function server 30 executing service A, a second function server 30 executing services B-D, a third function server 30 executing services E and F, etc.). In this case, the service I/F information 36 may be sent to the MFP 10 in various ways. For example, each function server 30 executing one or more services may send service I/F information 36 corresponding to the services to the MFP 10, or a function server 30 for sending all the service I/F information 36 to the MFP 10 may be provided separately from the function servers 30 executing the services.

Further, a directory server 20 and a function server 30 may be implemented by a single computer, or installed in one or more of MFPs 10 forming an image processing system.

What is claimed is:

1. An image processing system comprising:
an image processing device including at least one of an image reading unit that reads an image, thereby generating image data representing the image, and an image printing unit that prints out an image represented by image data;
a service supply unit capable of executing a service regarding at least one of image data generated by the image reading unit and image data representing an image to be printed out by the image printing unit, in response to a request from the image processing device; and
an information supply unit which supplies the image processing device with information on services executable by the service supply unit, wherein:
the image processing device includes:
a service search data transmission unit that transmits service search data to the information supply unit, the service search data containing one or more pieces of information selected from one or more pieces of information regarding settings of the image processing device which are stored in the image processing device, one or more pieces of information indicating status of the image processing device detected in each part of the image processing device, one or more pieces of information indicating operations that the image processing device has received from a user, and one or more pieces of information to be transmitted from the image processing device and handed over to the service supply unit when a service is executed;
a service determination unit that presents the information on services transmitted from the information supply unit to the user, lets the user select a service from the presented information, and determines the selected service as a service to be requested from the service supply unit; and
a service requesting unit that requests the service supply unit to execute the service determined by the service determination unit, and
the information supply unit includes
a service search data reception unit that receives the service search data transmitted from the image processing device;
a presumption unit that presumes a probability that the image processing device requests the service supply unit to execute each of the services executable by the service supply unit based on the service search data received by the service search data reception unit and according to prescribed presumption rules, the prescribed presumption rules including at least an evaluation of a relevancy of each service to an attribute of the service search data; and
a list supply unit that supplies the image processing device with one of a list generated by extracting services likely to be requested by the image processing device from the service supply unit from all the services executable by the service supply unit and a list generated by sorting the services executable by the service supply unit according to the probability that the image processing device requests the service supply unit to execute each of the services based on a presumption result by the presumption unit, as the information on services executable by the service supply unit.

2. The image processing system according to claim 1, further comprising:
a relevance information storage unit that stores relevance information indicating the degree of relevance between each of n types of services executable by the service supply unit (n: positive integer) and each of m types of attributes (m: positive integer) that is relevant to at least a type of service, regarding all (n×m) combinations,
wherein the presumption unit extracts one or more services having high relevance to the service search data received by the service search data reception unit by referring to the relevance information stored in the relevance information storage unit based on at least one of the attributes of the service search data and presumes the extracted services to be the services likely to be requested by the image processing device from the service supply unit.

3. The image processing system according to claim 2, wherein:
each of the (n×m) pieces of relevance information stored in the relevance information storage unit is information indicating one of "relevant", "irrelevant" and "unclear", and
the presumption unit refers to (n×k) pieces of relevance information corresponding to k types of attributes (k: positive integer, k≦m) of the service search data received by the service search data reception unit out of the (n×m) pieces of relevance information stored in the relevance information storage unit, extracts services having at least one attribute giving the relevance information "relevant" and having no attribute giving the relevance information "irrelevant" from the n types of services, and presumes the extracted services to be the services likely to be requested by the image processing device from the service supply unit.

4. The image processing system according to claim 2, wherein:
each of the (n×m) pieces of relevance information stored in the relevance information storage unit is information selected from numerical information indicating a level of relevance and information indicating "irrelevant", and
the presumption unit refers to (n×k) pieces of relevance information corresponding to k types of attributes (k: positive integer, k≦m) of the service search data received by the service search data reception unit out of the (n×m) pieces of relevance information stored in the relevance information storage unit, extracts services having no attribute giving the relevance information "irrelevant" from the n types of services, calculates the sum or product of values of the numerical information regarding each of the extracted services, and presumes the services likely to be requested by the image processing device from the service supply unit based on the sum or product.

5. The image processing system according to claim 1, wherein:
the information supply unit includes a transfer data transmission unit that transmits part of data necessary for the service supply unit to execute the service, contained in the service search data received by the service search data reception unit, to the service supply unit as transfer data, and
the image processing device includes a difference data transmission unit that transmits data obtained by excluding part of the service search data corresponding to the transfer data from the data necessary for the service supply unit to execute the service to the service supply unit as difference data, and the service supply unit including
- a transfer data reception unit that receives the transfer data transmitted from the transfer data transmission unit of the information supply unit; and
- a difference data reception unit that receives the difference data transmitted from the difference data transmission unit of the image processing device.

6. The image processing system according to claim 1, wherein:
- the service search data transmission unit of the image processing device transmits the service search data to the information supply unit a plurality of times,
- the service search data reception unit of the information supply unit receives the service search data each time it is transmitted from the image processing device,
- the presumption unit of the information supply unit presumes the probability that the image processing device requests the service supply unit to execute each of the services executable by the service supply unit on each reception of service search data by the service search data reception unit based on the service search data including newly received data or updated with the newly received data and according to the presumption rules, and
- the list supply unit of the information supply unit supplies the image processing device with one of the list generated by extracting services likely to be requested by the image processing device from the service supply unit from all the services executable by the service supply unit and the list generated by sorting the services executable by the service supply unit according to the probability that the image processing device requests the service supply unit to execute each of the services as the information on services executable by the service supply unit based on new presumption result each time new presumption result is obtained by the presumption unit.

7. The image processing system according to claim 6, wherein the service determination unit of the image processing device presents the information on services to the user based on the list newly supplied from the list supply unit when a prescribed time period has passed since the reception of the previous list.

8. The image processing system according to claim 6, wherein the service determination unit of the image processing device presents the information on services to the user based on the list newly supplied from the list supply unit when a prescribed operation is received from the user.

9. The image processing system according to claim 6, wherein the service determination unit of the image processing device presents the information on services to the user based on the list newly supplied from the list supply unit when a prescribed time period has passed since the last operation by the user.

10. The image processing system according to claim 6, wherein the service search data transmission unit of the image processing device stops the transmission of the service search data to the information supply unit when the number of services contained in the list newly supplied from the list supply unit has reduced to a prescribed number or less.

11. An image processing device including at least one of an image reading unit that reads an image, and thereby generates image data representing the image, and an image printing unit that prints out an image represented by image data, capable of forming an image processing system in cooperation with a service supply unit capable of executing a service regarding at least one of image data generated by the image reading unit and image data representing an image to be printed out by the image printing unit in response to a request from the image processing device; and an information supply unit that supplies the image processing device with information on services executable by the service supply unit, the image processing device comprising:
- a service search data transmission unit that transmits service search data to the information supply unit, the service search data containing one or more pieces of information selected from one or more pieces of information regarding settings of the image processing device that are stored in the image processing device, one or more pieces of information indicating status of the image processing device detected in each part of the image processing device, one or more pieces of information indicating operations that the image processing device has received from a user, and one or more pieces of information to be transmitted from the image processing device and handed over to the service supply unit when a service is executed;
- a service determination unit that presents the information on services transmitted from the information supply unit in response to the service search data to the user, lets the user select a service from the presented information, and determines the selected service as a service to be requested from the service supply unit, said service determination unit configured to present the information on the services to the user based on a relevancy of each service to an attribute of the service search data; and
- a service requesting unit that requests the service supply unit to execute the service determined by the service determination unit.

12. A server capable of forming an image processing system in cooperation with an image processing device including at least one of an image reading unit that reads an image, and thereby generates image data representing the image, and an image printing unit that prints out an image represented by image data; and a service supply unit capable of executing a service regarding at least one of image data generated by the image reading unit and image data representing an image to be printed out by the image printing unit in response to a request from the image processing device, the server including an information supply unit that supplies the image processing device with information on services executable by the service supply unit, the information supply unit comprising:
- a service search data reception unit that receives service search data transmitted from the image processing device, the service search data containing one or more pieces of information selected from one or more pieces of information regarding settings of the image processing device that are stored in the image processing device, one or more pieces of information indicating status of the image processing device detected in each part of the image processing device, one or more pieces of information indicating operations that the image processing device has received from a user, and one or more pieces of information to be transmitted from the image processing device and handed over to the service supply unit when a service is executed;
- a presumption unit that presumes a probability that the image processing device requests the service supply unit to execute each of the services executable by the service supply unit based on the service search data received by the service search data reception unit and according to prescribed presumption rules, the prescribed presumption rules including at least an evaluation of a relevancy of each service to an attribute of the service search data; and a list supply unit that supplies the image processing device with one of a list generated by extracting services likely to be requested by the image processing device from the service supply unit from all the services executable by the service supply unit and a list generated by sorting the services executable by the service supply unit according to the probability that the image processing device requests the service supply unit to execute each of the services based on presumption result by the presumption unit, as the information on services executable by the service supply unit.

13. The server according to claim 12, wherein the information supply unit further includes a relevance information storage unit that stores relevance information indicating the degree of relevance between each of n types of services executable by the service supply unit (n: positive integer) and each of m types of attributes (m: positive integer) that is relevant to at least a type of service, regarding all (n×m) combinations, wherein the presumption unit extracts one or more services having high relevance to the service search data received by the service search data reception unit by referring to the relevance information stored in the relevance information storage unit based on at least one of the attributes of the service search data and presumes the extracted services to be the services likely to be requested by the image processing device from the service supply unit.

14. The server according to claim 13, wherein:

each of the (n×m) pieces of relevance information stored in the relevance information storage unit is information indicating one of "relevant", "irrelevant" and "unclear", and the presumption unit refers to (n×k) pieces of relevance information corresponding to k types of attributes (k: positive integer, $k \leq m$) of the service search data received by the service search data reception unit out of the (n×m) pieces of relevance information stored in the relevance information storage unit, extracts services having at least one attribute giving the relevance information "relevant" and having no attribute giving the relevance information "irrelevant" from the n types of services, and presumes the extracted services to be the services likely to be requested by the image processing device from the service supply unit.

15. The server according to claim 13, wherein:

each of the (n×m) pieces of relevance information stored in the relevance information storage unit is information selected from numerical information indicating a level of relevance and information indicating "irrelevant", and the presumption unit refers to (n×k) pieces of relevance information corresponding to k types of attributes (k: positive integer, $k \leq m$) of the service search data received by the service search data reception unit out of the (n×m) pieces of relevance information stored in the relevance information storage unit, extracts services having no attribute giving the relevance information "irrelevant" from the n types of services, calculates the sum or product of values of the numerical information regarding each of the extracted services, and presumes the services likely to be requested by the image processing device from the service supply unit based on the sum or product.

16. A computer-readable medium having a program stored thereon, said program including computer-readable instructions that cause a computer to function as a server capable of forming an image processing system in cooperation with an image processing device including at least one of an image reading unit that reads an image and thereby generates image data representing the image and an image printing unit that prints out an image represented by image data; and a service supply unit capable of executing a service regarding at least one of image data generated by the image reading unit and image data representing an image to be printed out by the image printing unit in response to a request from the image processing device, the server including an information supply unit that supplies the image processing device with information on services executable by the service supply unit, the information supply unit comprising:

a service search data reception unit that receives service search data transmitted from the image processing device, the service search data containing one or more pieces of information selected from one or more pieces of information regarding settings of the image processing device that are stored in the image processing device, one or more pieces of information indicating status of the image processing device detected in each part of the image processing device, one or more pieces of information indicating operations that the image processing device has received from a user, and one or more pieces of information to be transmitted from the image processing device and handed over to the service supply unit when a service is executed;

a presumption unit that presumes a probability that the image processing device requests the service supply unit to execute each of the services executable by the service supply unit based on the service search data received by the service search data reception unit and according to prescribed presumption rules, the prescribed presumption rules including at least an evaluation of a relevancy of each service to an attribute of the service search data; and a list supply unit that supplies the image processing device with one of a list generated by extracting services likely to be requested by the image processing device from the service supply unit from all the services executable by the service supply unit and a list generated by sorting the services executable by the service supply unit according to the probability that the image processing device requests the service supply unit to execute each of the services based on presumption result by the presumption unit, as the information on services executable by the service supply unit.

17. The computer readable medium according to claim 16, wherein the information supply unit further comprises:

a relevance information storage unit that stores relevance information indicating the degree of relevance between each of n types of services executable by the service supply unit (n: positive integer) and each of m types of attributes (m: positive integer) that is relevant to at least a type of service, regarding all (n×m) combinations, wherein the presumption unit extracts one or more services having high relevance to the service search data received by the service search data reception unit by referring to the relevance information stored in the relevance information storage unit based on at least one of the attributes of the service search data and presumes the extracted services to be the services likely to be requested by the image processing device from the service supply unit.

18. The computer readable medium according to claim 17, wherein:

each of the (n×m) pieces of relevance information stored in the relevance information storage unit is information indicating one of "relevant", "irrelevant" and "unclear", and the presumption unit refers to (n×k) pieces of relevance information corresponding to k types of attributes (k: positive integer, k≦m) of the service search data received by the service search data reception unit out of the (n×m) pieces of relevance information stored in the relevance information storage unit, extracts services having at least one attribute giving the relevance information "relevant" and having no attribute giving the relevance information "irrelevant" from the n types of services, and presumes the extracted services to be the services likely to be requested by the image processing device from the service supply unit.

19. The computer readable medium according to claim 17, wherein:

each of the (n×m) pieces of relevance information stored in the relevance information storage unit is information selected from numerical information indicating a level of relevance and information indicating "irrelevant", and the presumption unit refers to (n×k) pieces of relevance information corresponding to k types of attributes (k: positive integer, k≦m) of the service search data received by the service search data reception unit out of the (n×m) pieces of relevance information stored in the relevance information storage unit, extracts services having no attribute giving the relevance information "irrelevant" from the n types of services, calculates the sum or product of values of the numerical information regarding each of the extracted services, and presumes the services likely to be requested by the image processing device from the service supply unit based on the sum or product.

20. An image processing system with a server capable of forming an image processing system in cooperation with an image processing device including at least one of an image reading unit that reads an image and thereby generates image data representing the image and an image printing unit that prints out an image represented by image data; and a service supply unit capable of executing a service regarding at least one of image data generated by the image reading unit and image data representing an image to be printed out by the image printing unit in response to a request from the image processing device, the server including an information supply unit that supplies the image processing device with information on services executable by the service supply unit, the information supply unit comprising:

means for receiving service search data transmitted from the image processing device, the service search data containing one or more pieces of information selected from one or more pieces of information regarding settings of the image processing device that are stored in the image processing device, one or more pieces of information indicating status of the image processing device detected in each part of the image processing device, one or more pieces of information indicating operations that the image processing device has received from a user, and one or more pieces of information to be transmitted from the image processing device and handed over to the service supply unit when a service is executed;

means for presuming a probability that the image processing device requests the service supply unit to execute each of the services executable by the service supply unit based on the service search data received by the service search data reception means according to prescribed presumption rules, the prescribed presumption rules including at least an evaluation of a relevancy of each service to an attribute of the service search data; and means for supplying the image processing device with one of a list generated by extracting services likely to be requested by the image processing device from the service supply unit from all the services executable by the service supply unit and a list generated by sorting the services executable by the service supply unit according to the probability that the image processing device requests the service supply unit to execute each of the services based on presumption result by the means for presuming, as the information on services executable by the service supply unit.

* * * * *